United States Patent [19]
Yamashita et al.

[11] Patent Number: 5,391,318
[45] Date of Patent: Feb. 21, 1995

[54] LIQUID CRYSTAL COMPOSITION AND LIQUID CRYSTAL DEVICE CONTAINING THE SAME

[75] Inventors: Masataka Yamashita; Masahiro Terada; Shousei Mori, all of Kanagawa; Kazuharu Katagiri, Tokyo, all of Japan

[73] Assignee: Canon Kabushiki Kaisha, Tokyo, Japan

[21] Appl. No.: 645,720

[22] Filed: Jan. 25, 1991

[30] Foreign Application Priority Data

Jan. 29, 1990 [JP] Japan .................... 2-19883

[51] Int. Cl.$^6$ ............... C09K 19/34; C09K 19/30; C09K 19/20; G02F 1/13
[52] U.S. Cl. .............. 252/299.61; 252/299.63; 252/299.66; 252/299.67
[58] Field of Search .......... 252/299.61, 299.66, 252/299.63, 299.62, 299.67

[56] References Cited

U.S. PATENT DOCUMENTS 4,876,026  10/1989  Saito et al. .................. 252/299.61

FOREIGN PATENT DOCUMENTS 0126949  12/1984  European Pat. Off. .
0237007   9/1987  European Pat. Off. .
0267758   5/1988  European Pat. Off. .
0298702   1/1989  European Pat. Off. .
0347944  12/1989  European Pat. Off. .

*Primary Examiner*—Robert L. Stoll
*Assistant Examiner*—C. Harris
*Attorney, Agent, or Firm*—Fitzpatrick, Cella, Harper & Scinto

[57] ABSTRACT

A liquid crystal composition having a chiral smectic phase comprising at least one liquid crystal compound having the general formula (I) shown below:

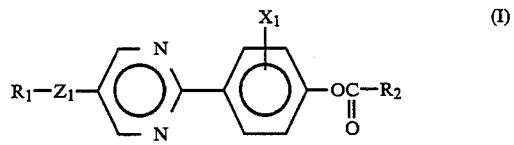

wherein $R_1$ and $R_2$ each is a straight chain or branch alkyl group which may have a substituent group having 1 to 16 carbons, $Z_1$ is a single bond, —O—,

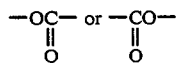

and $X_1$ is a halogen atom.

18 Claims, 2 Drawing Sheets

LIQUID CRYSTAL COMPOSITION AND LIQUID CRYSTAL DEVICE CONTAINING THE SAME

BACKGROUND OF THE INVENTION

1. Field of the Invention

The present invention relates to a liquid crystal composition and a display device using the same. More particularly, the present invention relates to a novel liquid crystal composition for which the electric field can be improved, and a liquid crystal display device which uses the same. The present invention also relates to a liquid crystal device for use in a liquid crystal-optical shutter or the like and a display device which uses the above-described liquid crystal device as the display device.

2. Description of the Prior Art

Hitherto, liquid crystal has been used in a variety of fields as an electro-optical device. A major portion of the liquid crystal devices, which have been put into practical use, uses the TN (Twisted Nematic) type of liquid crystal described in "Voltage Dependent Optical Activity of a Twisted Nematic Liquid Crystal" in Applied Physics Letters, Vol. 18, No. 4 (Feb. 15, 1971), pp 127 to 128 written by M. Schadt and W. Helfrich.

Each of the above-described liquid crystal devices utilizes the dielectric array effect of the liquid crystal with which the direction of the average molecular axis is oriented into a specific direction by an applied electric field because of the dielectric anisotropy of the liquid crystal molecule. However, since its optical response speed is limited to an unsatisfactory speed of a unit of milliseconds, it cannot be widely used in a multiplicities of fields. On the other hand, in consideration of the cost reduction and the manufacturing yield, it is most preferable that a structure driven by a simple matrix system be employed when the liquid crystal is applied to a large-size flat display. The simple matrix system employs a configuration of the electrodes arranged in such a manner that the scanning electrode groups and the signal electrode groups are arranged so as to form a matrix. Furthermore, the matrix thus arranged is driven by a time division drive system arranged in such a manner that address signals are successively and periodically applied to the scanning electrode groups, and a predetermined information signal, in synchronization with and in parallel to the address signals, is applied to the signal electrode groups.

However, a structure arranged in such a manner such that the above-described TN-type liquid crystal is employed as the devices for the above-described drive system encounters a problem in that the electric field is definitely applied to a region where the scanning electrode is selected but no signal electrode is selected or a region where the scanning electrode is not selected but the signal electrode is selected (a so-called "half selection point").

If the difference between the voltage applied to the selected point and the voltage applied to the half selection point is sufficiently large and the voltage threshold necessary to cause the liquid crystal molecules to be vertically disposed is determined to be the intermediate voltage of the above-described two voltage levels, the display devices can work normally. However, a structure arranged to have an enlarged number (N) of the scanning lines encounters a problem in that the duty ratio, which is the time in which an effective electric field is applied during the scanning of the entire surface of the frame (1 frame), will be decreased at a rate of 1/N.

Therefore, the voltage difference, which is an effective value, between the selected point and the non-selected point can be reduced inversely in relation to the number of the scanning lines. As a result, unsolved problems remain in that the image contrast can be lowered and the crosstalk is generated undesirably.

The above-described problems are inevitable problems taken place in a structure arranged in such a manner that liquid crystal having no bistability is driven by utilizing a time accumulation effect (that is, scanning is performed repeatedly), where the stable state is defined to be a state in which liquid crystal molecules are horizontally arranged with respect to the surface of the electrode and they are vertically oriented for only the time in which the electric field is effectively applied thereto.

In order to overcome the above-described problem, there have been disclosed a variety of methods such as a voltage averaging method, a dual frequency drive method and a multi-matrix method and the like. However, the enlargement of the frame of the display device and the raising of the density have not been satisfactorily realized because of the limitation of the number of the scanning lines.

In order to overcome the above-described problems experienced with the conventional liquid crystal device, a disclosure has been made by Clark and Lagerwall in Japanese Patent Laid-Open No. 56-107216 and U.S. Pat. No. 4,367,924 on a structure arranged in such a manner that a liquid crystal device has bistability.

As the bistable liquid crystal, a ferroelectric liquid crystal having a phase chiral smectic C (phase SmC*) or phase H (phase SmH*) is usually employed.

The ferroelectric liquid crystal has a bistability composed of first and second optical stable states with respect to the electric field. Therefore, it exhibits characteristics, which are different from the above-described TN type liquid crystal, such that the liquid crystal is oriented in the first optical stable state with respect to an electric field vector and oriented in the second optical stable state with respect to another electric field vector. Furthermore, the liquid crystal of the type described above selects either of the above-described two stable states in response to the applied electric field. In addition, it has the characteristic (the bistability) that the present state is maintained if there is no electric field applied.

The ferroelectric liquid crystal further exhibits high response performance. The reason is that the spontaneous polarization of the ferroelectric liquid crystal and the applied electric field directly interact with each other, causing the transference of the status of the orientation to be induced. The thus realized response speed is faster than the response speed realized by the interaction between the dielectric anisotropy and the electric field by three or four orders.

As described above, since the ferroelectric liquid crystal originally exhibits these excellent characteristics, the above-described problems experienced with the conventional TN type device can be overcome to a certain degree. In particular, it can be expected to be applied to a high speed optical shutter or a high density and/or large frame display. Therefore, liquid crystal materials having the ferroelectric characteristics have been widely researched and developed. However, there has not been developed a liquid crystal material having satisfactory characteristics such as low temperature operationability and high speed response performance so as to be used in a liquid crystal device.

The relationship among the response time t, the level of the spontaneous polarization Ps and the viscosity h is governed by the following equation II.

$$\tau = \frac{\eta}{Ps \cdot E} \quad \text{[II]}$$

wherein E is the applied electric field.

Therefore, the response speed can be raised by any of the following methods:
(a) Raise the spontaneous polarization level Ps.
(b) Reduce the viscosity $\eta$.
(c) Enlarge the applied electric field E.

However, the applied electric field has an upper limit because it is driven by ICs or the like. Therefore, it must be lowered as much as possible. As a result, the viscosity $\eta$ must be lowered or the spontaneous polarization level Ps must be raised.

In general, in a ferroelectric chiral smectic liquid crystal compound having a large spontaneous polarization, the internal electric field generated by the spontaneous polarization is large, causing a multiplicity of limitations to be present when the device having the bistable state is structured. In addition, if the spontaneous polarization is enlarged excessively, the viscosity can also be enlarged. Therefore, the response speed cannot satisfactorily be raised.

The TN liquid crystal material is oriented in a nematic phase state by using an orienting film which has been subjected to a simple rubbing orienting process. On the other hand, when the SmC* liquid crystal material is subject to such a rubbing orientation process, zigzag orientation occurs and the orientation becomes defective in the vicinity of the gap spacer (spacer beads or the like) in the liquid crystal cell.

Furthermore, the defective orientation will easily be generated due to the difference in the rubbing status of the orienting film caused by the projections and pits in the surface of the oriented film which are formed due to the components of the liquid crystal cell.

The inventors of the present invention considers the reason for the above-described fact lies in that the SmC* phase is the phase which has passed a plurality of phase transitions starting from the isotropic phase, and that the SmC* phase more approximates a crystal phase in comparison to the nematic phase.

The above-described defective orientation deteriorates the bistability exhibited by the SmC* liquid crystal material and causes the contrast of the image quality to be lowered and the crosstalk to be enlarged.

As described above, in order to put the ferroelectric liquid crystal device into practical use, there has been a desire for a ferroelectric chiral smectic liquid crystal component which has low viscosity and high speed response and which can easily be oriented by a simple rubbing orienting process and which exhibits uniform monodomain orientation without defects.

SUMMARY OF THE INVENTION

Accordingly, an object of the present invention is to provide a liquid crystal composition which exhibits high speed response and excellent and uniform monodomain orientation in order to obtain a ferroelectric liquid crystal device, and, more particularly, to provide a liquid crystal composition having a chiral smectic phase and a liquid crystal device which uses the above-described liquid crystal composition.

Accordingly, a first aspect of the present invention includes a liquid crystal composition having a chiral smectic phase and containing at least one liquid crystal compound having the following general formula (I):

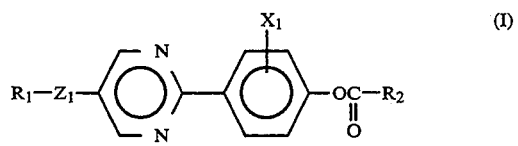

wherein symbols $R_1$ and $R_2$ each is a straight chain or branch alkyl group which may have a substituent group having 1 to 16 carbons, $Z_1$ is a single bond, —O—,

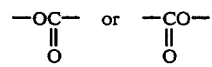

and $X_1$ is a halogen atom.

A second aspect of the present invention includes a liquid crystal composition containing at least one liquid crystal compound having the above-described general formula (I); at least one liquid crystal compound having the following general formula (II):

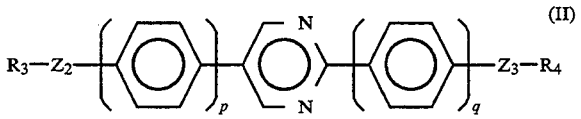

wherein $R_3$ and $R_4$ are straight chain or branch alkyl groups having 1 to 18 carbons which may contain an alkoxy group having 1 to 12 carbons, $R_3$ and $R_4$ each shows non-optical activity, $Z_2$ and $Z_3$ each is a single bond, —O—,

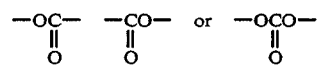

and p and q each is 0, 1 or 2; and/or at least one liquid crystal compound having the following general formula (III)

wherein $R_5$ is a straight chain or a branch alkyl group which may have a substituent group and having 1 to 18 carbons, Y is a single bond,

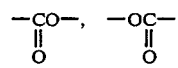

—CH$_2$O—, —OCH$_2$—, —COS—, —SCO—, or —CH=CH—COO—, $Z_4$ is a single bond, —O—,

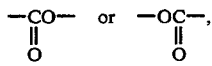

$Z_5$ is —OCH$_2$—,

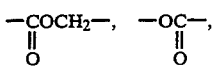

or —O—(CH$_2$)$_k$—O—CH$_2$—, wherein k=an integer from 1 to 4,

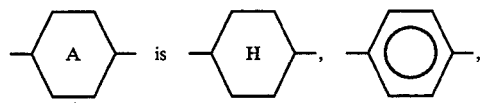

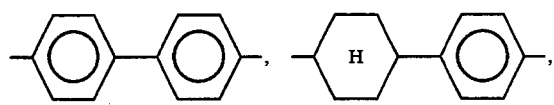

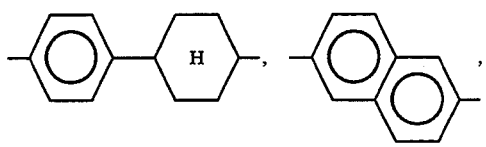

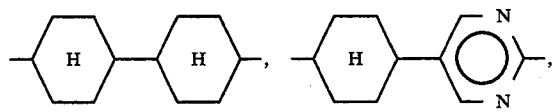

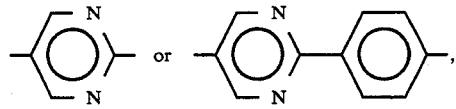

r is 1 or 2 and l is an integer from 1 to 12.

A third aspect of the present invention includes a liquid crystal device for use in a display device arranged in such a manner that the above-described liquid crystal composition is disposed between a pair of electrode substrates.

DESCRIPTION OF THE PREFERRED EMBODIMENTS

Figure 1:
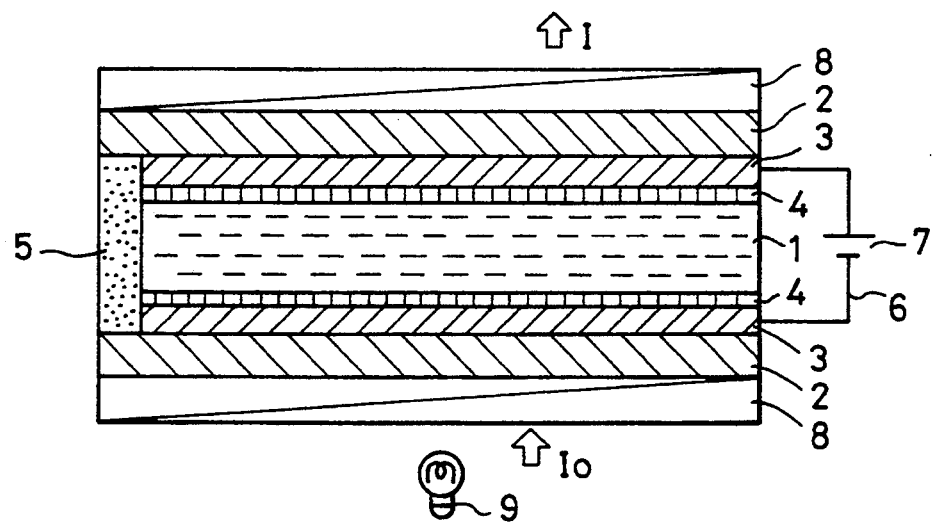
FIG. 1 is a schematic cross sectional view which illustrates an example of a liquid crystal device which employs a ferroelectric liquid crystal.

It is preferable that a compound having the following formula (Ia) be employed as the liquid crystal compound expressed having the general formula (I):

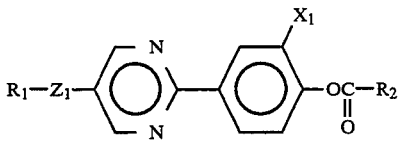

where R$_1$, R$_2$, Z$_1$ and X$_1$ have the same definitions as described above. In the above-described formula (Ia), it is preferable that Z$_1$ is a single bond or —O—, X$_1$ is Cl or F and preferably F.

In the liquid crystal compound having general formula (I), it is preferable that R$_1$ and R$_2$ are selected from any of (I-i) to (I-iii):

(I-i) an alkyl group having 1 to 16 carbons.

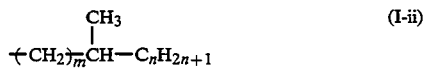

wherein m is an integer from 0 to 7 and n is an integer from 1 to 9 and m and n have the relationship $2 \leq m+n \leq 14$.

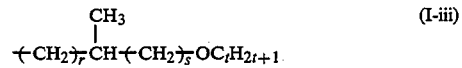

wherein r is an integer from 0 to 7, s is 0 or 1, t is an integer from 1 to 14 and r, s and t have the relationship $1 \leq r+s+t \leq 14$.

It is preferable that the compound having the general formula (II) is any of the compounds having the following formulas (II-a) to (II-e):

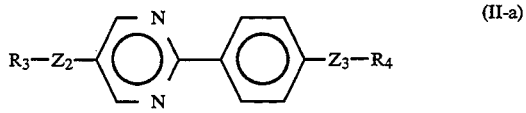

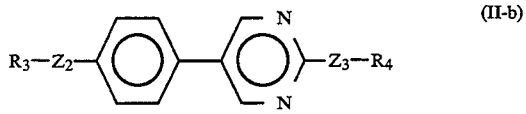

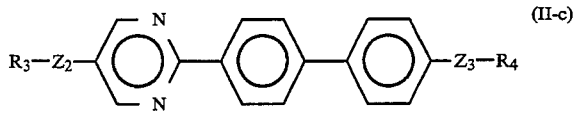

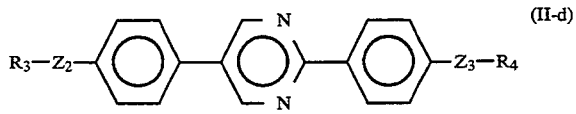

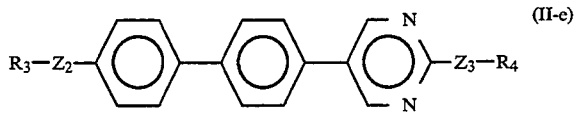

wherein R$_3$, R$_4$, Z$_2$ and Z$_3$ have the same definitions as described above.

Furthermore, it is preferable that Z$_2$ and Z$_3$ each is any of (II-i) to (II-viii) in the above-described formulas (II-a) to (II-e):

(II-i) Z$_2$ is a single bond and Z$_3$ is a single bond.
(II-ii) Z$_2$ is a single bond and Z$_3$ is —O—.

(II-iii) $Z_2$ is a single bond and $Z_3$ is

(II-iv) $Z_2$ is a single bond and $Z_3$ is

(II-v) $Z_2$ is —O— and $Z_3$ is a single bond.
(II-vi) $Z_2$ is —O— and $Z_3$ is —O—.
(II-vii) $Z_2$ is —O— and $Z_3$ is

(II-viii) $Z_2$ is —O— and $Z_3$ is

In the above-described formulas (II-a) to (II-e), it is preferable that $R_3$ and $R_4$ are straight chain or branch alkyl groups having 4 to 14 carbons and may have an alkoxy group having 1 to 12 carbons. It is preferable that $R_3$ and $R_4$ are selected from any of (II-ix) to (II-xi).

(II-ix) $R_3$ and $R_4$ each is an n-alkyl group having 4 to 14 carbons.

(II-x) $R_3$ is an n-alkyl group having 4 to 14 carbons and $R_4$ is

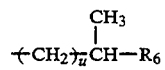

wherein u is an integer from 0 to 7 and $R_6$ is a straight chain or branch alkyl group.

(II-xi) $R_3$ is an n-alkyl group and $R_4$ is

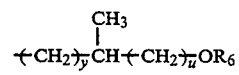

wherein y is an integer from 0 to 7, u is 0 or 1, $R_6$ is a straight chain or branch alkyl group.

It is preferable that the compound having the above-described general formula (III) is selected from any of the compounds having the following formulas (III-a) to (III-f):

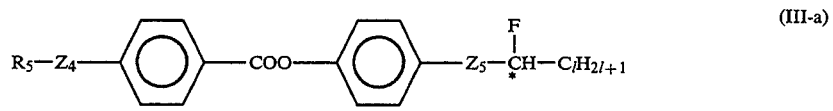

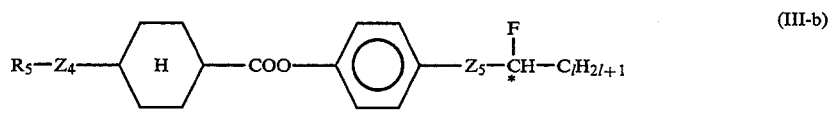

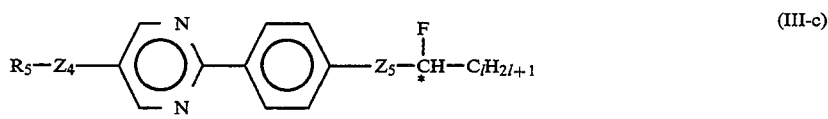

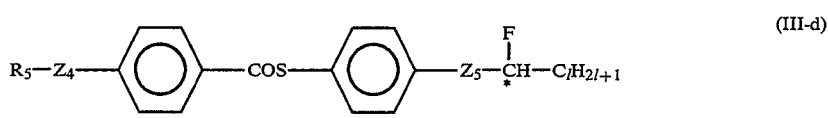

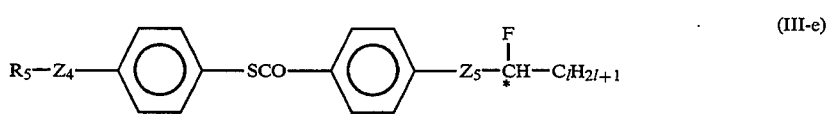

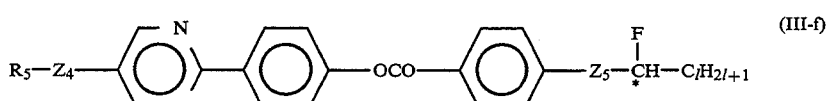

wherein $R_5$, $Z_5$ and l have the same definitions as described above.

It is more preferable that the compound having the general formula (III) is selected from any of the compounds having the formulas (III-a), (III-b) and (III-c).

It is preferable that $Z_4$ and $Z_5$ in the above-described formulas (III-a) to (III-f) are selected from any of the following:

(III-i) $Z_4$ is a single bond and $Z_5$ is —O—CH$_2$—.
(III-ii) $Z_4$ is a single bond and $Z_5$ is —COO—CH$_2$—.
(III-iii) $Z_4$ is a single bond and $Z_5$ is —OCO—.
(III-iv) $Z_4$ is —O— and $Z_5$ is —O—CH$_2$—.
(III-v) $Z_4$ is —O— and $Z_5$ is —COOCH$_2$—.

The liquid compounds having the above-described general formula (I) are exemplified as follows:

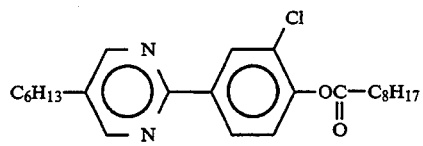 (1-1)
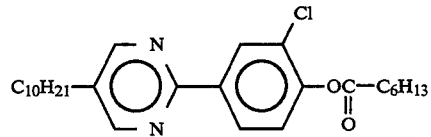 (1-2)
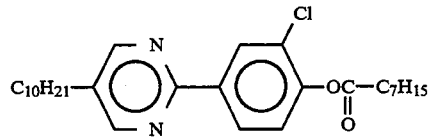 (1-3)
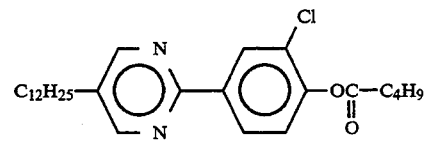 (1-4)
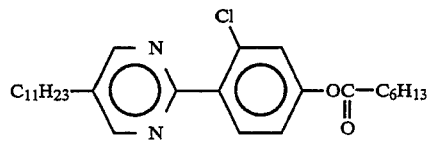 (1-5)
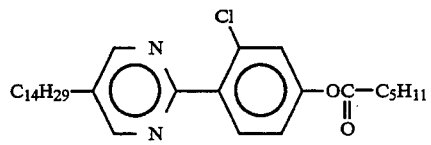 (1-6)
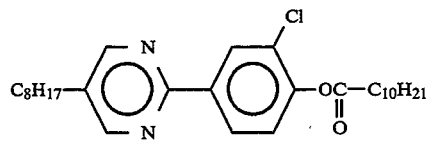 (1-7)
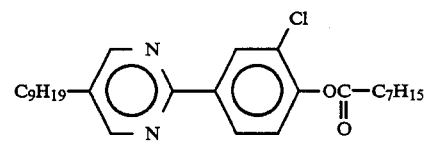 (1-8)
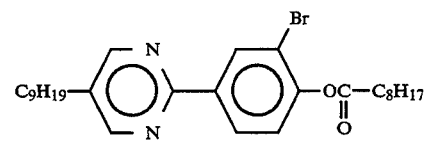 (1-9)
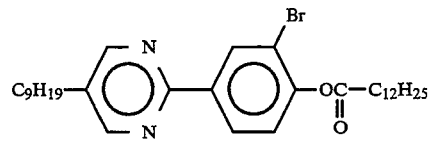 (1-10)
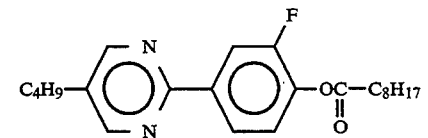 (1-11)
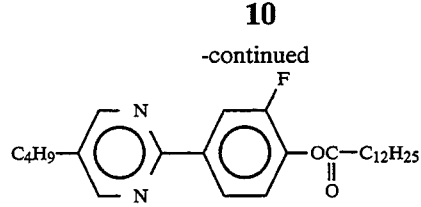 (1-12)
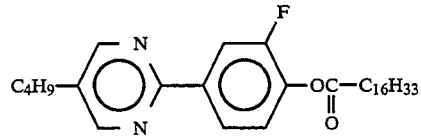 (1-13)
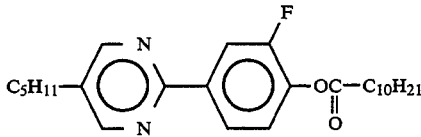 (1-14)
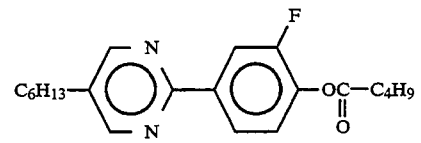 (1-15)
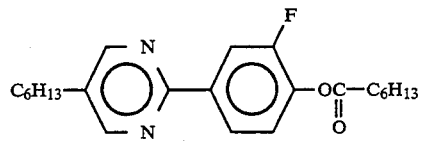 (1-16)
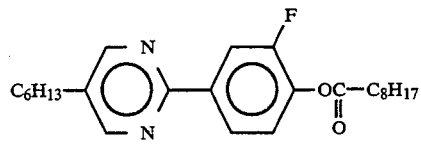 (1-17)
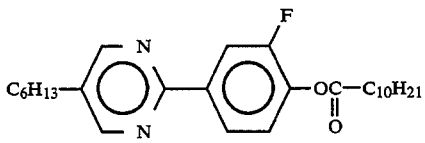 (1-18)
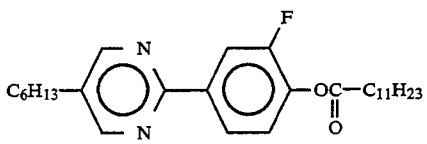 (1-19)
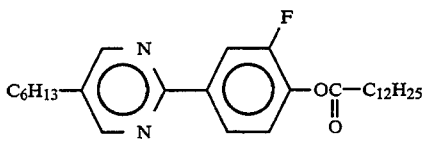 (1-20)
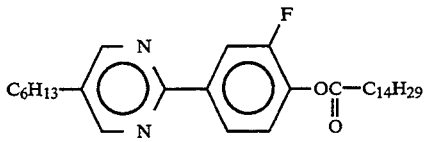 (1-21)
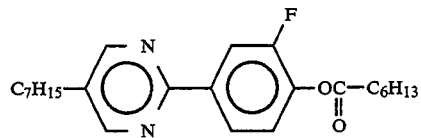 (1-22)

-continued
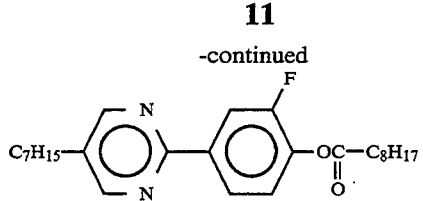 (1-23)
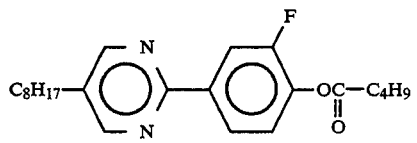 (1-24)
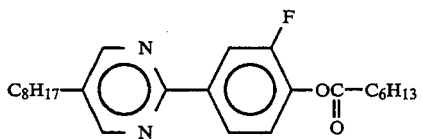 (1-25)
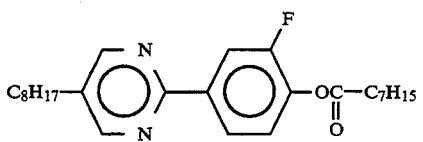 (1-26)
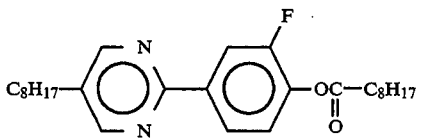 (1-27)
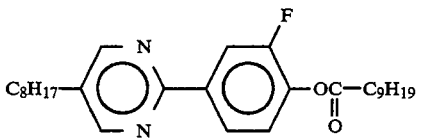 (1-28)
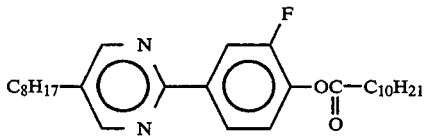 (1-29)
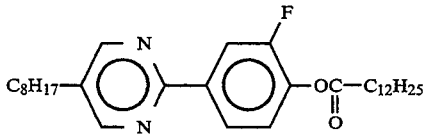 (1-30)
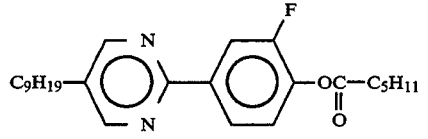 (1-31)
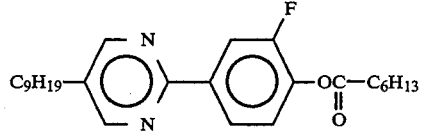 (1-32)
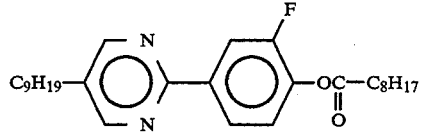 (1-33)
-continued
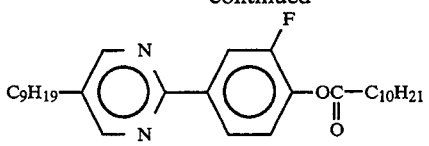 (1-34)
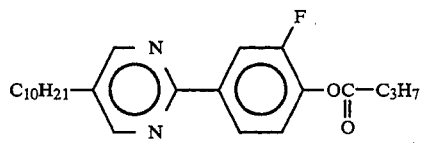 (1-35)
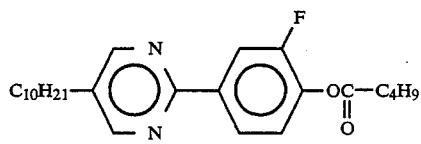 (1-36)
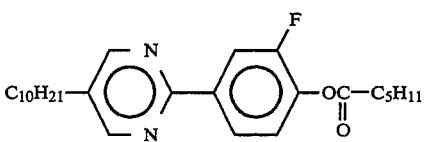 (1-37)
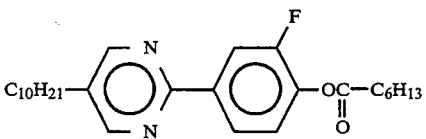 (1-38)
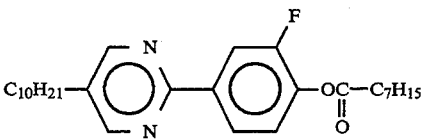 (1-39)
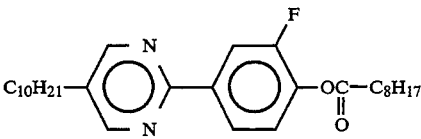 (1-40)
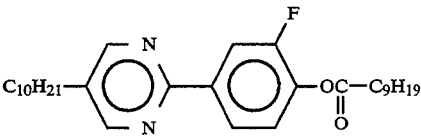 (1-41)
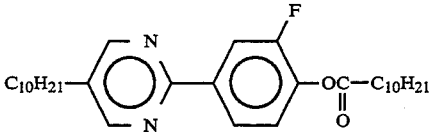 (1-42)
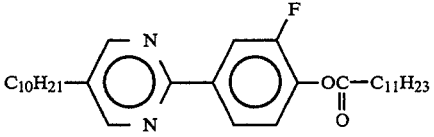 (1-43)
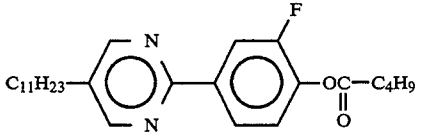 (1-44)

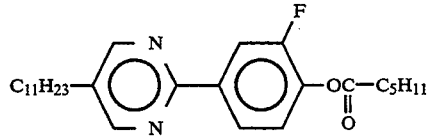 (1-45)
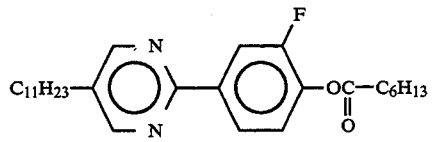 (1-46)
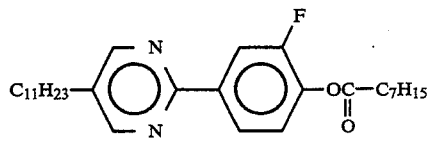 (1-47)
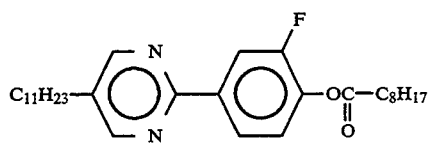 (1-48)
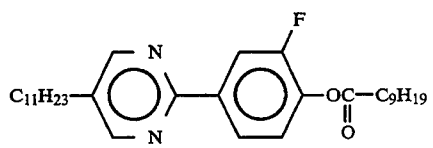 (1-49)
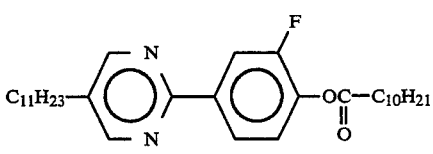 (1-50)
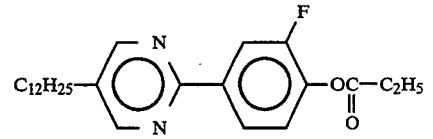 (1-51)
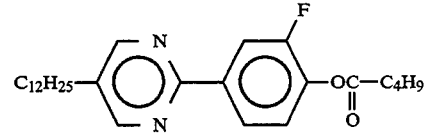 (1-52)
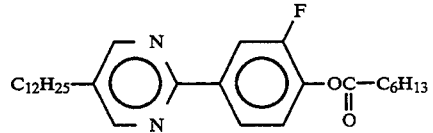 (1-53)
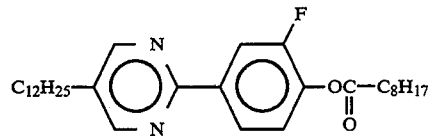 (1-54)
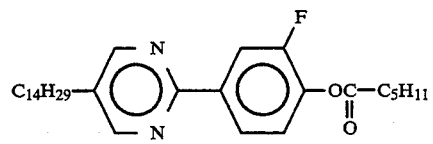 (1-55)
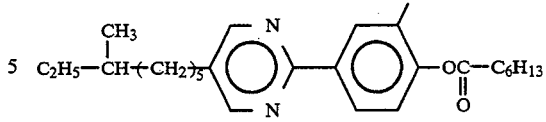 (1-56)
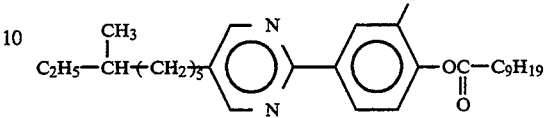 (1-57)
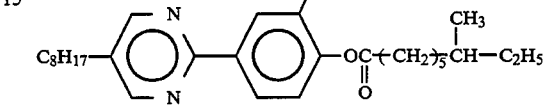 (1-58)
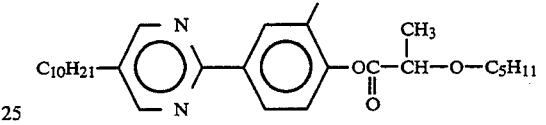 (1-59)
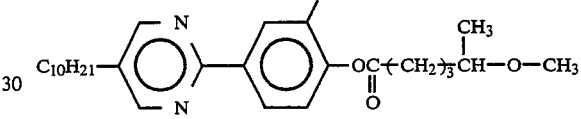 (1-60)
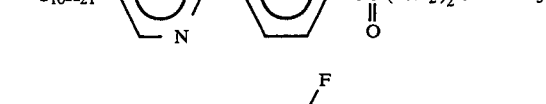 (1-61)
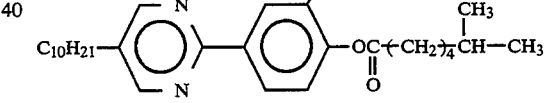 (1-62)
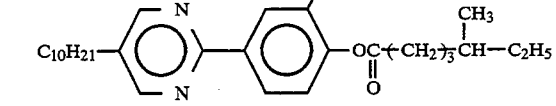 (1-63)
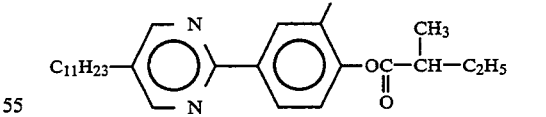 (1-64)
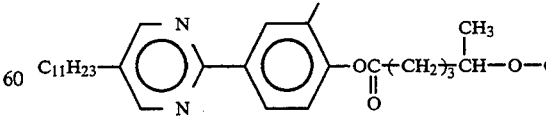 (1-65)
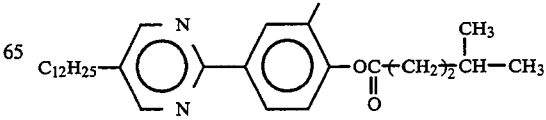 (1-66)

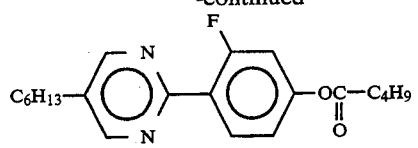 (1-67)
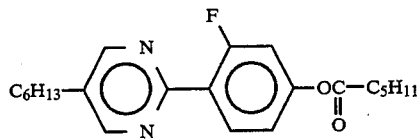 (1-68)
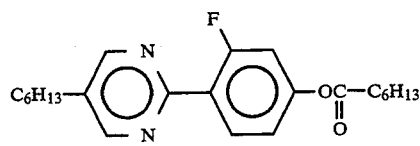 (1-69)
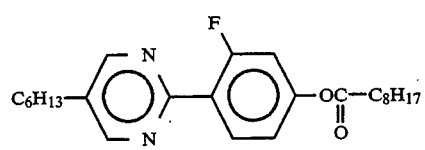 (1-70)
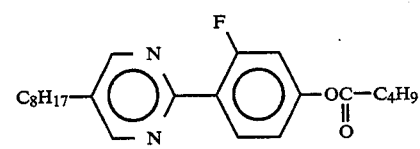 (1-71)
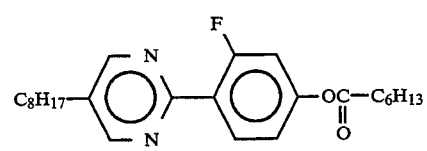 (1-72)
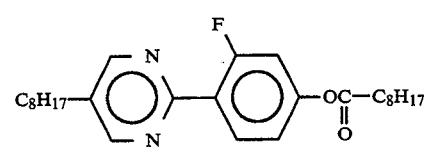 (1-73)
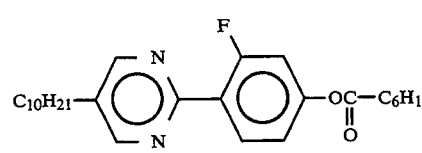 (1-74)
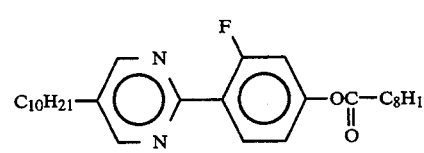 (1-75)
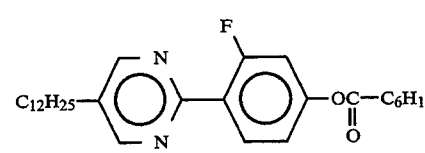 (1-76)
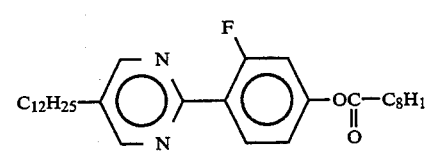 (1-77)
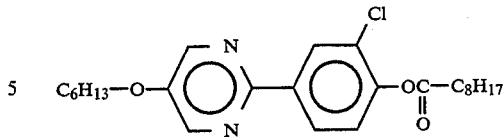 (1-78)
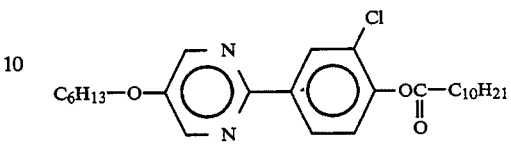 (1-79)
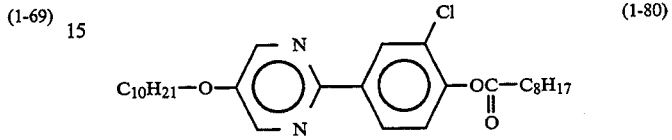 (1-80)
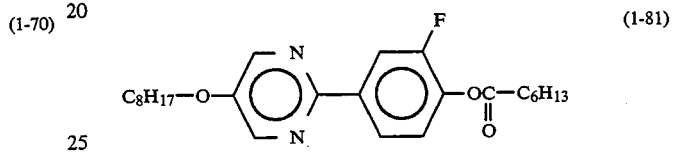 (1-81)
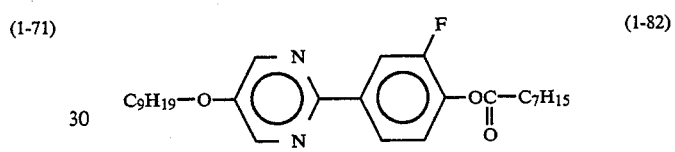 (1-82)
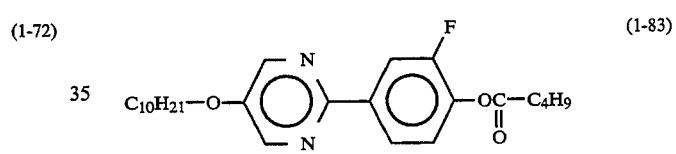 (1-83)
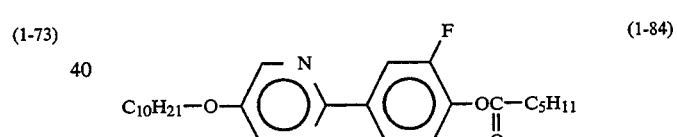 (1-84)
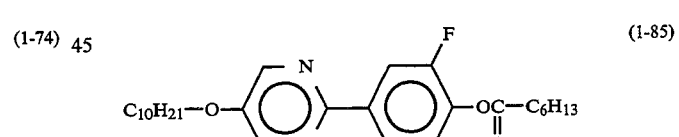 (1-85)
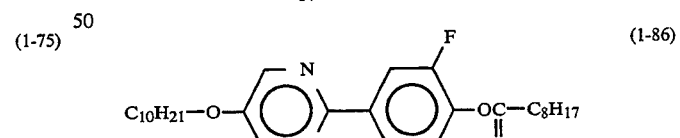 (1-86)
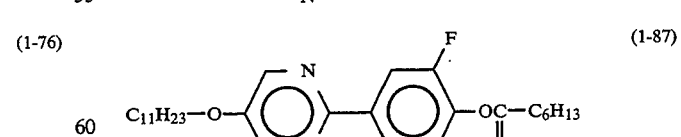 (1-87)
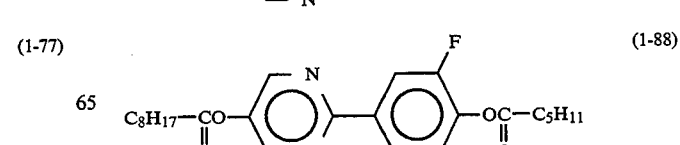 (1-88)

-continued

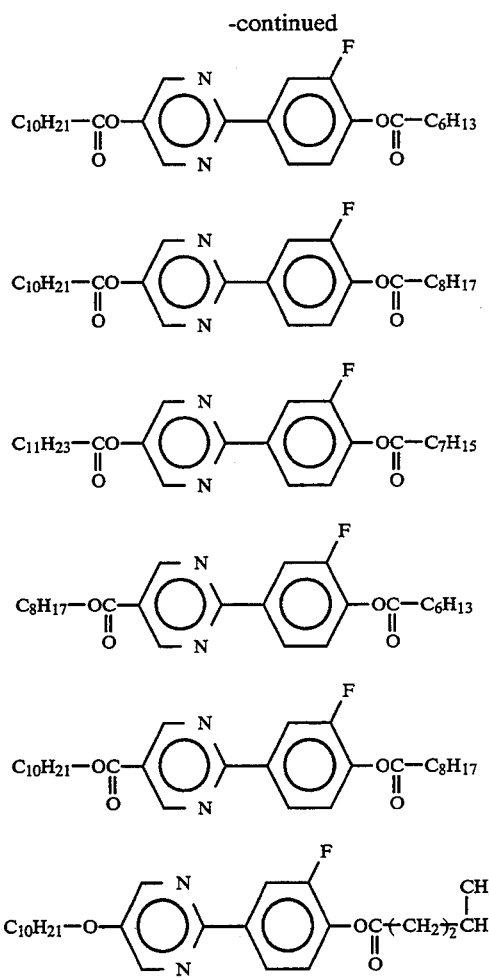

A representative process of synthesizing the liquid crystal compound having general formula (I) is as follows:

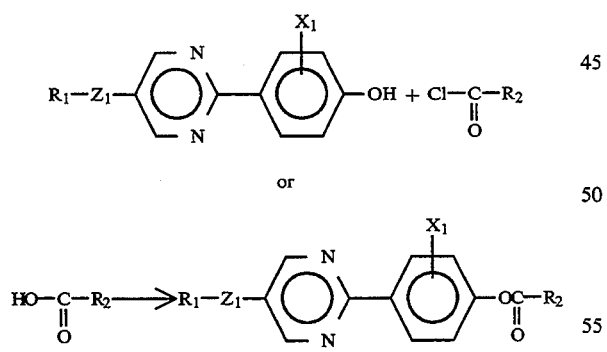

wherein $R_1$, $R_2$, $X_1$ and $Z_1$ have the same definitions as described above.

Representative examples of synthesizing liquid crystal compounds having the general formula (I) by the above process are shown as follows:

Synthesis Example 1 (Synthesis of compound No. 1-38)

0.80 g (2.42 mmol) of 2-decyl-5-(3-fluoro-4-hydroxyphenyl) pyrimidine was dissolved in 10 ml of pyridine before 0.62 ml (4.00 mmol) of heptanoylchloride was added dropwise thereto while being cooled with ice and stirred. Then, the solution was cooled with ice and stirred for 15 minutes before it was heated and stirred for another 20 minutes in a water bath having a temperature maintained at 45° to 56° C. After the reaction had been completed, the solution was injected into 150 ml of ice water so as to filter and wash with water the deposited crystal. The thus obtained crystal was dissolved in toluene and the resultant toluene layer was washed with water and dried with dried mirabilite. The solvent was removed by lowering the pressure and distillation. The residue was purified by the silica gel column chromatography method which uses toluene as the eluate before it was recrystallized twice by an acetone-methanol mixed solvent so that 0.66 g (yield 61.6%) of 2-decyl-5-(3-fluoro-4-heptanoyloxyphenyl) pyrimidine was obtained.

Phase Transition Temperature (°C.)

$$\text{Cyrst.} \underset{19.4}{\overset{45.4}{\rightleftarrows}} \text{SmC} \xrightarrow{48.5} \text{SmA} \xrightarrow{50.4} \text{Iso}$$

Synthesis Example 2 (Compound No. 1-44)

2.00 g (5.81 mmol) of 2-undecyl-5-(3-fluoro-4-hydroxyphenyl) pyrimidine, 0.60 g of varerianic acid and 50 ml of dichloromethane were placed in a 200 ml short-neck flask so that they were dissolved. Then, 1.21 g (5.86 mmol) of N,N'-dicyclohexylcarbodiimide and 0.10 g of 4-pyrolizilpyridine were successively added and stirred at room temperature for 4 hours and 45 minutes. After the stirring, the deposited N,N'-dicyclohexyl-urea was removed by filtration and the filtrate was solidified by reducing the pressure. The residue was refined by the silica gel column chromatography method which uses toluene/ethyl acetate: 100/1 as the eluate before it was recrystallized twice by an acetone-methanol mixed solvent so that 1.91 g (yield 76.8%) of 2-undecyl-5-(3-fluoro-4-pentanoyloxyphenyl) pyrimidine was obtained.

Phase Transition Temperature (°C.)

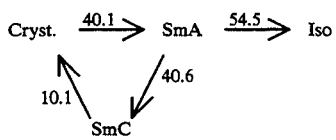

The compound having the general formula (II) can be obtained by, for example, a method described in East German Patent No. 95892 (1973) and Japanese Patent Publication No. 62-5434 (1987). For example, a compound having the following formula

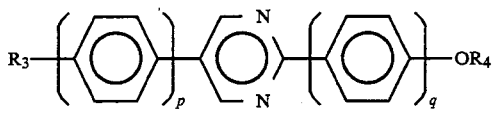

can be synthesized by the following process:

1.06 g (8.0 mmol) of 5-methoxyhexanol dissolved in 5 ml of pyridine in a 5° C. or lower iced water bath. After they were stirred at room temperature for 6 hours, the mixture generated due to the above-described reaction was injected into 100 ml of cold water. Then, it was converted into an acid side by using 6N hydrochloric acid before the mixture was extracted by isopropylether. The resultant organic layer was washed with water and dried with magnesium sulfate anhydride. The solvent was removed by distillation so that 5-methoxyhexyl-p-toluene sulfonate was obtained.

2.0 g (6.41 mmol) of 5-decyl-2-(p-hydroxyphenyl) pyrimidine and 0.61 g of potassium hydroxide were added to 10 ml of dimethyl formamide before they were stirred at 100° C. for 40 minutes. Then, the thus obtained 5-metoxyhexyl-p-toluene sulfonate was added before they were heated and stirred at 100° C. for four hours. After the reaction, the mixture obtained from the above-described reaction was injected into 100 ml of cold water so as to be extracted with benzene. Then, the resultant benzene layer was washed with water and dried with magnesium sulfate anhydride so that the solvent was removed by distillation. As a result, light yellow oily matter residue was obtained. The residue was refined by column chromatography (silica gel-ethyl acetate/benzene=1/9) and recrystallized with hexane so that 1.35 g of 5-decyl-2-(4-(5'-methoxyhexyloxy) phenyl}pyrimidine was obtained.

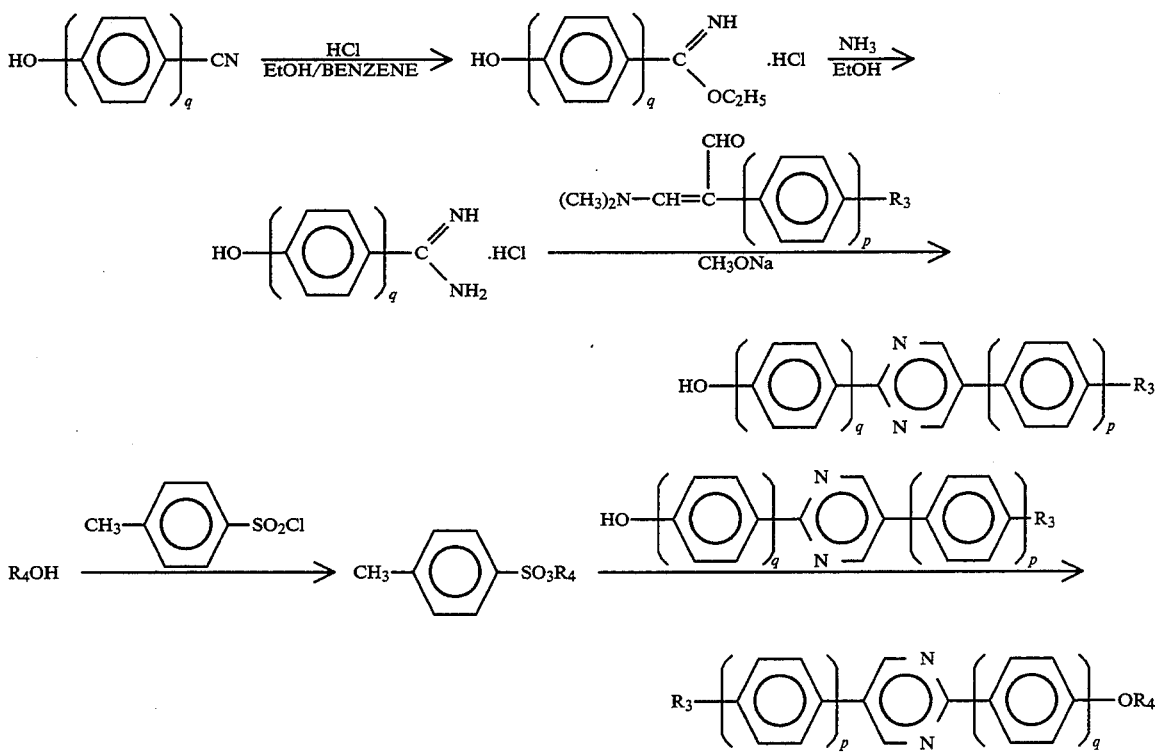

wherein $R_3$, $R_4$, p and q have the same definitions as those described above.

A representative example of a method of synthesizing a compound having the general formula (II) is described as follows.

Synthesis Example 3 (Compound No. 2-54)

1.83 g (9.6 mmol) of p-toluene sulfonic acid chloride dissolved in 5 ml of pyridine was added dropwise in Phase Transition Temperature

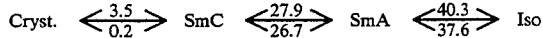

The liquid crystal compounds expressed by the above-described general formula (II) are exemplified as follows:
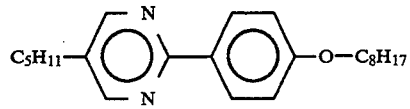 (2-1)
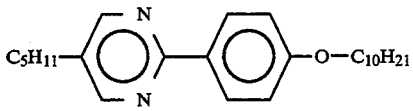 (2-2)
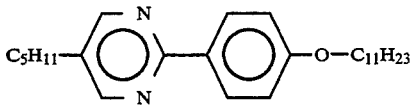 (2-3)
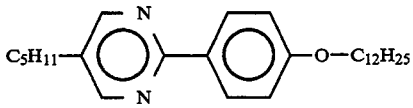 (2-4)
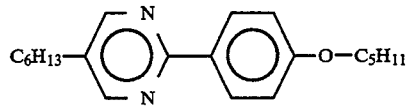 (2-5)
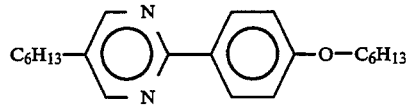 (2-6)
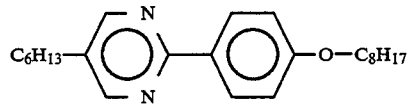 (2-7)
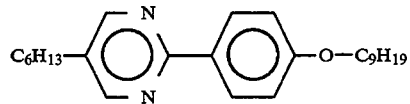 (2-8)
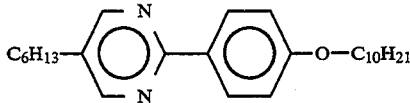 (2-9)
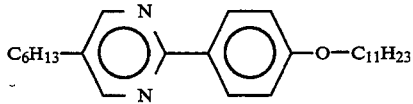 (2-10)
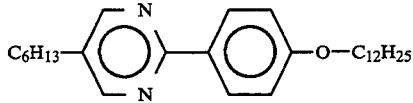 (2-11)
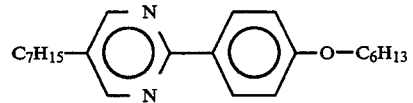 (2-12)
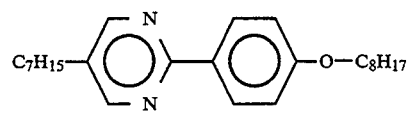 (2-13)
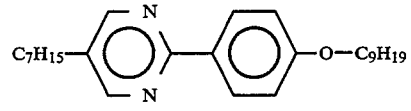 (2-14)
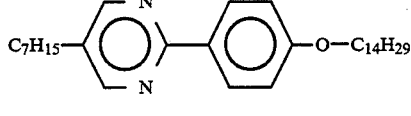 (2-15)
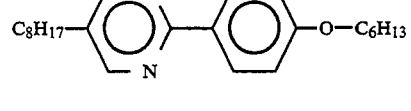 (2-16)
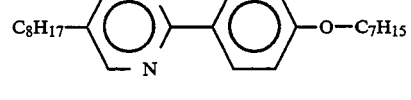 (2-17)
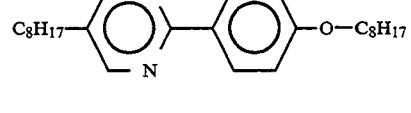 (2-18)
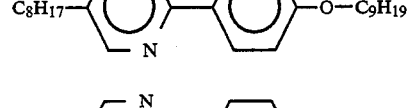 (2-19)
 (2-20)
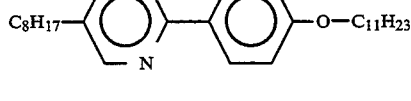 (2-21)
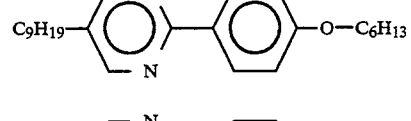 (2-22)
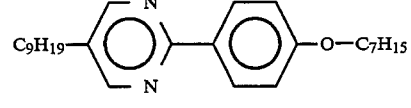 (2-23)
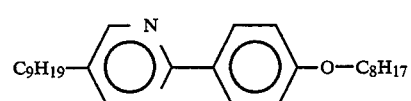 (2-24)
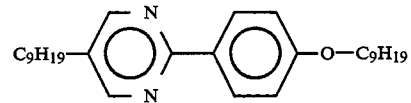 (2-25)

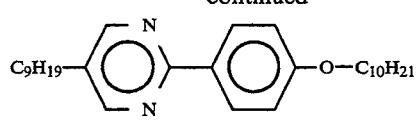 (2-26)
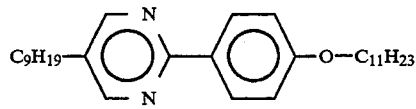 (2-27)
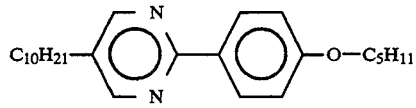 (2-28)
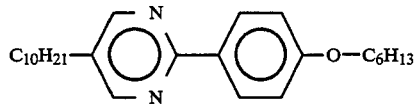 (2-29)
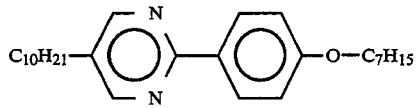 (2-30)
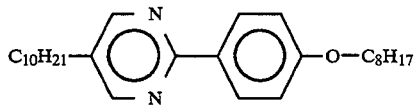 (2-31)
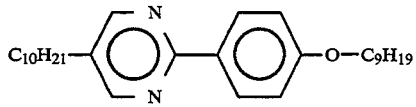 (2-32)
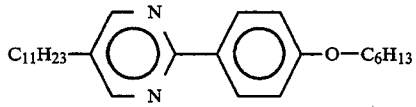 (2-33)
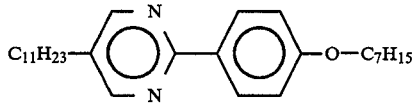 (2-34)
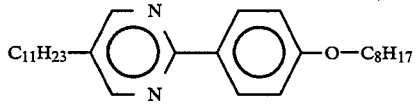 (2-35)
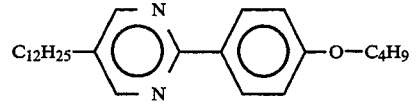 (2-36)
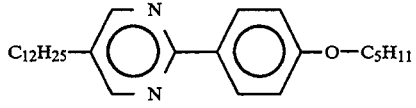 (2-37)
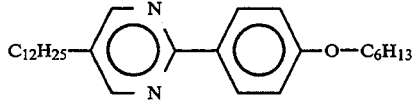 (2-38)
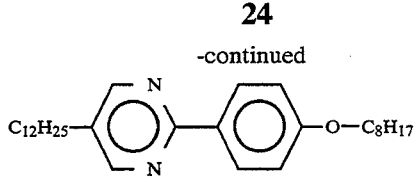 (2-39)
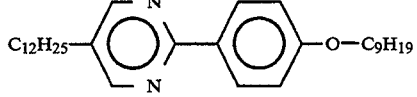 (2-40)
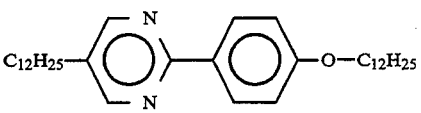 (2-41)
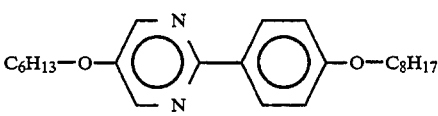 (2-42)
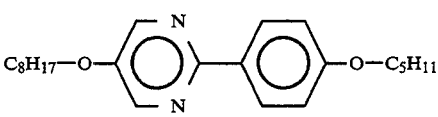 (2-43)
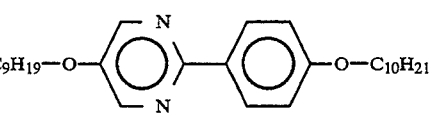 (2-44)
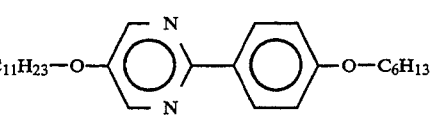 (2-45)
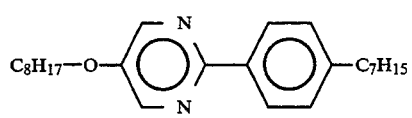 (2-46)
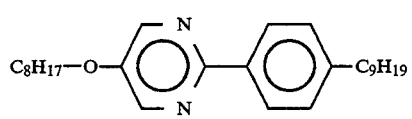 (2-47)
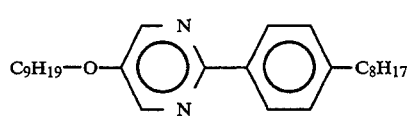 (2-48)
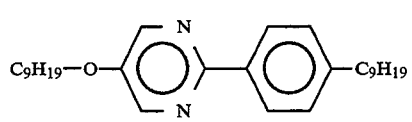 (2-49)
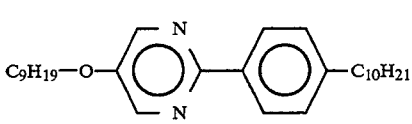 (2-50)
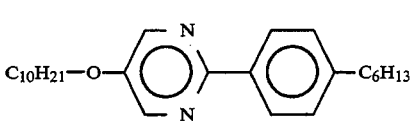 (2-51)

$$C_8H_{17}-\text{[pyrimidine]}-\text{[phenyl]}-O-(CH_2)_3-CH(CH_3)-O-C_3H_7 \quad (2\text{-}52)$$

$$C_{10}H_{21}-\text{[pyrimidine]}-\text{[phenyl]}-O-(CH_2)_3-CH(CH_3)-O-C_3H_7 \quad (2\text{-}53)$$

$$C_{10}H_{21}-\text{[pyrimidine]}-\text{[phenyl]}-O-(CH_2)_4-CH(CH_3)-O-CH_3 \quad (2\text{-}54)$$

$$C_{12}H_{25}-\text{[pyrimidine]}-\text{[phenyl]}-O-(CH_2)_4-CH(CH_3)-O-CH_3 \quad (2\text{-}55)$$

$$C_6H_{13}-\text{[pyrimidine]}-\text{[phenyl]}-O-C(=O)-C_8H_{17} \quad (2\text{-}56)$$

$$C_6H_{13}-\text{[pyrimidine]}-\text{[phenyl]}-O-C(=O)-C_{10}H_{21} \quad (2\text{-}57)$$

$$C_7H_{15}-\text{[pyrimidine]}-\text{[phenyl]}-O-C(=O)-C_8H_{17} \quad (2\text{-}58)$$

$$C_7H_{15}-\text{[pyrimidine]}-\text{[phenyl]}-O-C(=O)-C_{10}H_{21} \quad (2\text{-}59)$$

$$C_8H_{17}-\text{[pyrimidine]}-\text{[phenyl]}-O-C(=O)-C_4H_9 \quad (2\text{-}60)$$

$$C_8H_{17}-\text{[pyrimidine]}-\text{[phenyl]}-O-C(=O)-C_6H_{13} \quad (2\text{-}61)$$

$$C_8H_{17}-\text{[pyrimidine]}-\text{[phenyl]}-O-C(=O)-C_7H_{15} \quad (2\text{-}62)$$

$$C_8H_{17}-\text{[pyrimidine]}-\text{[phenyl]}-O-C(=O)-C_8H_{17} \quad (2\text{-}63)$$

$$C_8H_{17}-\text{[pyrimidine]}-\text{[phenyl]}-O-C(=O)-C_9H_{19} \quad (2\text{-}64)$$

$$C_8H_{17}-\text{[pyrimidine]}-\text{[phenyl]}-O-C(=O)-C_{10}H_{21} \quad (2\text{-}65)$$

$$C_8H_{17}-\text{[pyrimidine]}-\text{[phenyl]}-O-C(=O)-C_{12}H_{25} \quad (2\text{-}65)$$

$$C_9H_{19}-\text{[pyrimidine]}-\text{[phenyl]}-O-C(=O)-C_6H_{13} \quad (2\text{-}66)$$

$$C_9H_{19}-\text{[pyrimidine]}-\text{[phenyl]}-O-C(=O)-C_7H_{15} \quad (2\text{-}67)$$

$$C_9H_{19}-\text{[pyrimidine]}-\text{[phenyl]}-O-C(=O)-C_8H_{17} \quad (2\text{-}68)$$

$$C_9H_{19}-\text{[pyrimidine]}-\text{[phenyl]}-O-C(=O)-C_9H_{19} \quad (2\text{-}69)$$

$$C_9H_{19}-\text{[pyrimidine]}-\text{[phenyl]}-O-C(=O)-C_{12}H_{25} \quad (2\text{-}70)$$

$$C_{10}H_{21}-\text{[pyrimidine]}-\text{[phenyl]}-O-C(=O)-C_3H_7 \quad (2\text{-}71)$$

$$C_{10}H_{21}-\text{[pyrimidine]}-\text{[phenyl]}-O-C(=O)-C_4H_9 \quad (2\text{-}72)$$

$$C_{10}H_{21}-\text{[pyrimidine]}-\text{[phenyl]}-O-C(=O)-C_5H_{11} \quad (2\text{-}73)$$

$$C_{10}H_{21}-\text{[pyrimidine]}-\text{[phenyl]}-O-C(=O)-C_6H_{13} \quad (2\text{-}74)$$

$$C_{10}H_{21}-\text{[pyrimidine]}-\text{[phenyl]}-O-C(=O)-C_7H_{15} \quad (2\text{-}75)$$

$$C_{10}H_{21}-\text{[pyrimidine]}-\text{[phenyl]}-O-C(=O)-C_8H_{17} \quad (2\text{-}76)$$

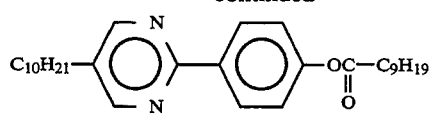 (2-77)
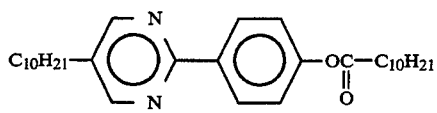 (2-78)
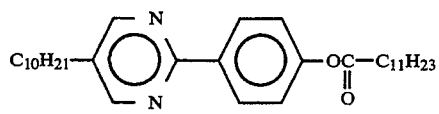 (2-79)
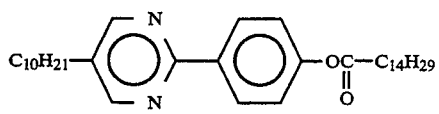 (2-80)
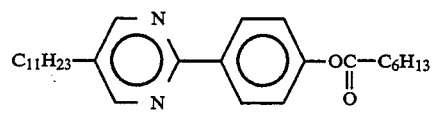 (2-81)
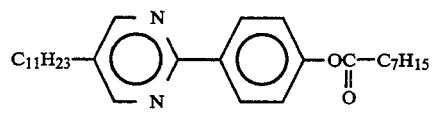 (2-82)
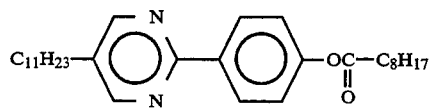 (2-83)
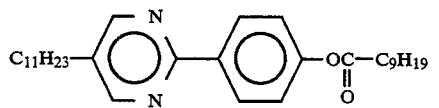 (2-84)
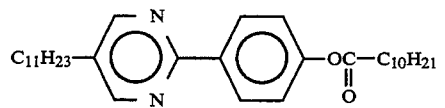 (2-85)
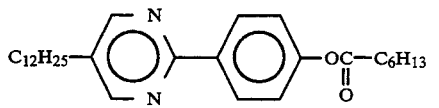 (2-86)
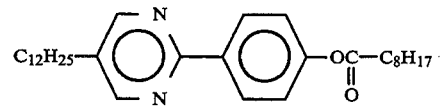 (2-87)
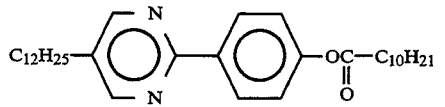 (2-88)
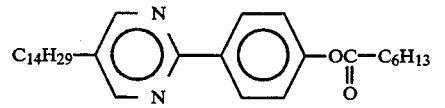 (2-89)

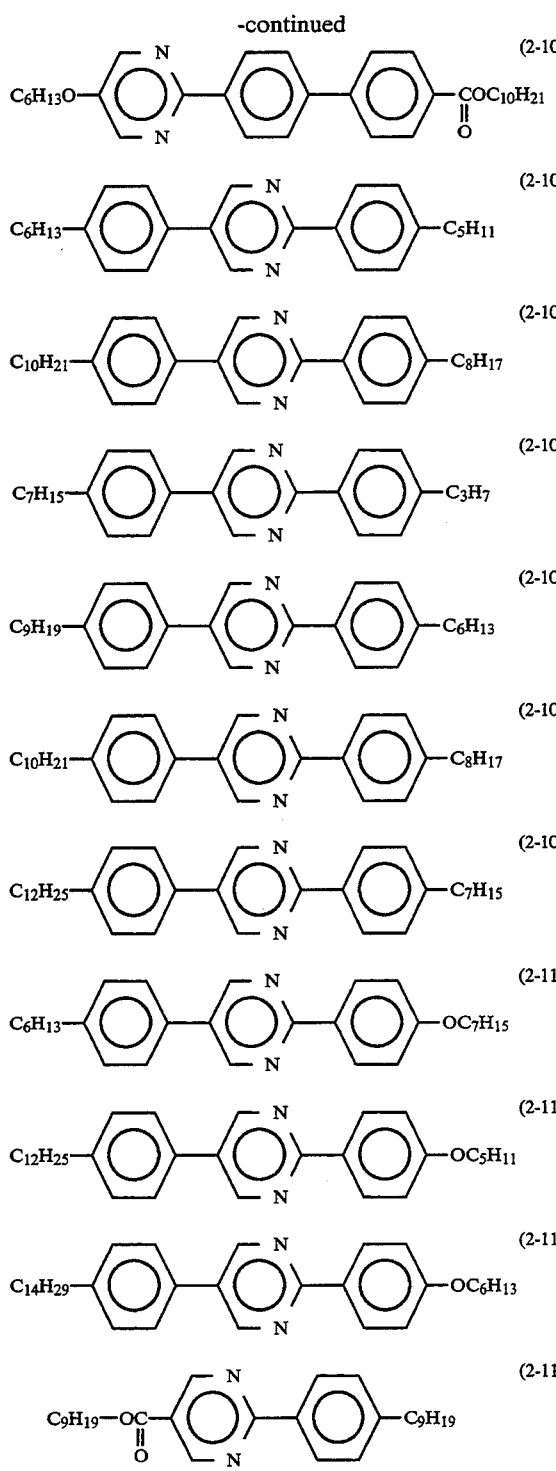
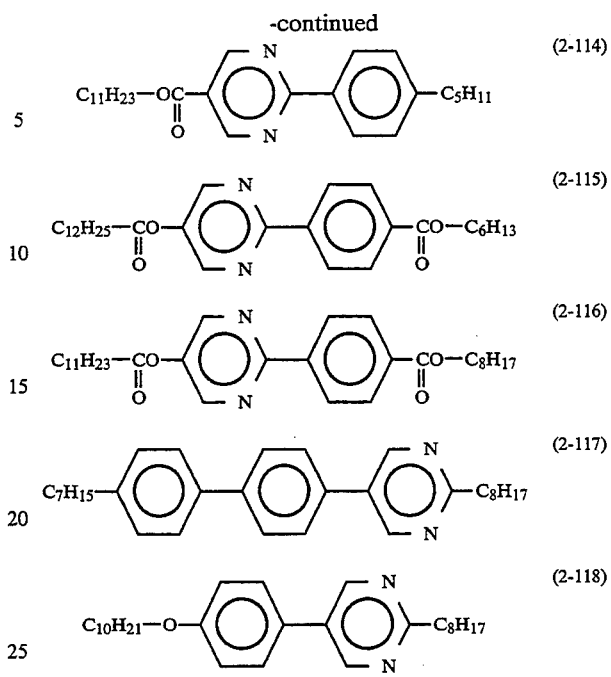

The compounds having the general formula (III) can be obtained by, for example, a method described in Japanese Patent Laid-Open No. 63-22042 or a method described in Japanese Patent Laid-Open No. 63-122651.

A typical example of synthesizing a compound having the general formula (III) is described below.

Synthesis Example 4 (Compound No. 3-28)

A solution was obtained by dissolving 1.00 g (4.16 mM) of p-2-fluorooctyloxyphenol in 10 ml of pyridine and 5 ml of toluene. 1.30 g (6.00 mM) of trans-4-n-pentylcyclohexane carbonic acid chloride dissolved in 5 ml of toluene was added dropwise to the solution at 5° C. or lower for 20 to 40 minutes. The resultant mixture was stirred at room temperature for one night so that a white precipitate was obtained.

After the above-described reaction, the resultant mixture was extracted with benzene, and the thus formed benzene layer was washed with distilled water. The benzene layer was dried with magnesium sulfate so that benzene was removed by distillation. Then, the residue was refined by the silica gel column chromatography and recrystallized with ethanol/methanol so that 1.20 g (2.85 mM) of trans-4-n-pentylcyclohexane carbonic acid-p-2-fluorooctyloxyphenyl ester (yield 68.6%)

NMR data (ppm) 0.83 to 2.83 ppm (34H, m) 4.00 to 4.50 ppm (2H, q) 7.11 ppm (4H, s) IR data (cm$^{-1}$) 3456, 2828, 2852, 1742, 1508, 1470, 1248, 1200, 1166, 1132, 854

Phase Transition Temperature

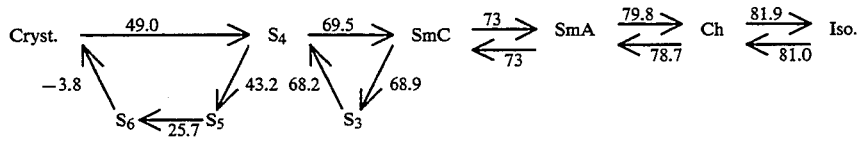

wherein $S_3$, $S_4$, $S_5$ and $S_6$ represent the phases having higher order degree than that of SmC*.

Example 5 (Compound No. 3-85)

0.40 g (3.0 mmol) (—)-2-fluoroheptanol and 1.00 g (13 mmol) of dry pyridine were placed in a container before they were stirred for 30 minutes while being cooled with ice. 0.69 g (3.6 mmol) of p-toluene sulfonic acid chloride was added to the thus obtained solution before being stirred for 5 hours. After the completion of the reaction, 10 ml of 1N HCl was added and the resultant mixture was extracted twice with 10 ml of methylene chloride. Then, the extracted methylene chloride layer was washed once with 10 ml of distilled water. Sodium sulfate anhydride was then added to dry the thus obtained methylene chloride layer. Then, the methylene chloride solvent was removed so that 0.59 g (2.0 mmol) (+)-2-fluoroheptyl p-toluene sulfonic acid ester was obtained.

The yield was 66%. The specific rotation and IR data of the product were as follows:

Specific rotation $[\alpha]_D^{26.4}+2.59°$ (c=1, CHCl$_3$)
Specific rotation $[\alpha]_{435}^{23.6}+9.58°$ (c=1, CHCl$_3$)
IR (cm$^{-1}$): 2900, 2850, 1600, 1450, 1350, 1170, 1090, 980, 810, 660, 550

0.2 ml of 1-butanol was added to 0.43 g (1.5 mmol) of the thus obtained (+)-2-fluoroheptyl p-toluene sulfonic acid ester and 0.28 g (1.0 mmol) of 5-octyl-2-(4-hydroxyphenyl) pyrimidine before they were stirred sufficiently. An alkaline solution which had been prepared by dissolving 0.048 g (1.2 mmol) of sodium hydroxide in 1.0 ml of 1-butanol was quickly injected into the above-described solution before they were heated and circulated. After the completion of the reaction, 10 ml of distilled water was added and the resultant mixture was extracted twice with 10 ml and 5 ml of benzine respectively. Then, the thus obtained extracted liquid was dried by properly adding sodium sulfate anhydride. After it had been dried, the solvent was removed by distillation. The resultant residue was refined by silica gel column chromatography (chloroform) so that 0.17 g (0.43 mmol) of (+)-5-octyl-2-[4-(2-fluoroheptyloxy) phenyl]pyrimidine was obtained.

The yield was 43% and the following specific rotation and IR data were obtained.

Specific rotation $[\alpha]_D^{25.6}+0.44°$ (c=1, CHCl$_3$)
Specific rotation $[\alpha]_{435}^{22.4}+4.19°$ (c=1, CHCl$_3$)
IR (cm$^{-1}$): 2900, 2850, 1600, 1580, 1420, 1250 1160, 800, 720, 650, 550

The liquid crystal compounds expressed by the above-described general formula (III) are exemplified as follows:

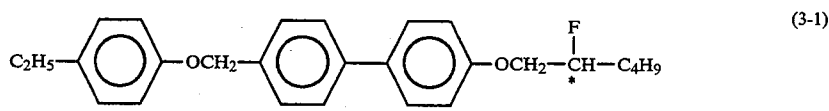

(3-1)

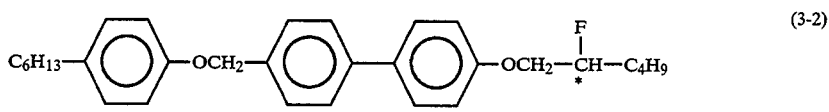

(3-2)

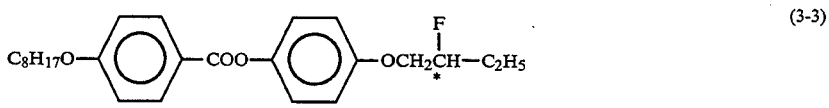

(3-3)

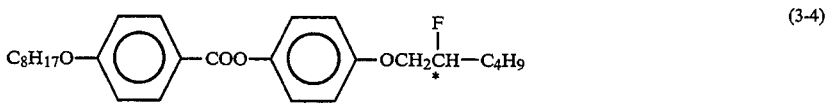

(3-4)

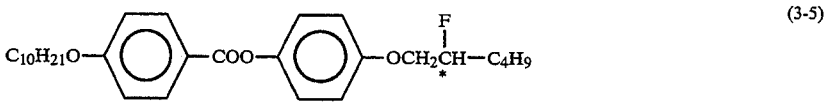

(3-5)

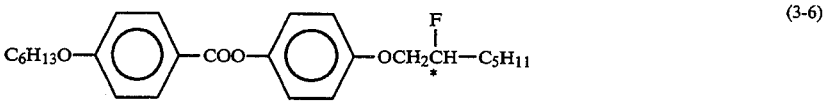

(3-6)

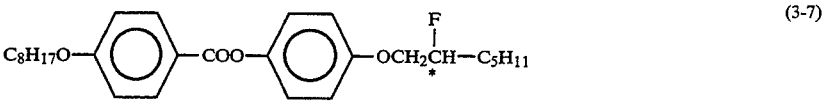

(3-7)

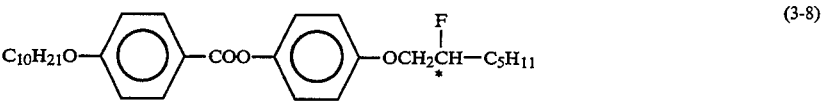

(3-8)

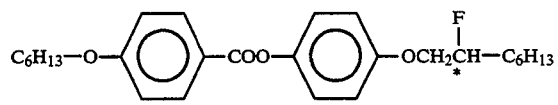 (3-9)
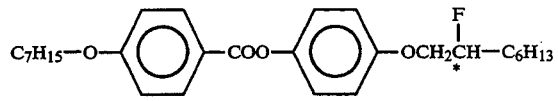 (3-10)
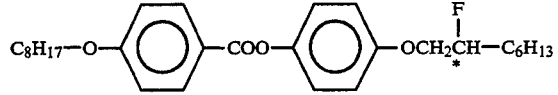 (3-11)
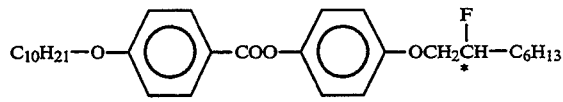 (3-12)
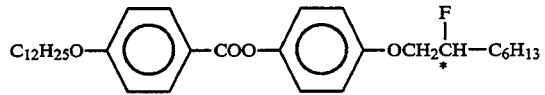 (3-13)
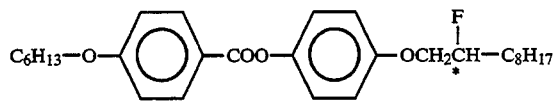 (3-14)
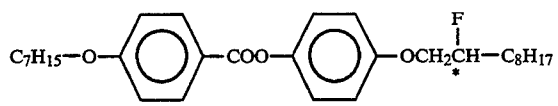 (3-15)
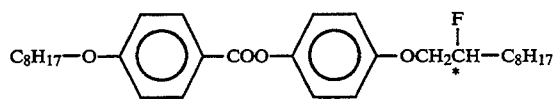 (3-16)
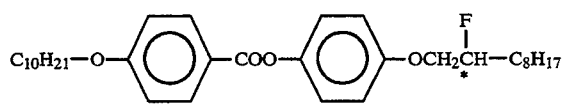 (3-17)
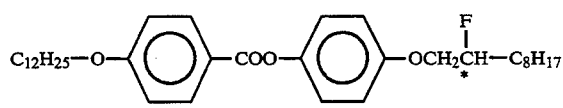 (3-18)
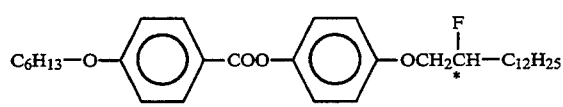 (3-19)
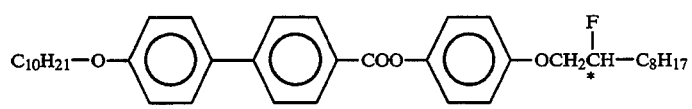 (3-20)
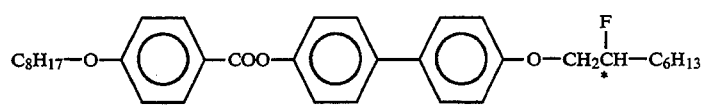 (3-21)
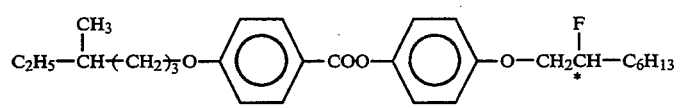 (3-22)

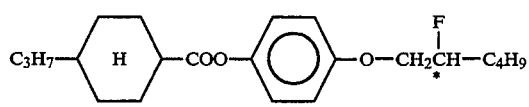 (3-23)
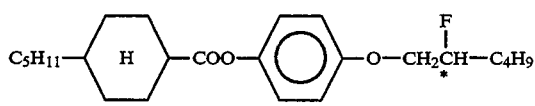 (3-24)
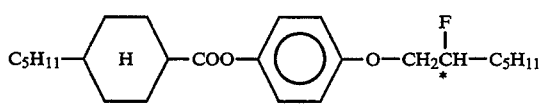 (3-25)
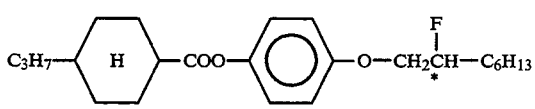 (3-26)
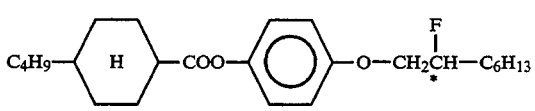 (3-27)
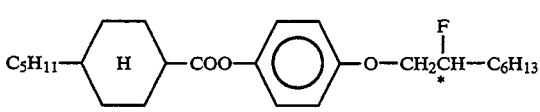 (3-28)
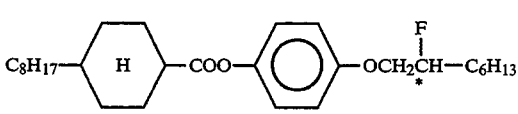 (3-29)
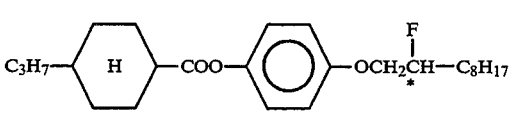 (3-30)
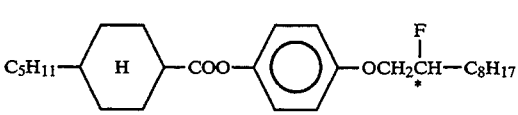 (3-31)
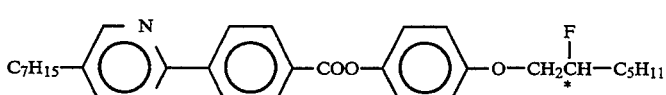 (3-32)
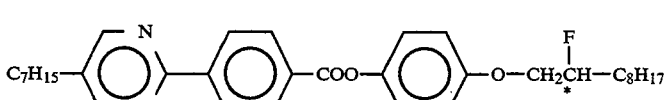 (3-32)
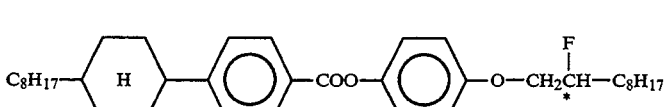 (3-33)
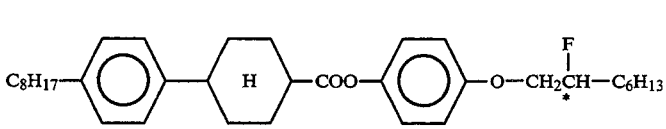 (3-34)

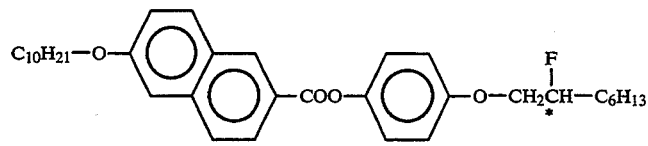
(3-35)
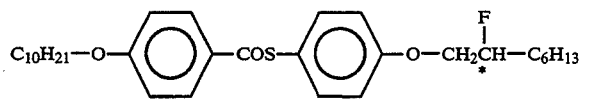
(3-36)
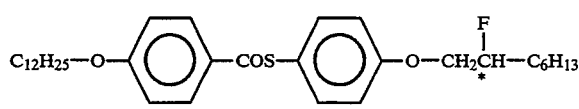
(3-37)
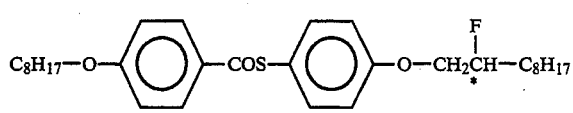
(3-38)
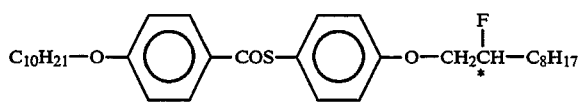
(3-39)
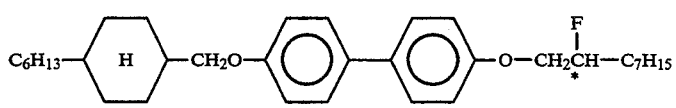
(3-40)
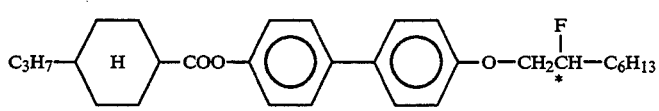
(3-41)
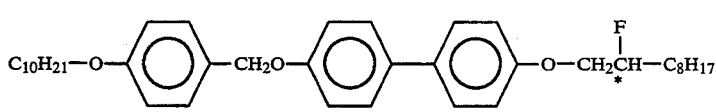
(3-42)
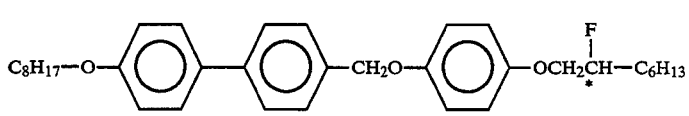
(3-43)
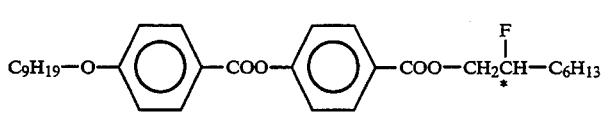
(3-44)
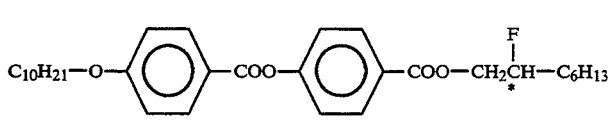
(3-45)
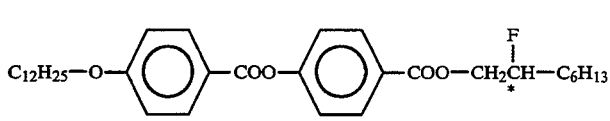
(3-46)
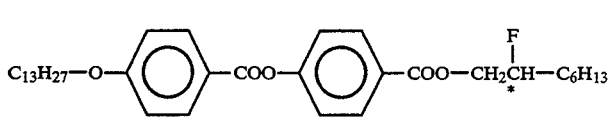
(3-47)

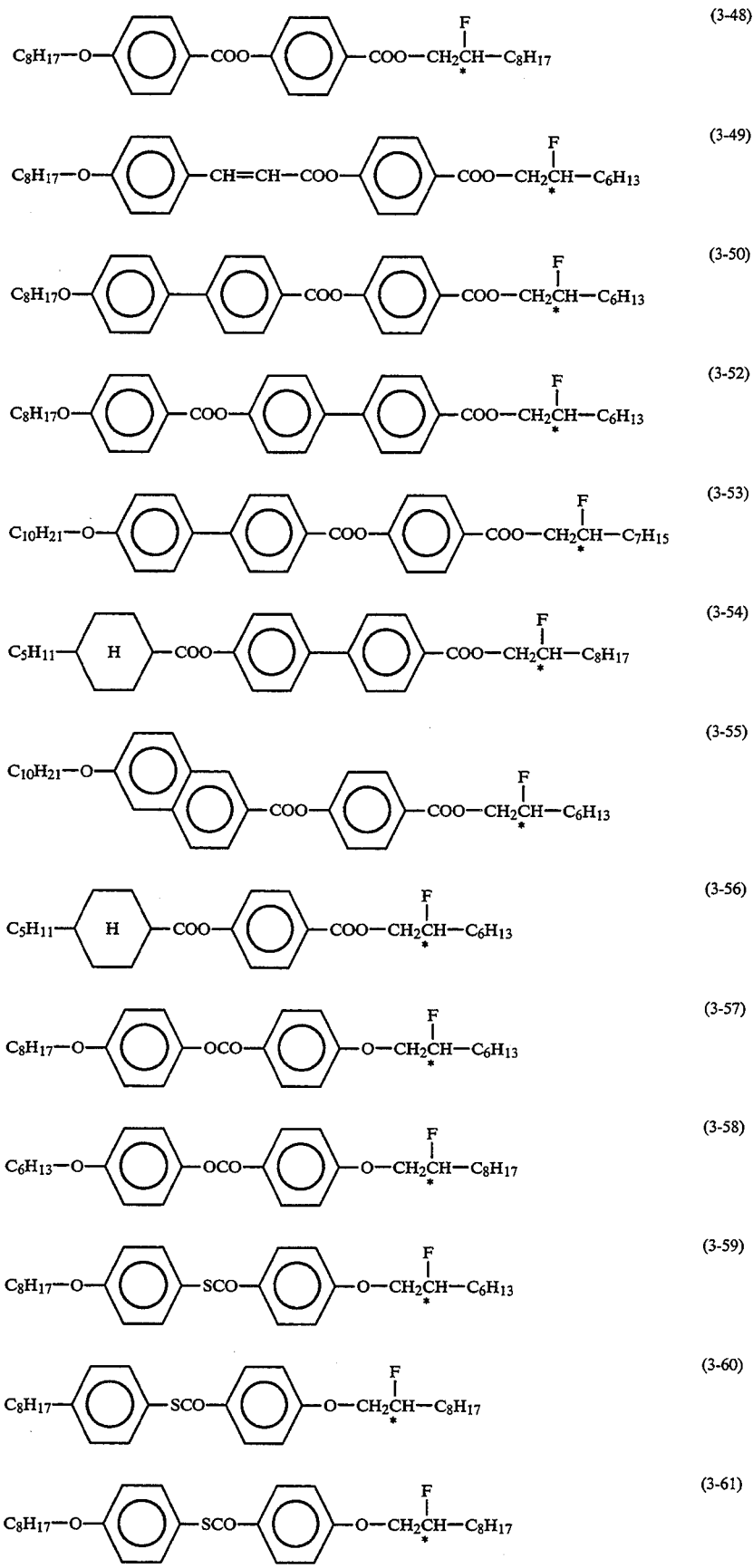

-continued
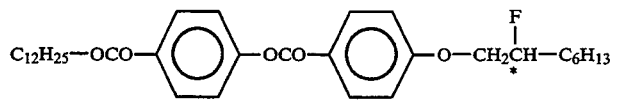 (3-62)
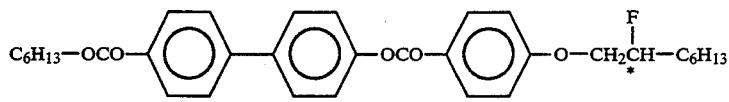 (3-63)
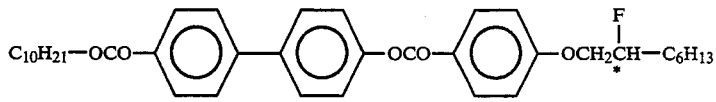 (3-64)
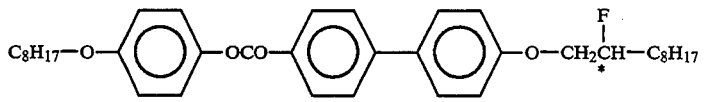 (3-65)
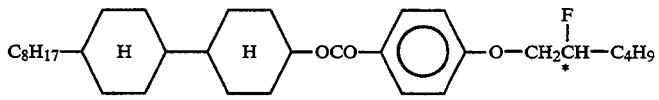 (3-66)
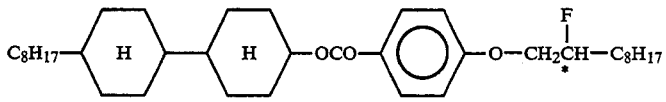 (3-67)
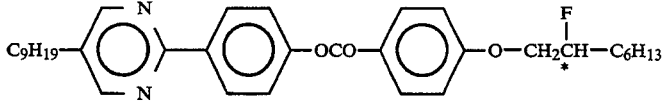 (3-68)
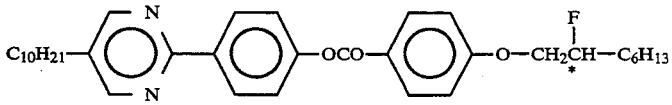 (3-69)
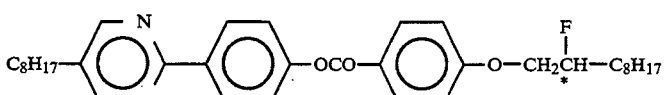 (3-70)
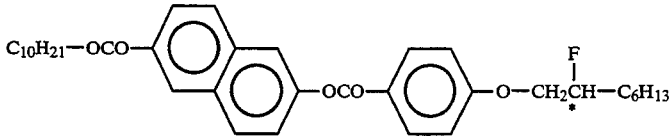 (3-71)
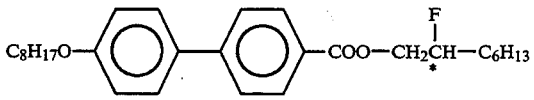 (3-72)
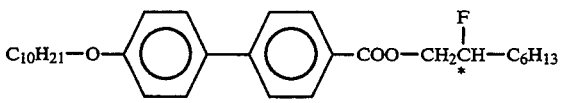 (3-73)
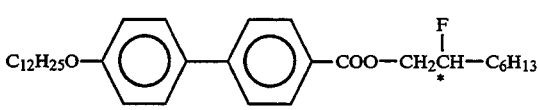 (3-74)

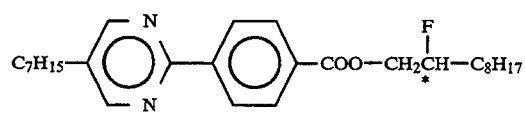 (3-75)
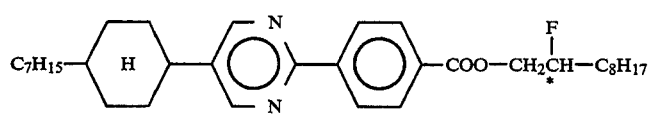 (3-76)
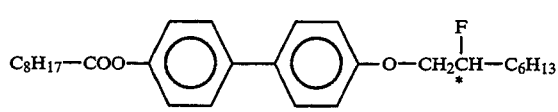 (3-77)
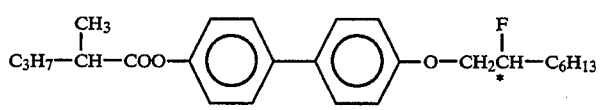 (3-78)
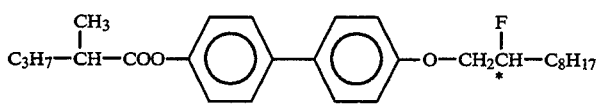 (3-79)
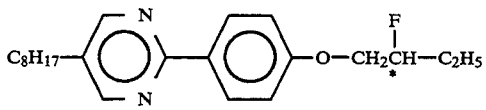 (3-80)
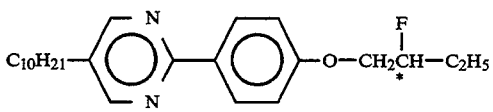 (3-81)
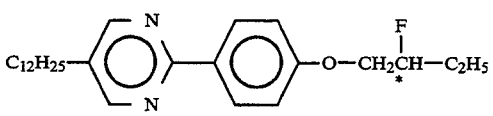 (3-82)
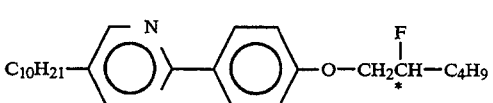 (3-83)
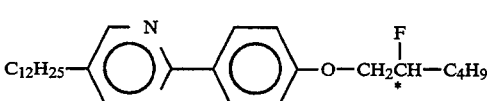 (3-84)
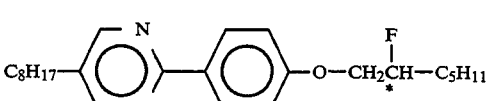 (3-85)
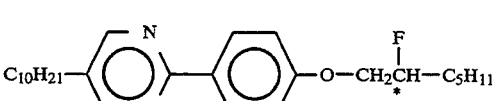 (3-86)
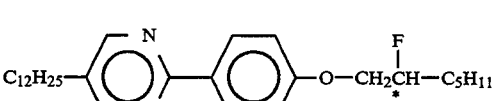 (3-87)

-continued
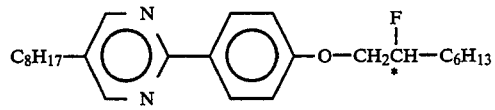 (3-88)
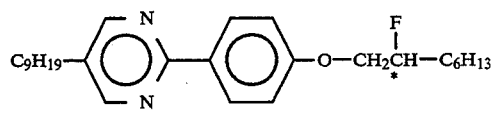 (3-89)
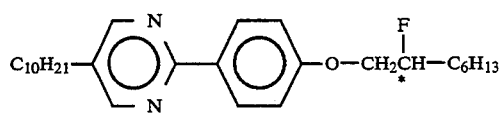 (3-90)
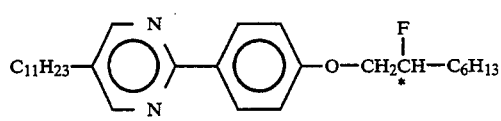 (3-91)
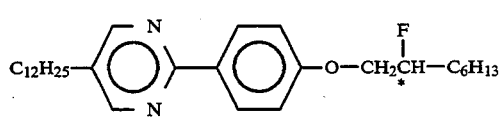 (3-92)
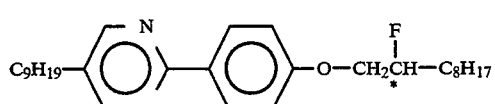 (3-93)
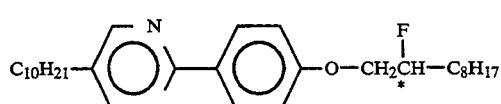 (3-94)
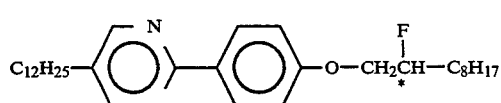 (3-95)
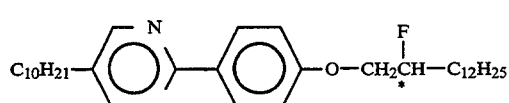 (3-96)
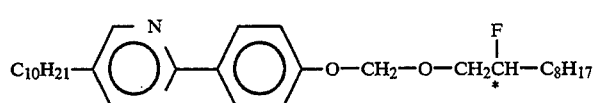 (3-97)
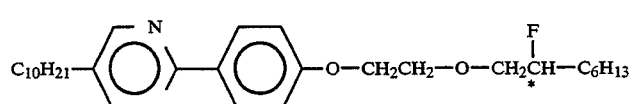 (3-98)
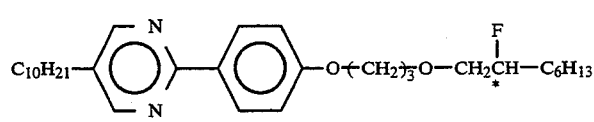 (3-99)
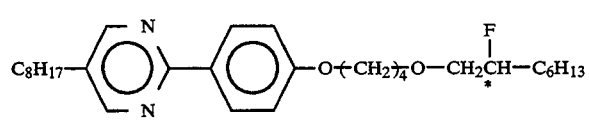 (3-100)

-continued
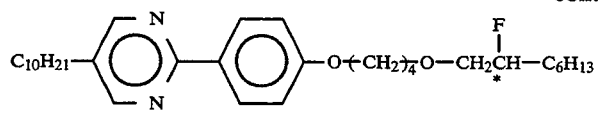 (3-101)
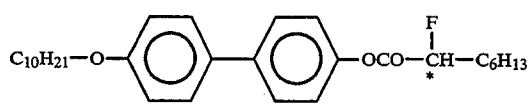 (3-102)
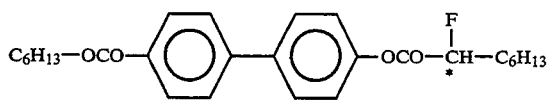 (3-103)
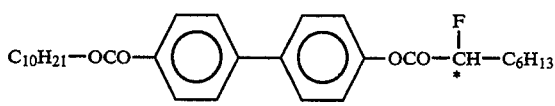 (3-104)
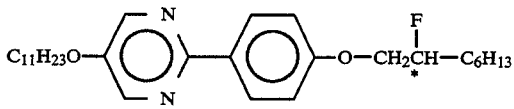 (3-105)
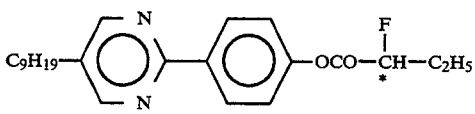 (3-106)
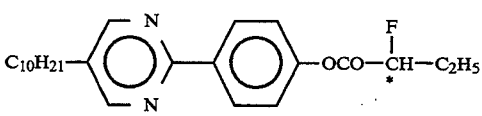 (3-107)
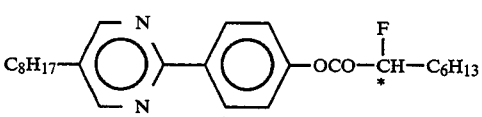 (3-108)
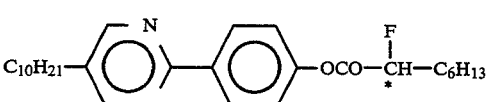 (3-109)
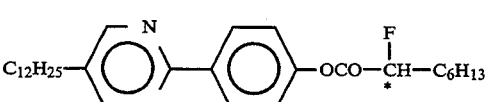 (3-110)
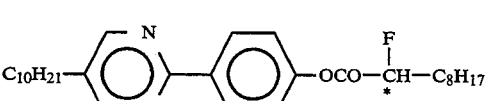 (3-111)
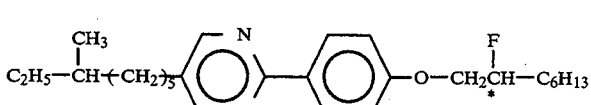 (3-112)
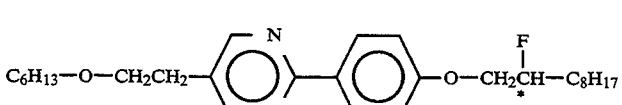 (3-113)
According to the present invention, it is preferable that the composition ratio of a liquid crystal compound having the general formula (I) to at least one type of other liquid crystal compounds to be described later or a liquid composition (to be called a "liquid material" hereinafter) be 1 to 300 parts by weight, preferably 2 to 200 parts by weight with respect to 100 parts by weight of the liquid material.

In the embodiment where a mixture of two or more types of the liquid crystal compounds having the general formula (I) according to the present invention are used, it is preferable that the composition ratio of the mixture be 1 to 500 parts, preferably 2 to 200 parts by weight with respect to 100 parts by weight of the liquid material.

It is preferable that the composition ratio of a mixture of a liquid crystal compound having the general formula (I) and that having the general formula (II) or that having the general formula (I) and that having the general formula (III) be 1 to 300 parts, preferably 2 to 200 parts by weight with respect to 100 parts by weight of the liquid material.

In the embodiment where two or more types of at least one of the liquid crystal compound having the general formula (I) and that having the general formula (II) or that having the general formula (I) and that having the general formula (III) are used in the mixture, it is preferable that the composition ratio of the mixture be 1 to 500 parts, preferably 2 to 200 parts by weight with respect to 100 parts by weight of the liquid material.

It is preferable that the composition ratio of a mixture of a liquid crystal compound having the general formula (I), that having the general formula (II) and that having the general formula (III) be 1 to 300 parts, preferably 2 to 200 parts by weight with respect to 100 parts by weight of the liquid material.

In the embodiment where two or more types of at least one of the liquid crystal compounds having the general formulas (I), (II) and (III) are used in the mixture, it is preferable that the composition ratio of the mixture be 1 to 500 parts, preferably 2 to 200 parts by weight with respect to 100 parts by weight of the liquid material.

It is preferable that the liquid composition according to the present invention be a ferroelectric liquid composition, preferably a ferroelectric chiral smectic liquid composition.

Other compounds according to the present invention have the following general formulas (IV) to (VIII):

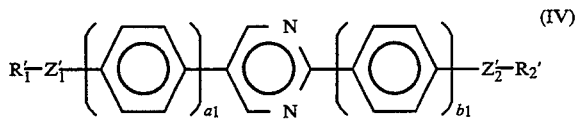

wherein $R_1'$ and $R_2'$ each is a straight chain or branch alkyl group having 1 to 18 carbons in which one —CH$_2$— group or two or more —CH$_2$— groups which are not positioned adjacently to one another may be replaced by —CHCN—, —C—(CH$_3$)—CN—, —CHCl— or —CHBr—, and in which at least one —CH$_2$— group except for the —CH$_2$— groups which are directly bonded to $Z_1'$ and $Z_2'$ may be replaced by —O—,

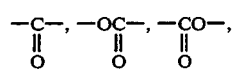

at least one of $R_1'$ and $R_2'$ has optical activity, $Z_1'$ and $Z_2'$ each is a single bond —O—, —O—,

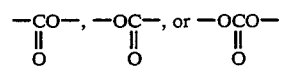

and $a_1$ and $b_1$ each is 0, 1 or 2 with the proviso that $a_1+b_1$ is 1 or 2.

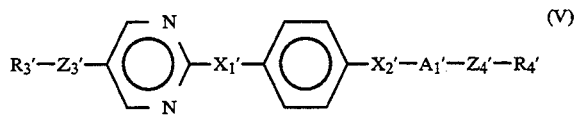

where $R_3'$ and $R_4'$ each is straight chain or branch alkyl group having 1 to 18 carbons in which one —CH$_2$— group or two or more —CH$_2$— groups which are not positioned adjacently to one another may be replaced by —CHCN—, —C—(CH$_3$)—CN—, —CHCl— or —CHBr—, and in which at least one —CH$_2$— group except for the —CH$_2$— groups which are directly bonded to $Z_3'$ and $Z_4'$ may be replaced by —O—,

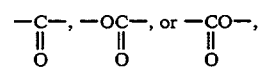

$Z_3'$ and $Z_4'$ each is a single bond, —O—,

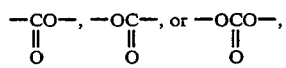

$X_1'$ and $X_2'$ each is a single bond

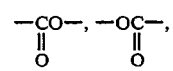

—CH$_2$O—, or —OCH$_2$— wherein $X_1'$ and $X_2'$ cannot both be single bonds, $A_1'$ is

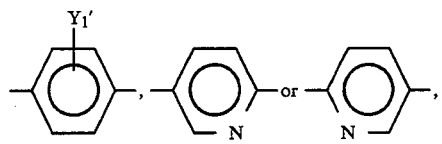

wherein $Y_1'$ is a hydrogen atom, a halogen atom, CH$_3$ or CF$_3$.

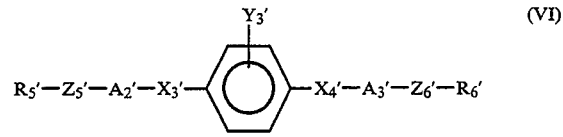

wherein $R_5'$ and $R_6'$ each is a straight chain or branch alkyl group having 1 to 18 carbons in which one —CH$_2$— group or two or more —CH$_2$— groups which are not positioned adjacently to one another may be replaced by —CHCN—, —C—(CH$_3$)—CN—, —CHCl— or —CHBr—, and in which at least one —CH$_2$— group except for the —CH$_2$— groups which are directly bonded to $Z_5'$ and $Z_6'$ may be replaced by —O—,

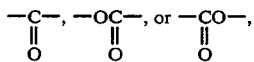

A₂' is

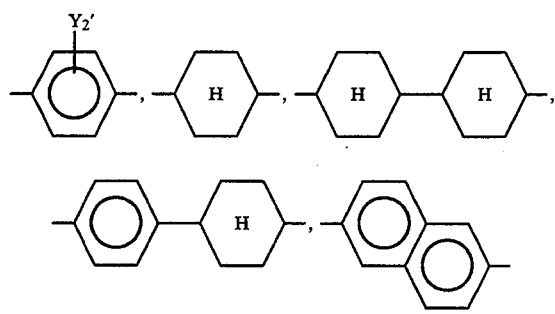

or a single bond, A₃' is

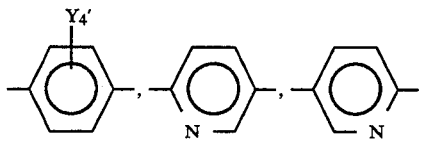

or a single bond, wherein A₂' and A₃' cannot both be single bonds, Z₅' and Z₆' each is a single bond,

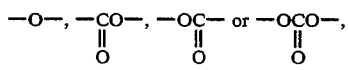

X₃' and X₄' each is a single bond,

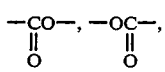

or, —CH₂O— wherein when A₂' is a single bond X₃' is a single bond, when A₃' is a single bond, X₄' is a single bond and Y₂', Y₃' and Y₄' each is a hydrogen atom, halogen atom, CH₃ or CF₃.

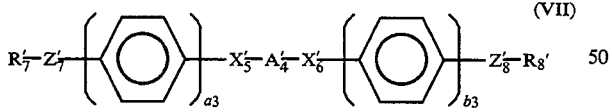 (VII)

wherein R₇' and R₈' each is a straight chain or branch alkyl group having 1 to 18 carbons in which one —CH₂— group or two or more —CH₂— groups which are not positioned adjacently to one another may be replaced by —CHCN—, —C—(CH₃)—CN—, —CHCl— or —CHBr—, and in which at least one —CH₂— group except for the —CH₂— groups which are directly bonded to Z₇' and Z₈' may be replaced by —O—,

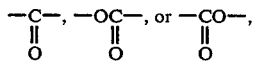

A₄' is

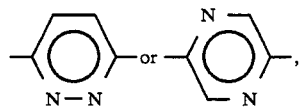

Z₇' and Z₈' each is a single bond, —O—,

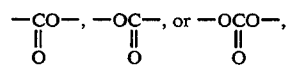

X₅' and X₆' each is a single bond

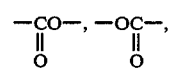

—CH₂O—, or —OCH₂—, and a₃ and b₃ each is 0 or 1 with the proviso that a₃ and b₃ cannot both be 0.

$$R_9'-Z_9'-A_5'-X_7'-A_6'-Z_{10}'-\overset{CF_3}{\underset{*}{CH}}-X_8'-R_{10}' \quad \text{(VIII)}$$

wherein R₉' is a straight chain or branch alkyl group having 1 to 18 carbons, R₁₀' is a straight chain or branch alkyl group having 1 to 16 carbons, A₅' is

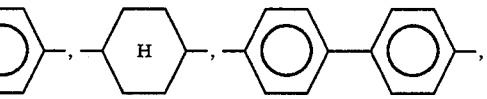

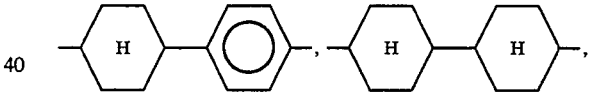

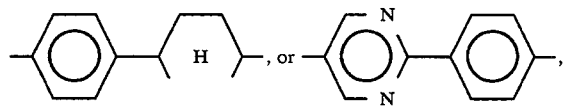

A₆' is

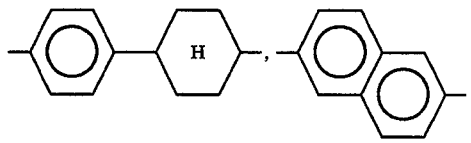

X₇' is a single bond,

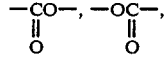

—CH₂O—, or —OCH₂— X₈' is a single bond or

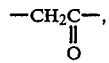

Z₉' is a single bond, —O—,

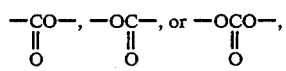
$Z_{10}'$ is
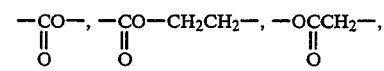
or —O—CH$_2$CH$_2$— and C* designates an optically active and asymetry carbon atom.
Preferred compounds having the formulas (IV) to (VIII) are exemplified by the following compounds (IVa) to (VIIIe).
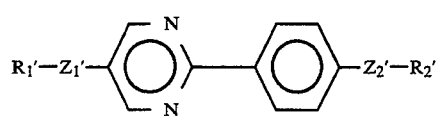 (IV a)
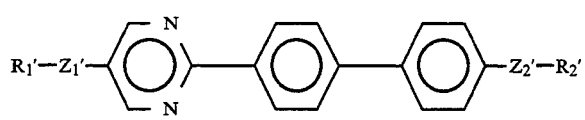 (IV b)
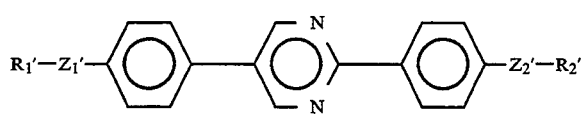 (IV c)
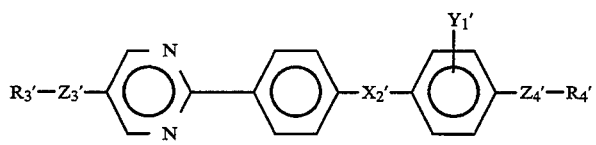 (V a)
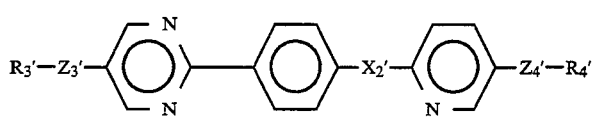 (V b)
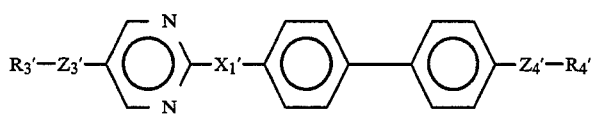 (V c)
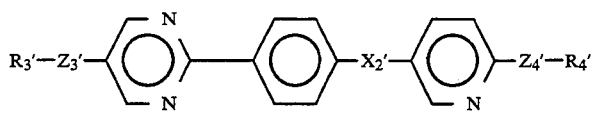 (V d)
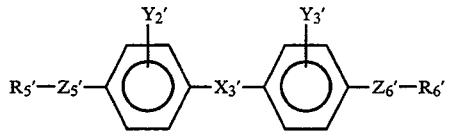 (VI a)
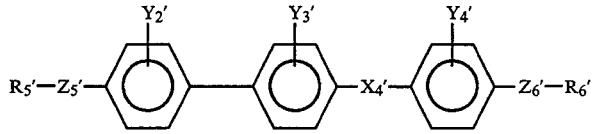 (VI b)
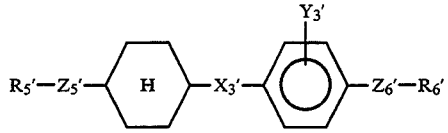 (VI c)

-continued
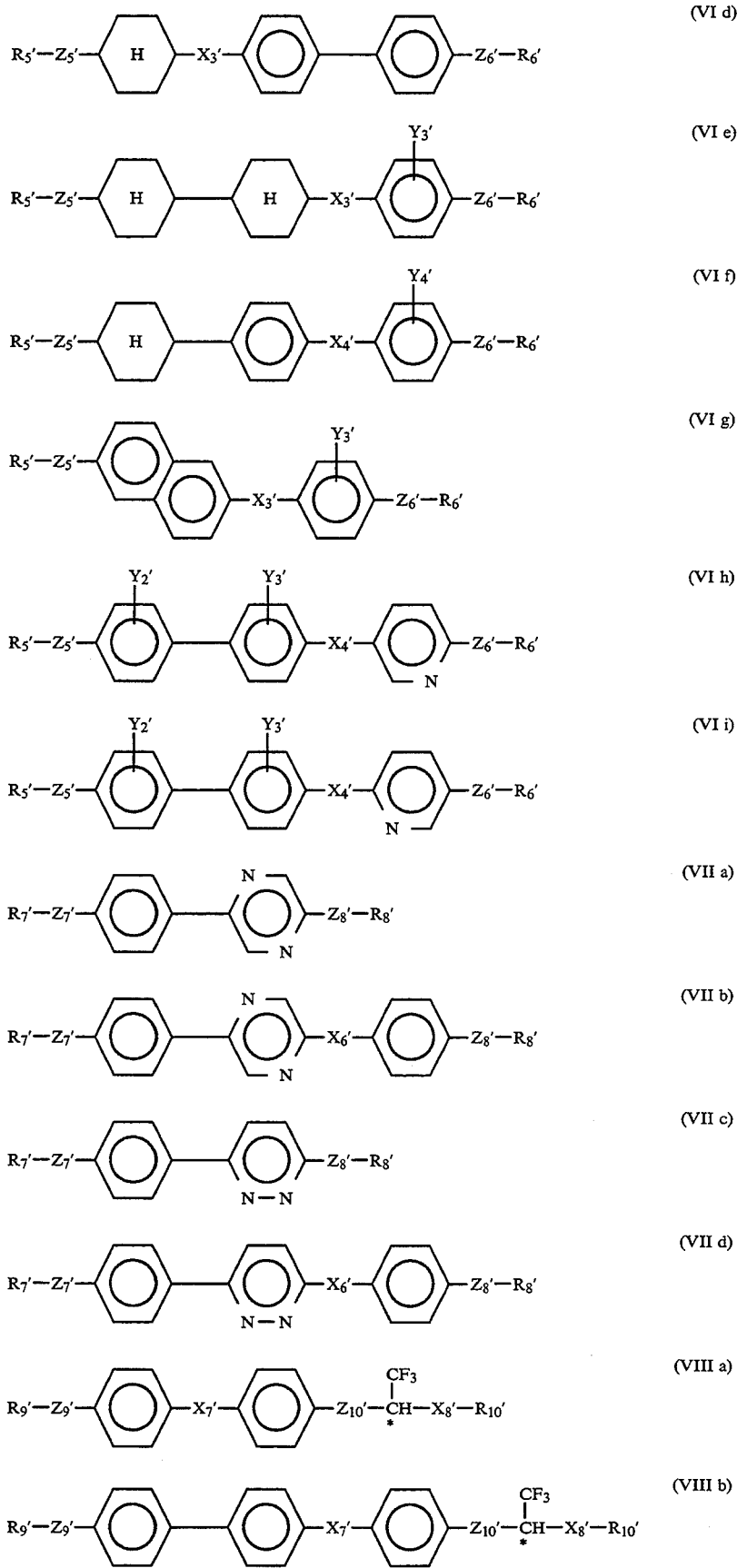

-continued

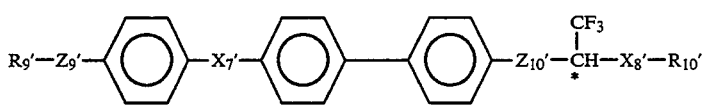
(VIII c)

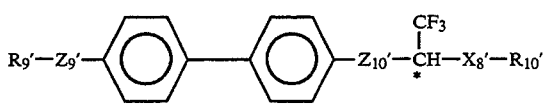
(VIII d)

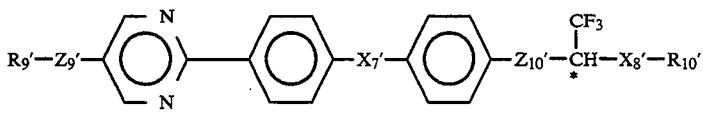
(VIII e)

It is preferable that the ferroelectric liquid crystal layer of the ferroelectric liquid crystal device according to the present invention be processed in such a manner that the ferroelectric liquid crystal composition, which has been prepared as described above, is, under a negative pressure, heated to the temperature which is the same as that of the isotropic liquid so as to be enclosed into a device cell. Then, it is gradually cooled so as to form the liquid crystal layer before the pressure level is returned to the atmospheric pressure.

FIG. 1 is schematic cross sectional view which illustrates the structure of ferroelectric liquid crystal device having the ferroelectric liquid crystal layer according to the present invention.

Referring to FIG. 1, reference numeral 1 represents a ferroelectric liquid crystal layer, 2 represents a glass substrate, 4 represents an insulating orientation-control layer, 5 represents a spacer, 6 represents a lead wire, 8 represents a polarizing plate and 9 represents a light source.

Each of the two glass plates 2 is covered with a transparent electrode 3 formed by a thin film made of $In_2O_3$, $SnO_2$ or ITO (Indium-Tin Oxide) or the like. On the transparent electrode 3, the insulating orientation control layer 4 is manufactured by rubbing a high polymer thin film such as polyimide with a gauze or an acetate embedded cloth so as to orient the liquid crystal in the rubbing direction. The insulating layer is made of any of the following materials: a silicone nitride, silicone carbide containing hydrogen, silicone oxide, boron nitride, boron nitride containing hydrogen, cerium oxide, aluminum oxide, zirconia oxide, titanium oxide and magnesium fluoride. On the thus formed insulating layer, the insulating orientation-control layer may be formed by two layers made of any of the following organic insulating materials or a single layer made of the inorganic insulating orientation-control layer or a single layer made of the organic insulating orientation-control layer. The organic insulating materials are selected from polyvinyl alcohol, polyimide, polyamide imide, polyester imide, polyparaxylene, polyester, polycarbonate, polyvinyl acetal, polyvinyl chloride, polyvinyl acetate, polyamide, polystyrene, cellulose resin, melamine resin, urea resin, acrylic resin or a photoresist resin. In the embodiment where the insulating orientation-control layer is made of the inorganic material, it can be formed by the evaporation method. In the embodiment where the same is made of the organic material, a solution obtained by dissolving the organic insulating material or a precursor solution (0.1 to 0.20 wt %, preferably 0.2 to 10 wt % in the solvent) is employed which can be applied by the spinner coating method, dipping method, screen printing method, spray method or the roll coating method or the like before it is hardened under a predetermined hardening condition (for example, while being heated) so that the insulating orientation-control layer can be formed.

The thickness of the insulating orientation-control layer 4 is arranged to be 50Å to 1 μm, preferably 100Å to 3000Å, further preferably 100Å to 1000Å.

The two glass substrates 2 are held so as to keep a predetermined interval by the spacer 5. For example, silica beads or alumina beads having a predetermined diameter is held by the two glass substrates and the thus formed structure is sealed by a sealant, for example, an epoxy adhesive. Another structure may be employed in which a high polymer film or a glass fiber is employed to serve as the spacer. The ferroelectric liquid crystal is enclosed between the two glass substrates.

The thickness of the ferroelectric liquid crystal layer 1 to which the ferroelectric liquid crystal has been enclosed is, usually, 0.5 to 20 μm, preferably 1 to 5 μm.

The transparent electrode 3 is electrically connected with an external power source 7 through a lead wire.

The polarizing plate 8 is applied to the outer surface of each of the glass plates 2.

Since the liquid crystal device shown in FIG. 1 is a transparent type, light source 9 is provided.

Figure 2:
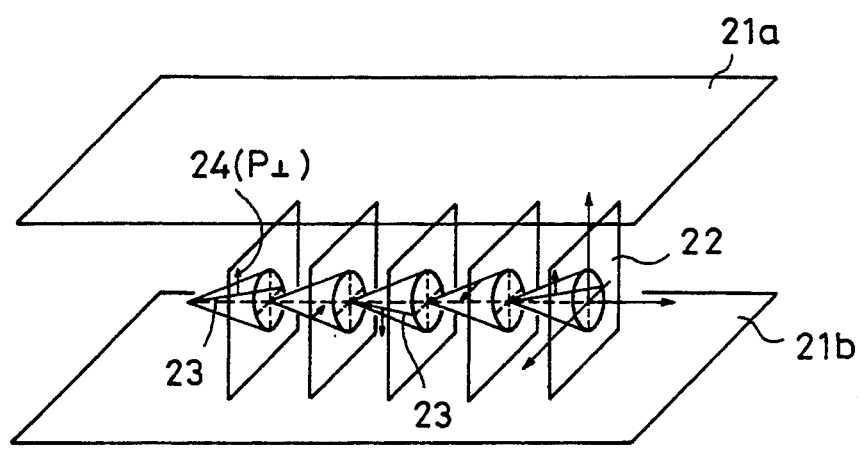
FIGS. 2 and 3 are perspective views which schematically illustrate an example of a device cell for the purpose of describing the operation of the ferroelectric liquid crystal device.

FIG. 2 is a schematic view which illustrates the structure of the cell for the purpose of describing the operation of the ferroelectric liquid crystal device. Reference numerals 21a and 21b represent substrates (glass plates) coated with the transparent electrode formed by a thin film made of $In_2O_3$, $SnO_2$ or ITO (Indium-Tin Oxide). Furthermore, liquid crystal of the SmC* or SmH* phase which has been oriented in such a manner that the liquid crystal molecule layer 22 is positioned perpendicularly to the surface of the glass plate is enclosed in the space between the two glass plates 21a and 21b. A bold line 23 designates the liquid crystal molecule which has a dipole moment (P⊥) 24 in a direction perpendicular to its molecule. When voltage exceeding a predetermined threshold is applied to the electrode placed on each of the substrates 21a and 21b, the spiral structure of the liquid crystal 23 is untied so that the liquid crystal molecule 23 is able to change the direction of the orientation in such a manner that all of the dipole moments (P⊥) 24 face the direction of the electric field. The liquid crystal molecule is in the form of an elongated shape and shows an anisotropic refraction factor between the directions of its major axis and the minor axis. Therefore, it can be easily understood that the liquid crystal molecule 23 serves as the liquid crystal optical modulation device, the optical characteristics of which are changed in accordance with the applied voltage polarity when the structure is arranged in such a manner that polarizers of crossed nicol to each other are placed to vertically across the glass surface.

Figure 3:
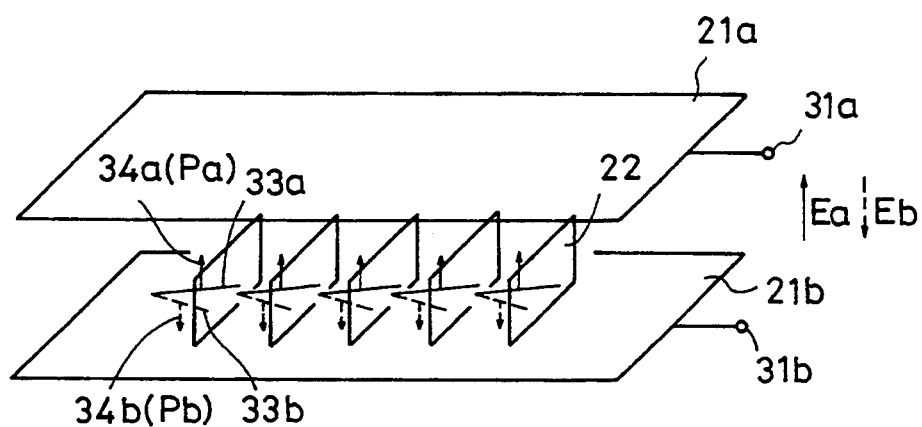

According to the present invention, the thickness of the liquid crystal cell for preferably use in the optical modulation device can be sufficiently reduced (for example, $10\mu$ or less). In proportional to the reduction in the thickness of the liquid crystal layer, the spiral structure of the liquid crystal molecule is, as shown in FIG. 3, untied if no electric field is being applied. Its dipole moment Pa or Pb is brought to an upward state (34a) or a downward state (34b). When electric field Ea or Eb exceeding a predetermined threshold but having the different polarities is, as shown in FIG. 3, applied to the thus formed cell by voltage applying means 31a and 31b, the dipole moment changes its direction to the upward direction 34a or the downward direction 34b in accordance with the vector of the electric field Ea or Eb. In accordance with this, the liquid crystal molecule is oriented to either a first stable state 33a or a second stable state 33b.

The above-described advantages can be obtained from a structure in which the ferroelectric device is employed as the optical modulation device.

A first advantage is that the response speed can significantly be raised.

A second advantage is that the orientation of the liquid crystal molecule has the dipolar characteristics. The second advantage will be described in detail with reference to FIG. 3. When the electric field Ea is applied, the liquid crystal molecule is oriented into the first stable state 33a which is a stable state even if the electric field is cut off. When the reversed electric field Eb is applied, the liquid crystal molecule is oriented into the second stable state 33b in which the direction of the molecule is changed and the stable state is also maintained if the electric field is cut off. Furthermore, if the applied electric field Ea or Eb does not exceed a predetermined threshold, the previous state of the orientation is also maintained.

The following Examples serve to further illustrate certain preferred embodiments of the present invention and are not limitative of its scope.

EXAMPLE 1

The following compounds were mixed at the following parts by weight so that a liquid crystal composition A was prepared.

| Constitutional formula | parts by weight |
| --- | --- |
| 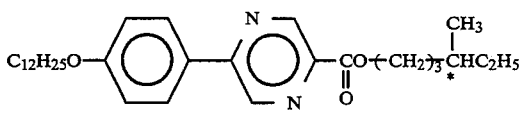 | 8 |
| 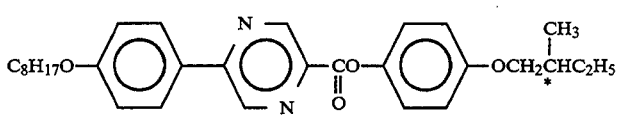 | 5 |
| 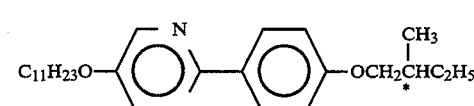 | 10 |
| 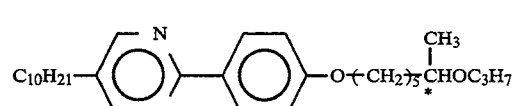 | 10 |
| 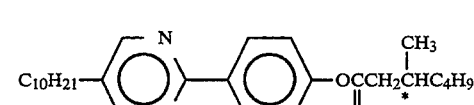 | 3 |
| 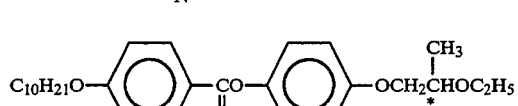 | 8 |
| 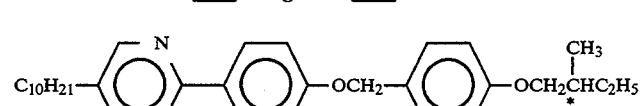 | 4 |
| 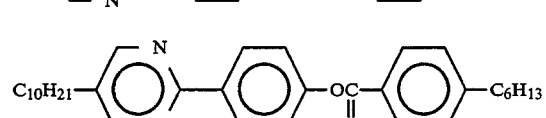 | 6 |

| Constitutional formula | parts by weight |
|---|---|
| 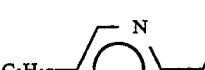 | 6 |
|  | 4 |
| 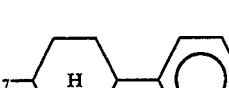 | 5 |

Furthermore, the compounds listed below were mixed to the thus prepared liquid crystal composition A at the parts by weight shown below so that a liquid crystal composition 1-A was prepared.

| Compound Nos. | Constitutional formula | parts by weight |
|---|---|---|
| 1-3 | 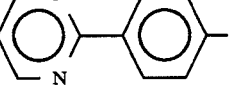 | 2 |
| 1-8 | 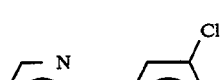 | 2 |
| 1-17 | 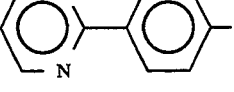 | 5 |
| 1-43 | 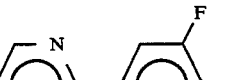 | 5 |
| 1-85 |  | 2 |
| Liquid crystal composition A | | 84 |

Then, two glass plates of 0.7 mm in thickness were prepared before an ITO film was formed on each of the glass plates so that voltage applying electrodes were formed. Then, SiO$_2$ was evaporated on it so that an insulating layer was formed. A silane coupling agent [KBM-602 manufactured by Shinetsu Kagaku], that is, 0.2% isopropylalcohol solution was applied for 15 seconds by a spinner at a rotational speed of 2000 rpm for surface treatment. Then, it was dried by heat at 120° C. for 20 minutes.

Then, a polyimide resin precursor [SP-510 manufactured by Toray], that is, 1.5% dimethyl acetoamide solution was applied by a spinner at a rotational speed of 2000 rpm for 15 seconds to the glass on which the ITO film had been formed and the surface treatment had been completed. After the film had been formed, it was subjected to heating, condensing and baking processes. The thickness of the film at this time was about 250Å.

The thus baked film was subjected to a rubbing process with an acetate embedded cloth before it was washed with isopropyl alcohol liquid. Then, alumina beads with an average diameter of 2 mm were spread on the surface of either of the glass plates before the rubbing processing axes were made parallel to each other. Then, the glass plates were laminated by using an adhesive sealant [Ryxson Bond manufactured by Chisso] before they were heated and dried at 100° C. for 60 minutes so that the cell was manufactured. The thickness measured by a Berek phase plate was about 2 μm.

The liquid composition 1-A was, in an isotropic liquid state, injected into the thus formed cell and the temperature was gradually lowered to 25° C. at a rate of 20° C./hour from the isotropic phase so that the ferroelectric liquid crystal device was manufactured.

The response speed (to be called the "optical response speed" hereinafter) was measured by detecting the optical response (change in the quantity of the transmitted light was 0 to 90%) under a crossed nicol in such a manner that a peak-to-peak voltage Vpp=20 V was applied to the ferroelectric liquid crystal device.

The results are as follows:

|  | 15° C. | 25° C. | 35° C. |
| --- | --- | --- | --- |
| Response speed | 300 μsec | 200 μsec | 165 μsec |
| Contrast at the operation | 13 (25° C.) | | |

The switching operation was excellent at the time of the operation and the bistability was excellent when the application of the voltage was stopped.

Furthermore, the uniform orientation in the liquid crystal device was excellent and the monodomain state was obtained. In addition, no defect was observed in the vicinity of the alumina beads which were used to hold the glass plates.

Comparative Example 1

A ferroelectric liquid crystal device was manufactured by the same method as that according to Example 1 except that liquid crystal composition A in place of liquid crystal composition 1-A was injected into the cell. The optical response speed of it was measured.

The results are as follows:

|  | 15° C. | 25° C. | 35° C. |
| --- | --- | --- | --- |
| Response speed | 385 μsec | 260 μsec | 190 μsec |
| Contrast at the operation | 10 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types were observed in the device. In addition, a multiplicity of stripe type defects were observed in the vicinity of the alumina beads. Therefore, it was clear that the orientation deteriorated.

EXAMPLE 2

A liquid crystal device was manufactured by the same method as that according to Example 1 except that the thickness of the polyimide resin was varied to 100Å, 250Å and 350Å, and the rubbing strength (the force for restricting the orientation) was varied by changing the rubbing conditions with the acetate embedded cloth, namely the rubbing speed and the width of the embedded cloth at the time of the rubbing.

| Thickness of polyimide | Rubbing Strength *1 | | | | |
| --- | --- | --- | --- | --- | --- |
|  | 1 | 2 | 3 | 4 | 5 |
| 100 Å | ○ | ◎ | ◎ | ◎ | ◎ |
| 250 Å | ◎ | ◎ | *2 ◎ | ◎ | ◎ |
| 350 Å | ◎ | ◎ | ◎ | ◎ | ◎ |

*1 The strength of the rubbing becomes greater in proportion to the Rubbing Strength number.
*2 The cell according to Example 1.
◎ : uniform and excellent orientation in monodomain state without defects.
○ : slight stripe type defects in orientation in a portion adjacent to the alumina beads.

Comparative Example 2

A liquid crystal device was manufactured by the same method as that according to Example 2 except that liquid crystal composition 1-A according to Example 1 was replaced by the liquid crystal composition A according to the Comparative Example 1. The orientation in the device was observed.

| Thickness of polyimide | Rubbing Strength | | | | |
| --- | --- | --- | --- | --- | --- |
|  | 1 | 2 | 3 | 4 | 5 |
| 100 Å | | | | | X |
| 250 Å | | | *1 | X | Δ |
| 350 Å | | | | X | Δ |

*1 The cell according to Comparative Example 1
Δ: the orientation was in the form of uniform monodomain, but there were stripe type defects in the orientation in all of the portions around the alumina beads, and partial defects in zigzag shape were observed.
X: a multiplicity of the defects in the zigzag shape was observed.
: defects in zigzag shape were generated on substantially the entire surface and the orientation was not uniform.

As can be clearly seen from Examples 1 and 2 and the Comparative Examples 1 and 2, the ferroelectric liquid crystal device containing the liquid crystal composition according to the present invention exhibits higher response, excellent orientation and bistability.

EXAMPLE 3

The compounds 1-3, 1-8, 1-17, 1-43, 1-85 and the liquid crystal composition A from Example 1 and the following compounds were mixed at the parts by weight shown below so that a liquid crystal composition 3-A was prepared.

| Compound Nos. | Constructional formula | parts by weight |
| --- | --- | --- |
| 2-5 | $C_6H_{13}$—[pyrimidine ring N,N]—[phenyl]—$OC_5H_{11}$ | 4 |

-continued

| Compound Nos. | Constructional formula | parts by weight |
|---|---|---|
| 2-14 | 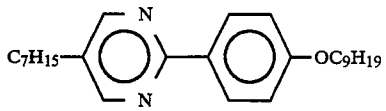 C$_7$H$_{15}$—[pyrimidine]—[phenyl]—OC$_9$H$_{19}$ | 6 |
| 2-16 | C$_8$H$_{17}$—[pyrimidine]—[phenyl]—OC$_6$H$_{13}$ | 10 |
| 2-54 | C$_{10}$H$_{21}$—[pyrimidine]—[phenyl]—O(CH$_2$)$_4$CHOCH$_3$ with CH$_3$ branch | 4 |
| 2-62 | C$_8$H$_{17}$—[pyrimidine]—[phenyl]—OCC$_7$H$_{15}$ (with =O) | 5 |
| 2-95 | C$_5$H$_{11}$—[pyrimidine]—[phenyl]—[phenyl]—C$_6$H$_{13}$ | 5 |
| 1-3 | | 2 |
| 1-8 | | 2 |
| 1-17 | | 5 |
| 1-43 | | 5 |
| 1-85 | | 2 |
| liquid crystal composition A | | 50 |

The ferroelectric liquid crystal device was manufactured by the same method as that according to Example 1 except that the above-described liquid crystal composition 3A was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

|  | 15° C. | 25° C. | 35° C. |
|---|---|---|---|
| Response speed | 215 μsec | 150 μsec | 118 μsec |
| Contrast at the operation | 13 (25° C.) | | |

The switching operation was excellent at the time of the operation and the bistability was excellent when the application of the voltage was stopped.

Comparative Example 3

A ferroelectric liquid crystal device was manufactured by the same method according to Example 3 except that compounds 1-3, 1-8, 1-17, 1-43 and 1-85 were excluded from the liquid crystal composition 3-A. The optical response speed was measured.

The results are as follows:

|  | 15° C. | 25° C. | 35° C. |
|---|---|---|---|
| Response speed | 230 μsec | 162 μsec | 123 μsec |
| Contrast at the operation | 10 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types were observed in the device. In addition, a multiplicity of stripe type defects were observed in the vicinity of the alumina beads. Therefore, it was clear that the orientation deteriorated.

EXAMPLE 4

The liquid crystal device was manufactured by the same method as that according to Example 2 except that the liquid crystal composition 3-A according to Example 3 was used. The orientation in the device was observed.

| Thickness of polyimide | Rubbing Strength *1 | | | | |
|---|---|---|---|---|---|
|  | 1 | 2 | 3 | 4 | 5 |
| 100 Å | ⊚ | ⊚ | ⊚ | ⊚ | ⊚ |
| 250 Å | ⊚ | ⊚ | *2 ⊚ | ⊚ | ⊚ |

-continued

| Thickness of polyimide | Rubbing Strength *1 | | | | |
|---|---|---|---|---|---|
| | 1 | 2 | 3 | 4 | 5 |
| 350 Å | ⊚ | ⊚ | ⊚ | ⊚ | ⊚ |

*1 The strength of the rubbing becomes greater in proportion to the Rubbing Strength number.

*2 The cell according to Example 3.
⊚ : uniform and excellent orientation in monodomain state without defects.
○ : slight stripe type defects in orientation in a portion adjacent to the alumina beads.

Comparative Example 4

The liquid crystal device was manufactured by the same method as that according to Example 4 except that the liquid crystal composition according to Comparative Example 3 was used. The orientation in the device was observed.

| Thickness of polyimide | Rubbing Strength | | | | |
|---|---|---|---|---|---|
| | 1 | 2 | 3 | 4 | 5 |
| 100 Å | | | | | X |
| 250 Å | | | *1 | Δ | Δ |
| 350 Å | | | | X | Δ |

*1 The cell according to Comparative Example 3
Δ: the orientation was in the form of uniform monodomain, but there were stripe type defects in the orientation in all of the portions around the alumina beads, and partial defects in zigzag shape were observed.
X: a multiplicity of the defects in the zigzag shape was observed.
 : defects in zigzag shape were generated on substantially the entire surface and the orientation was not uniform.

As can be clearly seen from Examples 3 and 4 and the Comparative Examples 3 and 4, the ferroelectric liquid crystal device containing the liquid crystal composition according to the present invention exhibits higher response, excellent orientation and bistability.

EXAMPLE 5

The compounds 1-3, 1-8, 1-17, 1-43, 1-85 from Example 1, the liquid crystal composition A and the following compounds were mixed at the parts by weight shown below so that a liquid crystal composition 5-A was manufactured.

| Compound Nos. | Constructional formula | Parts by weight |
|---|---|---|
| 3-6 | $C_6H_{13}O-\bigcirc-CO-\bigcirc-OCH_2\overset{*}{C}HC_5H_{11}$ (with F on CH) | 3 |
| 3-25 | $C_5H_{11}-H-CO-\bigcirc-OCH_2\overset{*}{C}HC_5H_{11}$ (with F on CH) | 6 |
| 3-84 | $C_{12}H_{25}-\langle N,N\rangle-\bigcirc-OCH_2\overset{*}{C}HC_4H_9$ (with F on CH) | 6 |
| 3-93 | $C_9H_{19}-\langle N,N\rangle-\bigcirc-OCH_2\overset{*}{C}HC_8H_{17}$ (with F on CH) | 3 |
| 1-3 | | 2 |
| 1-8 | | 2 |
| 1-17 | | 5 |
| 1-43 | | 5 |
| 1-85 | | 2 |
| liquid crystal composition A | | 66 |

The ferroelectric liquid crystal device was manufactured by the same method as that according to Example 1 except that the above-described liquid crystal composition 5-A was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

| | 15° C. | 25° C. | 35° C. |
|---|---|---|---|
| Response speed | 135 μsec | 93 μsec | 75 μsec |
| Contrast at the operation | 14 (25° C.) | | |

The switching operation was excellent at the time of the operation and the bistability was excellent when the application of the voltage was stopped.

Comparative Example 5

A ferroelectric liquid crystal device was manufactured by the same method according to Example 5 except that compounds 1-3, 1-8, 1-17, 1-43 and 1-85 were excluded from the liquid crystal composition 3-A. The optical response speed was measured.

The results are as follows:

|  | 15° C. | 25° C. | 35° C. |
|---|---|---|---|
| Response speed | 150 μsec | 110 μsec | 83 μsec |
| Contrast at the operation | 9 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types were observed in the device. In addition, a multiplicity of stripe type defects were observed in the vicinity of the alumina beads. Therefore, it was clear that the orientation deteriorated.

EXAMPLE 6

The liquid crystal device was manufactured by the same method as that according to Example 2 except that the liquid crystal composition 5-A according to Example 5 was used. The orientation in the device was observed.

| Thickness of polyimide | Rubbing Strength *1 | | | | |
|---|---|---|---|---|---|
|  | 1 | 2 | 3 | 4 | 5 |
| 100 Å | ○ | ○ | ⊚ | ⊚ | ⊚ |
| 250 Å | ○ | ⊚ | *2 ⊚ | ⊚ | ⊚ |
| 350 Å | ○ | ⊚ | ⊚ | ⊚ | ⊚ |

*1 The strength of the rubbing becomes greater in proportion to the Rubbing Strength number.
*2 The cell according to Example 5.
⊚ : uniform and excellent orientation in monodomain state without defects.
○ : slight stripe type defects in orientation in a portion adjacent to the alumina beads.

Comparative Example 6

A liquid crystal device was manufactured by the same method as that according to Example 6 except that the liquid crystal composition 5-A according to Example 5 was replaced by the liquid crystal composition according to the Comparative Example 5. The orientation in the device was observed.

| Thickness of polyimide | Rubbing Strength | | | | |
|---|---|---|---|---|---|
|  | 1 | 2 | 3 | 4 | 5 |
| 100 Å |  |  |  |  |  |
| 250 Å |  |  | *1 |  | X |
| 350 Å |  |  |  | X | Δ |

*1 The cell according to Comparative Example 5
Δ: the orientation was in the form of uniform monodomain, but there were stripe type defects in the orientation in all of the portions around the alumina beads, and partial defects in zigzag shape were observed.
X: a multiplicity of the defects in the zigzag shape was observed.
: defects in zigzag shape were generated on substantially the entire surface and the orientation was not uniform.

As can be clearly seen from Examples 5 and 6 and the Comparative Examples 5 and 6, the ferroelectric liquid crystal device containing the liquid crystal composition according to the present invention exhibits higher response, excellent orientation and bistability.

EXAMPLE 7

Compounds 1-3, 1-8, 1-17, 1-43, 1-85, 3-6, 3-25, 3-84, 3-93 from Example 5, the liquid crystal composition A, and compounds 2-5, 2-14, 2-16, 2-54, 2-95 and 2-99 from Example 3 were mixed at the parts by weight shown below so that a liquid crystal composition 7-A was prepared.

| Compound Nos. | Parts by weight |
|---|---|
| 1-3 | 2 |
| 1-8 | 2 |
| 1-17 | 5 |
| 1-43 | 5 |
| 1-85 | 2 |
| 2-5 | 4 |
| 2-14 | 6 |
| 2-16 | 10 |
| 2-54 | 4 |
| 2-95 | 5 |
| 2-99 | 5 |
| 3-6 | 3 |
| 3-25 | 6 |
| 3-84 | 6 |
| 3-93 | 3 |
| Liquid crystal composition A | 32 |

The ferroelectric liquid crystal device was manufactured by the same method as that according to Example 1 except that the above-described liquid crystal composition 7-A was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

|  | 15° C. | 25° C. | 35° C. |
|---|---|---|---|
| Response speed | 120 μsec | 84 μsec | 66 μsec |
| Contrast at the operation | 14 (25° C.) | | |

The switching operation was excellent at the time of the operation and the bistability was excellent when the application of the voltage was stopped.

Comparative Example 7

A ferroelectric liquid crystal device was manufactured by the same method according to Example 7 except that compounds 1-3, 1-8, 1-17, 1-43 and 1-85 were excluded from the liquid crystal composition 7A. The optical response speed was measured.

The results are as follows:

|  | 15° C. | 25° C. | 35° C. |
|---|---|---|---|
| Response speed | 130 μsec | 88 μsec | 70 μsec |
| Contrast at the operation | 9 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types were observed in the device. In addition, a multiplicity of stripe type defects were observed in the vicinity of the alumina beads. Therefore, it was clear that the orientation deteriorated.

EXAMPLE 8

A liquid crystal device was manufactured by the same method as that according to Example 2 except that the liquid crystal composition 7-A according to Example 7 was used. The orientation in the device was observed.

| Thickness of polyimide | Rubbing Strength *1 | | | | |
|---|---|---|---|---|---|
| | 1 | 2 | 3 | 4 | 5 |
| 100 Å | ⊚ | ⊚ | ⊚ | ⊚ | ⊚ |
| 250 Å | ⊚ | ⊚ | *2 ⊚ | ⊚ | ⊚ |
| 300 Å | ⊚ | ⊚ | ⊚ | ⊚ | ⊚ |

*1 The strength of the rubbing becomes greater in proportion to the Rubbing Strength number.
*2 The cell according to Example 7.
⊚ : has the same definition as in Example 6.

Comparative Example 8

A liquid crystal device was manufactured by the same method as that according to Example 8 except that the liquid crystal composition according to Comparative Example 7 was used in place of the liquid crystal composition 7-A. The orientation in the device was observed.

| Thickness of polyimide | Rubbing Strength | | | | |
|---|---|---|---|---|---|
| | 1 | 2 | 3 | 4 | 5 |
| 100 Å | | | | | Δ |
| 250 Å | | | *1 | Δ | Δ |
| 350 Å | | | X | Δ | Δ |

*1 The cell according to Comparative Example 7
Δ, X and have the same definitions as in Comparative Example 6.

As can be clearly seen from Examples 7 and 8 and the Comparative Examples 7 and 8, the ferroelectric liquid crystal device containing the liquid crystal composition according to the present invention exhibits higher response, excellent orientation and bistability.

EXAMPLE 9

The following compounds were mixed at the following parts by weight so that a liquid crystal composition C was prepared.

| Constitutional formula | Parts by weight |
|---|---|
| $C_{10}H_{21}O-\phi-OC(O)-\phi-\phi-CH_2\overset{*}{C}H(CH_3)C_2H_5$ | 10 |
| $C_{12}H_{25}O-\phi-CS(O)-\phi-OCH_2\overset{*}{C}H(CH_3)C_2H_5$ | 5 |
| $C_6H_{13}-\phi-CS(O)-\phi-CH_2\overset{*}{C}H(CH_3)C_2H_5$ | 5 |
| $C_{10}H_{21}O-\phi-CO(O)-\phi-OCH_2\overset{*}{C}H(CH_3)C_2H_5$ | 10 |
| $C_{10}H_{21}-\text{Pyrim}-\phi-O(CH_2)_5\overset{*}{C}H(CH_3)OC_3H_7$ | 10 |
| $C_8H_{17}-\phi-CS(O)-\phi-\phi-OCH_2\overset{*}{C}H(CH_3)C_2H_5$ | 10 |
| $C_{10}H_{21}OC(O)-\phi-\phi-OC(O)-\phi-O(CH_2)_2\overset{*}{C}H(CH_3)OC_3H_7$ | 6 |
| $C_8H_{17}OC(O)-\phi-\phi-OC(O)-\phi-OCH_2\overset{*}{C}H(CH_3)OC_5H_{11}$ | 6 |

-continued

| Constitutional formula | Parts by weight |
|---|---|
| $C_{12}H_{25}$—[pyridine-N,N]—[phenyl]—OC(O)—[phenyl]—O—$(CH_2)_3$—*CHC$_2$H$_5$ (CH$_3$) | 10 |
| $C_8H_{17}$—[pyridine-N,N]—[phenyl]—OC(O)—[phenyl]—$C_5H_{11}$ | 10 |
| $C_{10}H_{21}O$—[phenyl]—CO(O)—[phenyl]—CO*CH(CF$_3$)CH$_2$COC$_2$H$_5$(O) | 5 |

Furthermore, the compounds listed below were mixed to the thus prepared liquid crystal composition C at the parts by weight shown below so that a liquid crystal composition 9-C was prepared.

| | | |
|---|---|---|
| 1-14 | $C_5H_{11}$—[pyridine-N,N]—[phenyl-F]—OCC$_{10}$H$_{21}$(O) | 3 |
| 1-19 | $C_6H_{13}$—[pyridine-N,N]—[phenyl-F]—OCC$_{11}$H$_{23}$(O) | 6 |
| 1-60 | $C_{10}H_{21}$—[pyridine-N,N]—[phenyl-F]—OC(O)—$(CH_2)_3$—CHOCH$_3$(CH$_3$) | 2 |
| 1-73 | $C_8H_{17}$—[pyridine-N,N]—[phenyl-F]—OCC$_8$H$_{17}$(O) | 2 |
| 1-81 | $C_8H_{17}O$—[pyridine-N,N]—[phenyl-F]—OCC$_6$H$_{13}$(O) | 2 |
| Liquid crystal composition C | | 85 |

The ferroelectric liquid crystal device was manufactured by the same method as that according to Example 1 except that the above-described liquid crystal composition 9-C was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

| | 15° C. | 25° C. | 35° C. |
|---|---|---|---|
| Response speed | 615 μsec | 418 μsec | 338 μsec |
| Contrast at the operation | 12 (25° C.) | | |

The switching operation was excellent at the time of the operation and the bistability was excellent when the application of the voltage was stopped.

Comparative Example 9

A ferroelectric liquid crystal device was manufactured by the same method according to Example 9 except that the liquid crystal composition C was injected into the cell. The optical response speed was measured.

The results are as follows:

| | 15° C. | 25° C. | 35° C. |
|---|---|---|---|
| Response speed | 662 μsec | 445 μsec | 350 μsec |
| Contrast at the operation | 9 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types was observed in the device. In addition, a multiplicity of stripe type defects was observed in the vicinity of the alumina beads. Therefore, it was clear that the orientation deteriorated.

EXAMPLE 10

The liquid crystal device was manufactured by the same method as that according to Example 2 except that the liquid crystal composition 9-C according to Example 9 was used. The orientation in the device was observed.

| Thickness of polyimide | Rubbing Strength *1 | | | | |
|---|---|---|---|---|---|
| | 1 | 2 | 3 | 4 | 5 |
| 100 Å | ○ | ◉ | ◉ | ◉ | ◉ |
| 250 Å | ○ | ◉ | *2 ◉ | ◉ | ◉ |

-continued

| Thickness of polyimide | Rubbing Strength *1 | | | | |
|---|---|---|---|---|---|
| | 1 | 2 | 3 | 4 | 5 |
| 300 Å | ⊚ | ⊚ | ⊚ | ⊚ | ⊚ |

*1 The strength of the rubbing becomes greater in proportion to the Rubbing Strength number.
*2 The cell according to Example 9
⊚ and ○ have the same definitions as in Example 6.

Comparative Example 10

The liquid crystal device was manufactured by the same method as that according to Example 10 except that the liquid crystal composition C according to Comparative Example 9 was used instead of the liquid crystal composition 9-C. The orientation in the device was observed.

| Thickness of polyimide | Rubbing Strength | | | | |
|---|---|---|---|---|---|
| | 1 | 2 | 3 | 4 | 5 |
| 100 Å | | | | | |
| 250 Å | | | *1 | | X |
| 350 Å | | | | | X |

*1 The cell according to Comparative Example 9
X and have the same definitions as in Comparative Example 6.

As can be clearly seen from Examples 9 and 10 and the Comparative Examples 9 and 10, the ferroelectric liquid crystal device containing the liquid crystal composition according to the present invention exhibits higher response, excellent orientation and bistability.

EXAMPLE 11

The compounds 1-14, 1-19, 1-60, 1-73, 1-81, the liquid crystal composition C according to Example 9 and the following compounds were mixed at the parts by weight shown below so that a liquid crystal composition 11-C was prepared.

| Compound No. | Constitutional Formula | Parts by weight |
|---|---|---|
| 2-20 |  | 6 |
| 2-27 |  | 4 |
| 2-49 | 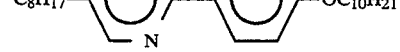 | 3 |
| 2-76 |  | 8 |
| 2-105 | 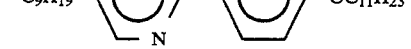 | 8 |
| 1-14 | | 3 |
| 1-19 | | 6 |
| 1-60 | | 2 |
| 1-73 | | 2 |
| 1-81 | | 2 |
| LIQUID CRYSTAL COMPOSITION C | | 53 |

The ferroelectric liquid crystal device was manufactured by the same method as that according to Example 1 that the above-described liquid crystal composition 11-C was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

| | 15° C. | 25° C. | 35° C. |
|---|---|---|---|
| Response speed | 540 μsec | 370 μsec | 298 μsec |
| Contrast at the operation | 13 (25° C.) | | |

The switching operation was excellent at the time of the operation and the bistability was excellent when the application of the voltage was stopped.

Comparative Example 11

A ferroelectric liquid crystal device was manufactured by the same method according to Example 11 except that the compounds 1-14, 1-19, 1-60, 1-73 and 1-81 were excluded from the liquid crystal composition 11-C. The optical response speed was measured. The results are as follows:

|  | 15° C. | 25° C. | 35° C. |
|---|---|---|---|
| Response speed | 635 μsec | 429 μsec | 340 μsec |
| Contrast at the operation | 10 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types were observed in the device. In addition, a multiplicity of stripe type defects were observed in the vicinity of the alumina beads. Therefore, it was clear that the orientation deteriorated.

EXAMPLE 12

The liquid crystal device was manufactured by the same method as that according to Example 2 except that the liquid crystal composition 11-C according to Example 11 was used. The orientation in the device was observed.

| Thickness of polyimide | Rubbing Strength *1 | | | | |
|---|---|---|---|---|---|
|  | 1 | 2 | 3 | 4 | 5 |
| 100 Å | ⊚ | ⊚ | ⊚ | ⊚ | ⊚ |
| 250 Å | ⊚ | ⊚ | *2 ⊚ | ⊚ | ⊚ |
| 300 Å | ⊚ | ⊚ | ⊚ | ⊚ | ⊚ |

*1 The strength of the rubbing becomes greater in proportion to the Rubbing Strength number.
*2 The cell according to Example 11
⊚ has the same definition as in Example 6.

Comparative Example 12

The liquid crystal device was manufactured by the same method as that according to Example 12 except that the liquid crystal composition according to Comparative Example 11 was used in place of the liquid crystal composition 11-C. The orientation in the device was observed.

| Thickness of polyimide | Rubbing Strength | | | | |
|---|---|---|---|---|---|
|  | 1 | 2 | 3 | 4 | 5 |
| 100 Å | | | | | X |
| 250 Å | | | *1 | X | X |
| 350 Å | | | | X | X |

*1 The cell according to Comparative Example 11
X and  have the same definitions as in Comparative Example 6.

As can be clearly seen from Examples 11 and 12 and the Comparative Examples 11 and 12, the ferroelectric liquid crystal device containing the liquid crystal composition according to the present invention exhibits higher response, excellent orientation and bistability.

EXAMPLE 13

The compounds 1-14, 1-19, 1-60, 1-73, 1-81, the liquid crystal composition C according to Example 9 and the following compounds were mixed at the parts by weight shown below so that a liquid crystal composition 13-C was prepared.

| Compound No. | Constitutional Formula | Parts by weight |
|---|---|---|
| 3-30 | 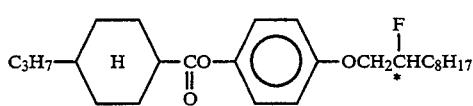 | 3 |
| 3-36 | 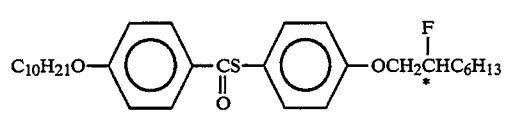 | 2 |
| 3-48 | 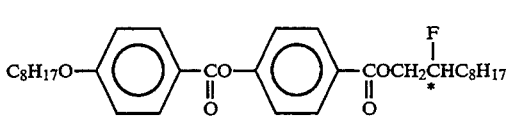 | 2 |
| 3-80 | 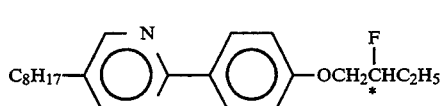 | 5 |
| 3-88 | 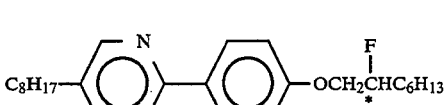 | 4 |

| Compound No. | Constitutional Formula | Parts by weight |
|---|---|---|
| 1-14 | | 3 |
| 1-19 | | 6 |
| 1-60 | | 2 |
| 1-73 | | 2 |
| 1-81 | | 2 |
| | LIQUID CRYSTAL COMPOSITION C | 69 |

The ferroelectric liquid crystal device was manufactured by the same method as that according to Example 1 except that the above-described liquid crystal composition 13-C was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

| | 15° C. | 25° C. | 35° C. |
|---|---|---|---|
| Response speed | 350 μsec | 245 μsec | 189 μsec |
| Contrast at the operation | 13 (25° C.) | | |

The switching operation was excellent at the time of the operation and the bistability was excellent when the application of the voltage was stopped.

Comparative Example 13

A ferroelectric liquid crystal device was manufactured by the same method according to Example 13 except that compounds 1-14, 1-19, 1-60, 1-73 and 1-81 were excluded from the liquid crystal composition 13-C. The optical response speed was measured.

The results are as follows:

| | 15° C. | 25° C. | 35° C. |
|---|---|---|---|
| Response speed | 365 μsec | 250 μsec | 203 μsec |
| Contrast at the operation | 9 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types was observed in the device. In addition, a multiplicity of stripe type defects was observed in the vicinity of the alumina beads. Therefore, it was clear that the orientation deteriorated.

EXAMPLE 14

The liquid crystal device was manufactured by the same method as that according to Example 2 except that the liquid crystal composition 13-C according to Example 13 was used. The orientation in the device was observed.

| Thickness of polyimide | Rubbing Strength *1 | | | | |
|---|---|---|---|---|---|
| | 1 | 2 | 3 | 4 | 5 |
| 100 Å | ○ | ⊙ | ⊙ | ⊙ | ⊙ |
| 250 Å | ⊙ | ⊙ | *2 ⊙ | ⊙ | ⊙ |
| 300 Å | ⊙ | ⊙ | ⊙ | ⊙ | ⊙ |

*1 The strength of the rubbing becomes greater in proportion to the Rubbing Strength number.
*2 The cell according to Example 13
⊙ and ○ have the same definitions as in Example 6.

Comparative Example 14

A liquid crystal device was manufactured by the same method as that according to Example 14 except that the liquid crystal composition according to Comparative Example 13 was used in place of the liquid crystal composition 13-C. The orientation in the device was observed.

| Thickness of polyimide | Rubbing Strength | | | | |
|---|---|---|---|---|---|
| | 1 | 2 | 3 | 4 | 5 |
| 100 Å | | | | | |
| 250 Å | | | *1 | | X |
| 350 Å | | | | | X |

*1 The cell according to Comparative Example 13
X and  have the same definitions as in Comparative Example 6.

As can be clearly seen from Examples 13 and 14 and the Comparative Examples 13 and 14, the ferroelectric liquid crystal device containing the liquid crystal composition according to the present invention exhibits higher response, excellent orientation and bistability.

EXAMPLE 15

Compounds 1-14, 1-19, 1-60, 1-73, 1-81, 3-30, 3-36, 3-48, 3-80, 3-88 and the liquid crystal composition C from Example 13, and compounds 2-6, 2-20, 2-27, 2-49, 2-76 and 2-105 from Example 11 were mixed at the parts by weight shown below so that a liquid crystal composition 15-C was prepared.

| Compound No. | Constitutional Formula | Parts by weight |
|---|---|---|
| 1-14 | | 3 |
| 1-19 | | 6 |
| 1-60 | | 2 |
| 1-73 | | 2 |
| 1-81 | | 2 |
| 2-6 | | 3 |
| 2-20 | | 6 |
| 2-27 | | 4 |
| 2-49 | | 3 |
| 2-76 | | 8 |
| 2-105 | | 8 |
| 3-30 | | 3 |
| 3-36 | | 2 |
| 3-48 | | 2 |
| 3-80 | | 5 |
| 3-88 | | 4 |

-continued

| Compound No. | Constitutional Formula | Parts by weight |
|---|---|---|
| LIQUID CRYSTAL COMPOSITION C | | 37 |

The ferroelectric liquid crystal device was manufactured by the same method as that according to Example 1 except that the above-described liquid crystal composition 15-C was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

| | 15° C. | 25° C. | 35° C. |
|---|---|---|---|
| Response speed | 315 μsec | 214 μsec | 170 μsec |
| Contrast at the operation | 14 (25° C.) | | |

The switching operation was excellent at the time of the operation and the bistability was excellent when the application of the voltage was stopped.

Comparative Example 15

A ferroelectric liquid crystal device was manufactured by the same method according to Example 15 except that compounds 1-14, 1-19, 1-60, 1-73 and 1-81 were excluded from the liquid crystal composition 15-C. The optical response speed was measured.

The results are as follows:

| | 15° C. | 25° C. | 35° C. |
|---|---|---|---|
| Response speed | 340 μsec | 235 μsec | 183 μsec |
| Contrast at the operation | 10 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types was observed in the device. In addition, a multiplicity of stripe type defects were observed in the vicinity of the alumina beads. Therefore, it was clear that the orientation deteriorated.

EXAMPLE 16

The liquid crystal device was manufactured by the same method as that according to Example 2 except that the liquid crystal composition 15-C according to Example 15 was used. The orientation in the device was observed.

| Thickness of polyimide | Rubbing Strength *1 | | | | |
|---|---|---|---|---|---|
| | 1 | 2 | 3 | 4 | 5 |
| 100 Å | ⊚ | ⊚ | ⊚ | ⊚ | ⊚ |
| 250 Å | ⊚ | ⊚ | *2 ⊚ | ⊚ | ⊚ |
| 300 Å | ⊚ | ⊚ | ⊚ | ⊚ | ⊚ |

*1 The strength of the rubbing becomes greater in proportion to the Rubbing Strength number.
*2 The cell according to Example 15
⊚ has the same definition as in Example 6.

Comparative Example 16

A liquid crystal device was manufactured by the same method as that according to Example 16 except that the liquid crystal composition according to Comparative Example 15 was used in place of the liquid crystal composition 15-C. The orientation in the device was observed.

| Thickness of polyimide | Rubbing Strength | | | | |
|---|---|---|---|---|---|
| | 1 | 2 | 3 | 4 | 5 |
| 100 Å | | | | | X |
| 250 Å | | | *1 | | X |
| 350 Å | | | | X | X |

*1 The cell according to Comparative Example 15
X and have the same definitions as in Comparative Example 6.

As can be clearly seen from Examples 15 and 16 and the Comparative Examples 15 and 16, the ferroelectric liquid crystal device containing the liquid crystal composition according to the present invention exhibits higher response, excellent orientation and bistability.

EXAMPLE 17

The following compounds were mixed at the parts by weight shown below so that a liquid crystal composition 17-A was prepared.

1-11

$C_4H_9-\text{[pyridine]}-\text{[phenyl-F]}-OC(=O)-C_8H_{17}$    3

1-34

$C_9H_{19}-\text{[pyridine]}-\text{[phenyl-F]}-OC(=O)-C_{10}H_{21}$    4

1-52

$C_{12}H_{25}-\text{[pyridine]}-\text{[phenyl-F]}-OC(=O)-C_4H_9$    4

1-68

$C_6H_{13}-\text{[pyridine]}-\text{[phenyl-F]}-OC(=O)-C_5H_{11}$    2

1-90

$C_{10}H_{21}CO(=O)-\text{[pyridine]}-\text{[phenyl]}-OC(=O)-C_8H_{17}$    2

| | | |
|---|---|---|
| 2-17 | 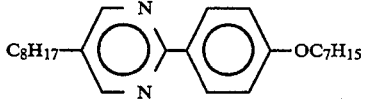 C8H17—[N=N ring]—[ring]—OC7H15 | 4 |
| 2-18 | C8H17—[N=N ring]—[ring]—OC8H17 | 4 |
| 2-33 | C11H23—[N=N ring]—[ring]—OC6H13 | 4 |
| 2-78 | C10H21—[N=N ring]—[ring]—OCC10H21 (=O) | 3 |
| 2-86 | C12H25—[N=N ring]—[ring]—OCC6H13 (=O) | 3 |
| 2-102 | C9H19O—[N=N ring]—[ring]—[ring]—OC8H17 | 3 |
| Liquid crystal composition A | | 58 |

The ferroelectric liquid crystal device was manufactured by the same method as that according to Example 1 except that the above-described liquid crystal composition 17-A was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

| | 15° C. | 25° C. | 35° C. |
|---|---|---|---|
| Response speed | 210 μsec | 145 μsec | 112 μsec |
| Contrast at the operation | 13 (25° C.) | | |

The switching operation was excellent at the time of the operation and the bistability was excellent when the application of the voltage was stopped.

Comparative Example 17

A ferroelectric liquid crystal device was manufactured by the same method according to Example 17 except that compounds 1-11, 1-34, 1-52, 1-68 and 1-90 were excluded from the liquid crystal composition 17-A. The optical response speed was measured.

The results are as follows:

| | 15° C. | 25° C. | 35° C. |
|---|---|---|---|
| Response speed | 232 μsec | 160 μsec | 121 μsec |

| | 15° C. | 25° C. | 35° C. |
|---|---|---|---|
| Contrast at the operation | 10 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types was observed in the device. In addition, the a multiplicity of stripe type defects was observed in the vicinity of the alumina beads. Therefore, it was clear that the orientation deteriorated.

EXAMPLE 18

The liquid crystal device was manufactured by the same method as that according to Example 2 except that the liquid crystal composition 17-A according to Example 17 was used. The orientation in the device was observed.

| Thickness of polyimide | Rubbing Strength *1 | | | | |
|---|---|---|---|---|---|
| | 1 | 2 | 3 | 4 | 5 |
| 100 Å | ⊚ | ⊚ | ⊚ | ⊚ | ⊚ |
| 250 Å | ⊚ | ⊚ | *2 ⊚ | ⊚ | ⊚ |
| 300 Å | ⊚ | ⊚ | ⊚ | ⊚ | ⊚ |

*1 The strength of the rubbing becomes greater in proportion to the Rubbing Strength number.
*2 The cell according to Example 17
⊚ has the same definition as in Example 6.

Comparative Example 18

The liquid crystal device was manufactured by the same method as that according to Example 18 except that the liquid crystal composition according to Comparative Example 17 was used in place of the liquid crystal composition 17-A. The orientation in the device was observed.

| Thickness of polyimide | Rubbing Strength | | | | |
|---|---|---|---|---|---|
| | 1 | 2 | 3 | 4 | 5 |
| 100 Å | | | | | |
| 250 Å | | | *1 | | X |
| 350 Å | | | | | X |

*1 The cell according to Comparative Example 17
X and  have the same definitions as in Example 6.

EXAMPLE 19

The following compounds were mixed at the parts by weight shown below so that a liquid crystal composition 19-A was prepared.

| 1-10 | 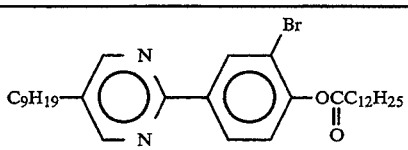 C9H19—[N=N ring]—[ring with Br]—OCC12H25 (=O) | 2 |
|---|---|---|

-continued

| | | |
|---|---|---|
| 1-16 | [structure: C6H13-pyridine-C6H4(F)-OCC6H13(=O)] | 3 |
| 1-31 | [structure: C9H19-pyridine-C6H4(F)-OCC5H11(=O)] | 4 |
| 1-64 | [structure: C11H23-pyridine-C6H4(F)-OC(=O)-CH(CH3)-C2H5] | 3 |
| 1-87 | [structure: C11H23O-pyridine-C6H4(F)-OC(=O)-C6H13] | 3 |
| 3-16 | [structure: C8H17O-C6H4-CO-C6H3(F)-OCH2CHC8H17*] | 2 |
| 3-77 | [structure: C8H17CO(=O)-C6H4-C6H3(F)-OCH2CHC6H13*] | 2 |
| 3-82 | [structure: C12H25-pyridine-C6H3(F)-OCH2CHC2H5*] | 5 |
| 3-91 | [structure: C11H23-pyridine-C6H3(F)-OCH2CHC6H13*] | 5 |
| 3-110 | [structure: C12H25-pyridine-C6H3(F)-OCCHC6H13(=O)*] | 2 |
| Liquid crystal composition A | | 69 |

The ferroelectric liquid crystal device was manufactured by the same method as that according to Example 1 except that the above-described liquid crystal composition was used. The optical response speed was measured by the same method as that according to Example 1 and the state of the switching operation was observed.

The uniform orientation in the liquid crystal device was excellent and the monodomain state was realized without the defects in the zigzag shape and stripe shape in the vicinity of the spacer.

The results are as follows:

| | 15° C. | 25° C. | 35° C. |
|---|---|---|---|
| Response speed | 140 μsec | 98 μsec | 78 μsec |
| Contrast at the operation | 14 (25° C.) | | |

The switching operation was excellent at the time of the operation and the bistability was excellent when the application of the voltage was stopped.

Comparative Example 19

A ferroelectric liquid crystal device was manufactured by the same method according to Example 17 except that compounds 1-10, 1-16, 1-31, 1-64 and 1-87 were excluded from the liquid crystal composition 19-A. The optical response speed was measured.

The results are as follows:

| | 15° C. | 25° C. | 35° C. |
|---|---|---|---|
| Response speed | 162 μsec | 112 μsec | 87 μsec |
| Contrast at the operation | 10 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types was observed in the device. In addition, a multiplicity of stripe type defects was observed in the vicinity of the alumina beads. Therefore, it was clear that the orientation deteriorated.

EXAMPLE 20

The liquid crystal device was manufactured by the same method as that according to Example 2 except that the liquid crystal composition 19-A according to Example 19 was used. The orientation in the device was observed.

| Thickness of polyimide | Rubbing Strength *1 | | | | |
|---|---|---|---|---|---|
| | 1 | 2 | 3 | 4 | 5 |
| 100 Å | ◯ | ⊙ | ⊙ | ⊙ | ⊙ |
| 250 Å | ◯ | ⊙ | *2 ⊙ | ⊙ | ⊙ |
| 300 Å | ◯ | ⊙ | ⊙ | ⊙ | ⊙ |

*1 The strength of the rubbing becomes greater in proportion to the Rubbing Strength number.
*2 The cell according to Example 19
⊙ and ◯ have the same definitions as in Example 6.

Comparative Example 20

The liquid crystal device was manufactured by the same method as that according to Example 20 except that the liquid crystal composition according to Comparative Example 19 was used in place of the liquid crystal composition 19-A. The orientation in the device was observed.

| Thickness of polyimide | Rubbing Strength | | | | |
|---|---|---|---|---|---|
| | 1 | 2 | 3 | 4 | 5 |
| 100 Å | | | | | |
| 250 Å | | | *1 | | |

-continued

| Thickness of polyimide | Rubbing Strength | | | | |
|---|---|---|---|---|---|
| | 1 | 2 | 3 | 4 | 5 |
| 350 Å | | | | | X |

*1 The cell according to Comparative Example 19
X and  have the same definitions as in Example 6.

EXAMPLE 21

The following compounds were mixed at the parts by weight shown below so that a liquid crystal composition 21-A was prepared.

| Compound No. | Constitutional Formula | Parts by weight |
|---|---|---|
| 1-5 | $C_{11}H_{23}$—pyrimidine—phenyl(Cl)—$OCC_6H_{13}$(=O) | 2 |
| 1-26 | $C_8H_{17}$—pyrimidine—phenyl(F)—$OCC_7H_{15}$(=O) | 3 |
| 1-38 | $C_{10}H_{21}$—pyrimidine—phenyl(F)—$OCC_6H_{13}$(=O) | 4 |
| 1-54 | $C_{12}H_{25}$—pyrimidine—phenyl(F)—$OC-C_8H_{17}$(=O) | 3 |
| 1-56 | $C_2H_5CH(CH_3)(CH_2)_5$—pyrimidine—phenyl(F)—$OC-C_6H_{13}$(=O) | 3 |
| 2-19 | $C_8H_{17}$—pyrimidine—phenyl—$OC_9H_{19}$ | 8 |
| 2-29 | $C_{10}H_{21}$—pyrimidine—phenyl—$OC_6H_{13}$ | 6 |
| 2-41 | $C_{12}H_{25}$—pyrimidine—phenyl—$OC_{12}H_{25}$ | 3 |
| 2-52 | $C_8H_{17}$—pyrimidine—phenyl—$O(CH_2)_3CH(CH_3)OC_3H_7$ | 6 |
| 2-74 | $C_{10}H_{21}$—pyrimidine—phenyl—$OCC_6H_{13}$(=O) | 4 |

-continued

| Compound No. | Constitutional Formula | Parts by weight |
| --- | --- | --- |
| 2-87 | 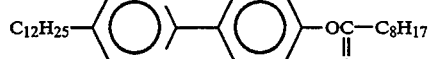 | 4 |
| 3-27 | 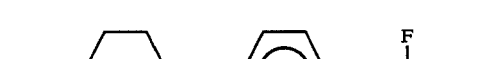 | 5 |
| 3-74 | 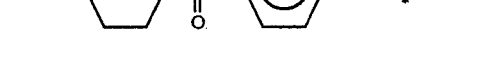 | 2 |
| 3-86 |  | 5 |
| 3-112 | 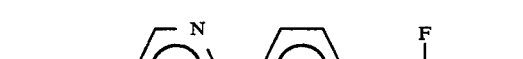 | 3 |
| Liquid crystal composition A | | 39 |

The ferroelectric liquid crystal device was manufactured by the same method as that according to Example 1 except that the above-described liquid crystal composition was used. The optical response speed was measured by the same method as that according to Example 1 and the state of the switching operation was observed.

The uniform orientation in the liquid crystal device was excellent and the monodomain state was realized without the defects in the zigzag shape and stripe shape in the vicinity of the spacer.

The results are as follows:

| | 15° C. | 25° C. | 35° C. |
| --- | --- | --- | --- |
| Response speed | 118 μsec | 83 μsec | 64 μsec |
| Contrast at the operation | 14 (25° C.) | | |

The switching operation was excellent at the time of the operation and the bistability was excellent when the application of the voltage was stopped.

Comparative Example 21

A ferroelectric liquid crystal device was manufactured by the same method according to Example 21 except that compounds 1-5, 1-26, 1-38, 1-54 and 1-56 were excluded from the liquid crystal composition 21-A. The optical response speed was measured.

The results are as follows:

| | 15° C. | 25° C. | 35° C. |
| --- | --- | --- | --- |
| Response speed | 132 μsec | 91 μsec | 70 μsec |
| Contrast at the operation | 9 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types was observed in the device. In addition, a multiplicity of stripe type defects was observed in the vicinity of the alumina beads. Therefore, it was clear that the orientation deteriorated.

EXAMPLE 22

The liquid crystal device was manufactured by the same method as that according to Example 2 except that the liquid crystal composition 21-A according to Example 19 was used. The orientation in the device was observed.

| Thickness of polyimide | Rubbing Strength | | | | |
| --- | --- | --- | --- | --- | --- |
| | 1*[1] | 2 | 3 | 4 | 5 |
| 100 Å | ⊚ | ⊚ | ⊚ | ⊚ | ⊚ |
| 250 Å | ⊚ | ⊚ | ⊚*[2] | ⊚ | ⊚ |
| 300 Å | ⊚ | ⊚ | ⊚ | ⊚ | ⊚ |

*[1] The strength of the rubbing becomes greater in proportion to the Rubbing Strength number.
*[2] The cell according to Example 21
⊚ has the same definition as in Example 6.

Comparative Example 22

The liquid crystal device was manufactured by the same method as that according to Example 22 except that the liquid crystal composition according to Comparative Example 21 was used in place of the liquid crystal composition 21-A. The orientation in the device was observed.

| Thickness of polyimide | Rubbing Strength | | | | |
| --- | --- | --- | --- | --- | --- |
| | 1 | 2 | 3 | 4 | 5 |
| 100 Å | | | | | X |
| 250 Å | | | *[1] | X | X |

-continued

| Thickness of polyimide | Rubbing Strength | | | | |
|---|---|---|---|---|---|
| | 1 | 2 | 3 | 4 | 5 |
| 350 Å | | | | X | X |

*¹The cell according to Comparative Example 21
X and  have the same definitions as in Example 6.

EXAMPLE 23

The following compounds were mixed at the parts by weight shown below so that a liquid crystal composition 23-C was prepared.

| Compound No. | Constitutional Formula | Parts by weight |
|---|---|---|
| 1-18 | $C_6H_{13}$—[pyrazine]—[phenyl(F)]—$OCC_{10}H_{21}$ (C=O) | 4 |
| 1-24 | $C_8H_{17}$—[pyrazine]—[phenyl(F)]—$OCC_4H_9$ (C=O) | 4 |
| 1-80 | $C_{10}H_{21}O$—[pyrazine]—[phenyl(Cl)]—$OCC_8H_{17}$ (C=O) | 3 |
| 1-82 | $C_9H_{19}O$—[pyrazine]—[phenyl(F)]—$OCC_7H_{15}$ (C=O) | 3 |
| 2-24 | $C_9H_{19}$—[pyrazine]—[phenyl]—$OC_8H_{17}$ | 5 |
| 2-30 | $C_{10}H_{21}$—[pyrazine]—[phenyl]—$OC_7H_{15}$ | 5 |
| 2-43 | $C_8H_{17}O$—[pyrazine]—[phenyl]—$OC_5H_{11}$ | 3 |
| 2-56 | $C_6H_{13}$—[pyrazine]—[phenyl]—$OCC_8H_{17}$ (C=O) | 3 |
| 2-90 | $C_9H_{19}O$—[pyrazine]—[phenyl]—$OCC_7H_{15}$ (C=O) | 3 |
| 2-97 | $C_8H_{17}$—[pyrazine]—[phenyl]—[phenyl]—$C_5H_{11}$ | 6 |
| Liquid crystal composition C | | 61 |

The ferroelectric liquid crystal device was manufactured by the same method as that according to Example 1 except that the above-described liquid crystal composition was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

|                          | 15° C.        | 25° C.    | 35° C.    |
|--------------------------|---------------|-----------|-----------|
| Response speed           | 555 μsec      | 383 μsec  | 315 μsec  |
| Contrast at the operation| 14 (25° C.)   |           |           |

The switching operation was excellent at the time of the operation and the bistability was excellent when the application of the voltage was stopped.

Comparative Example 23

A ferroelectric liquid crystal device was manufactured by the same method according to Example 23 except that compounds 1-18, 1-24, 1-80 and 1-82 were excluded from the liquid crystal composition 23-A. The optical response speed was measured.

The results are as follows:

|                          | 15° C.        | 25° C.    | 35° C.    |
|--------------------------|---------------|-----------|-----------|
| Response speed           | 640 μsec      | 440 μsec  | 342 μsec  |
| Contrast at the operation| 10 (25° C.)   |           |           |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types was observed in the device. In addition, a multiplicity of stripe type defects was observed in the vicinity of the alumina beads. Therefore, it was clear that the orientation deteriorated.

EXAMPLE 24

The liquid crystal device was manufactured by the same method as that according to Example 2 except that the liquid crystal composition 23-C according to Example 23 was used. The orientation in the device was observed.

| Thickness of polyimide | Rubbing Strength | | | | |
|---|---|---|---|---|---|
|  | 1*[1] | 2 | 3 | 4 | 5 |
| 100 Å | ○ | ⊚ | ⊚ | ⊚ | ⊚ |
| 250 Å | ⊚ | ⊚ | ⊚*[2] | ⊚ | ⊚ |
| 300 Å | ⊚ | ⊚ | ⊚ | ⊚ | ⊚ |

*[1] The strength of the rubbing becomes greater in proportion to the Rubbing Strength number.
*[2] The cell according to Example 23
⊚ and ○ have the same definitions as in Example 6.

Comparative Example 24

The liquid crystal device was manufactured by the same method as that according to Example 24 except that the liquid crystal composition according to Comparative Example 23 was used in place of the liquid crystal composition 23-C. The orientation in the device was observed.

| Thickness of polyimide | Rubbing Strength | | | | |
|---|---|---|---|---|---|
|  | 1 | 2 | 3 | 4 | 5 |
| 100 Å |   |   |   |   | X |
| 250 Å |   |   | *[1] |   | X |
| 350 Å |   |   |   | X | X |

*[1] The cell according to Comparative Example 23
X and have the same definitions as in Example 6.

EXAMPLE 25

The following compounds were mixed at the parts by weight shown below so that a liquid crystal composition 25-C was prepared.

| Compound No. | Constitutional Formula | Parts by weight |
|---|---|---|
| 1-29 | $C_8H_{17}$—pyridine—$C_6H_3F$—$OCC_{10}H_{21}$ (=O) | 3 |
| 1-37 | $C_{10}H_{21}$—pyridine—$C_6H_3F$—$OCC_5H_{11}$ (=O) | 5 |
| 1-62 | $C_{10}H_{21}$—pyridine—$C_6H_3F$—$OC(CH_2)_4CHCH_3$ with $CH_3$ branch (=O) | 3 |
| 1-70 | $C_6H_{13}$—pyridine—$C_6H_3F$—$OCC_8H_{17}$ (=O) | 2 |

| Compound No. | Constitutional Formula | Parts by weight |
|---|---|---|
| 3-2 | $C_6H_{13}$—〇—$OCH_2$—〇—〇—$OCH_2\overset{*}{C}HC_4H_9$ with F on chiral C | 2 |
| 3-12 | $C_{10}H_{21}O$—〇—$\underset{O}{CO}$—〇—$OCH_2\overset{*}{C}HC_6H_{13}$ with F | 2 |
| 3-33 | $C_8H_{17}$—(H)—〇—$\underset{O}{CO}$—〇—$OCH_2\overset{*}{C}HC_8H_{17}$ with F | 2 |
| 3-61 | $C_8H_{17}O$—〇—$\underset{O}{SC}$—〇—$OCH_2\overset{*}{C}HC_8H_{17}$ with F | 2 |
| 3-81 | $C_{10}H_{21}$—(N,N pyrazine)—〇—$OCH_2\overset{*}{C}HC_2H_5$ with F | 6 |
| 3-84 | $C_{12}H_{25}$—(N,N pyrazine)—〇—$OCH_2\overset{*}{C}HC_4H_9$ with F | 6 |
| Liquid crystal composition C | | 67 |

The ferroelectric liquid crystal device was manufactured by the same method as that according to Example 1 except that the above-described liquid crystal composition was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

|  | 15° C. | 25° C. | 35° C. |
|---|---|---|---|
| Response speed | 345 μsec | 232 μsec | 195 μsec |
| Contrast at the operation | 14 (25° C.) | | |

The switching operation was excellent at the time of the operation and the bistability was excellent when the application of the voltage was stopped.

Comparative Example 25

A ferroelectric liquid crystal device was manufactured by the same method according to Example 25 except that compounds 1-29, 1-37, 1-62 and 1-70 were excluded from the liquid crystal composition 25-C. The optical response speed was measured.

The results are as follows:

|  | 15° C. | 25° C. | 35° C. |
|---|---|---|---|
| Response speed | 364 μsec | 248 μsec | 200 μsec |
| contrast at the operation | 9 (25° C.) | | |

A clear switching operation was not observed at the time of the operation, the bistability when the application of the voltage was stopped was insufficient and the white or the black state cannot be maintained.

What is even worse, the orientation in the liquid crystal device was not uniform and a multiplicity of defects of zigzag types was observed in the device. In addition, a multiplicity of stripe type defects was observed in the vicinity of the alumina beads. Therefore, it was clear that the orientation deteriorated.

EXAMPLE 26

The liquid crystal device was manufactured by the same method as that according to Example 2 except that the liquid crystal composition 25-C according to Example 25 was used. The orientation in the device was observed.

| Thickness of polyimide | Rubbing Strength | | | | |
|---|---|---|---|---|---|
|  | 1[*1] | 2 | 3 | 4 | 5 |
| 100 Å | ○ | ◎ | ◎ | ◎ | ◎ |
| 250 Å | ○ | ◎ | ◎[*2] | ◎ | ◎ |

-continued

| Thickness of polyimide | Rubbing Strength | | | | |
|---|---|---|---|---|---|
| | 1*1 | 2 | 3 | 4 | 5 |
| 300 Å | ○ | ⊙ | ⊙ | ⊙ | ⊙ |

*1 The strength of the rubbing becomes greater in proportion to the Rubbing Strength number.
*2 The cell according to Example 25
⊙ and ○ have the same definitions as in Example 6.

Comparative Example 26

The liquid crystal device was manufactured by the same method as that according to Example 26 except that the liquid crystal composition according to Comparative Example 25 was used in place of the liquid crystal composition 25-C. The orientation in the device was observed.

| Thickness of polyimide | Rubbing Strength | | | | |
|---|---|---|---|---|---|
| | 1 | 2 | 3 | 4 | 5 |
| 100 Å | | | | | |
| 250 Å | | | | *1 | |
| 350 Å | | | | | X |

*1 The cell according to Comparative Example 25
X and have the same definitions as in Example 6.

EXAMPLE 27

The following compounds were mixed at the parts by weight shown below so that a liquid crystal composition 27-C was prepared.

| Compound No. | Constitutional Formula | Parts by weight |
|---|---|---|
| 1-22 | $C_7H_{15}$—[pyrazine]—[C_6H_3F]—$OC(=O)C_6H_{13}$ | 4 |
| 1-28 | $C_8H_{17}$—[pyrazine]—[C_6H_3F]—$OC(=O)C_9H_{19}$ | 2 |
| 1-30 | $C_8H_{17}$—[pyrazine]—[C_6H_3F]—$OC(=O)C_{12}H_{25}$ | 2 |
| 1-41 | $C_{10}H_{21}$—[pyrazine]—[C_6H_3F]—$OC(=O)C_9H_{19}$ | 3 |
| 1-94 | $C_{10}H_{21}O$—[pyrazine]—[C_6H_4]—$OC(=O)(CH_2)_2CH(CH_3)CH_3$ | 3 |
| 2-9 | $C_6H_{13}$—[pyrazine]—[C_6H_4]—$OC_{10}H_{21}$ | 2 |
| 2-32 | $C_{10}H_{21}$—[pyrazine]—[C_6H_4]—$OC_9H_{19}$ | 8 |
| 2-53 | $C_{10}H_{21}$—[pyrazine]—[C_6H_4]—$O(CH_2)_5CH(CH_3)OC_3H_7$ | 4 |
| 2-61 | $C_8H_{17}$—[pyrazine]—[C_6H_4]—$OC(=O)C_6H_{13}$ | 2 |

-continued

| Compound No. | Constitutional Formula | Parts by weight |
| --- | --- | --- |
| 2-67 | 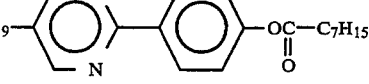 | 2 |
| 2-92 |  | 2 |
| 2-96 |  | 8 |
| 3-23 |  | 4 |
| 3-28 |  | 4 |
| 3-83 | 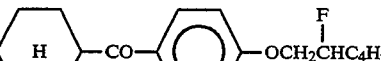 | 5 |
| 3-87 | 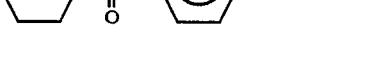 | 5 |
| Liquid crystal composition C | | 38 |

The ferroelectric liquid crystal device was manufactured by the same method as that according to Example 1 except that the above-described liquid crystal composition was used. The optical response speed was measured by the same method as that according to Example 1 and the state of the switching operation was observed.

The uniform orientation in the liquid crystal device was excellent and the monodomain state was realized without the defects in the zigzag shape and stripe shape in the vicinity of the spacer.

The results are as follows:

|  | 15° C. | 25° C. | 35° C. |
| --- | --- | --- | --- |
| Response speed | 310 μsec | 211 μsec | 168 μsec |
| Contrast at the operation | 14 (25° C.) | | |

The switching operation was excellent at the time of the operation and the bistability was excellent when the application of the voltage was stopped.

Comparative Example 27

A ferroelectric liquid crystal device was manufactured by the same method according to Example 27 except that the compounds 1-22, 1-28, 1-30, 1-41 and 1-94 were excluded from the liquid crystal composition 27-C. The optical response speed was measured.

The results are as follows:

|  | 15° C. | 25° C. | 35° C. |
| --- | --- | --- | --- |
| Response speed | 340 μsec | 233 μsec | 185 μsec |
| Contrast at the operation | 9 (25° C.) | | |

A clear switching operation was not observed at the time of the operation, the bistability when the application of the voltage was stopped was insufficient, and the white or the black state cannot be maintained.

What is even worse, the orientation in the liquid crystal device was not uniform and a multiplicity of defects of zigzag types was observed in the device. In addition, a multiplicity of stripe type defects was observed in the vicinity of the alumina beads. Therefore, it was clear that the orientation deteriorated.

EXAMPLE 28

The liquid crystal device was manufactured by the same method as that according to Example 2 except that the liquid crystal composition 27-C according to Example 27 was used. The orientation in the device was observed.

| Thickness of polyimide | Rubbing Strength | | | | |
|---|---|---|---|---|---|
| | 1*1 | 2 | 3 | 4 | 5 |
| 100 Å | ⊚ | ⊚ | ⊚ | ⊚ | ⊚ |
| 250 Å | ⊚ | ⊚ | ⊚*2 | ⊚ | ⊚ |
| 300 Å | ⊚ | ⊚ | ⊚ | ⊚ | ⊚ |

*1 The strength of the rubbing becomes greater in proportion to the Rubbing Strength number.
*2 The cell according to Example 27
⊚ has the same definition as in Example 6.

Comparative Example 28

The liquid crystal device was manufactured by the same method as that according to Example 28 except that the liquid crystal composition according to Comparative Example 27 was used in place of the liquid crystal composition 27-C. The orientation in the device was observed.

| Thickness of polyimide | Rubbing Strength | | | | |
|---|---|---|---|---|---|
| | 1 | 2 | 3 | 4 | 5 |
| 100 Å | | | | | X |
| 250 Å | | | *1 | X | X |
| 350 Å | | | | X | X |

*1 The cell according to Comparative Example 27
X and have the same definitions as in Example 6.

EXAMPLE 29

The following compounds were mixed at the parts by weight shown below so that a liquid crystal composition 29-C was prepared.

The ferroelectric liquid crystal device was manufactured by the same method as that according to Example 1 except that the above-described liquid crystal composition was used. The optical response speed was measured by the same method as that according to Example 1 and the state of the switching operation was observed.

The uniform orientation in the liquid crystal device was excellent and the monodomain state was realized without the defects in zigzag shape and stripe shape in the vicinity of the spacer.

The results are as follows:

| | 15° C. | 25° C. | 35° C. |
|---|---|---|---|
| Response speed | 595 μsec | 405 μsec | 330 μsec |
| Contrast at the operation | 13 (25° C.) | | |

The switching operation was excellent at the time of the operation and the bistability was excellent when the application of the voltage was stopped.

EXAMPLE 30

The liquid crystal device was manufactured by the same method as that according to Example 2 except that the liquid crystal composition 29-C according to Example 29 was used. The orientation in the device was observed.

| Thickness of polyimide | Rubbing Strength | | | | |
|---|---|---|---|---|---|
| | 1*1 | 2 | 3 | 4 | 5 |
| 100 Å | ○ | ⊚ | ⊚ | ⊚ | ⊚ |
| 250 Å | ○ | ⊚ | ⊚*2 | ⊚ | ⊚ |

| Compound No. | Constitutional Formula | Parts by weight |
|---|---|---|
| 1-23 | $C_7H_{15}$—[pyrimidine]—[phenyl(F)]—$OC(=O)C_8H_{17}$ | 4 |
| 1-27 | $C_8H_{17}$—[pyrimidine]—[phenyl(F)]—$OC(=O)C_8H_{17}$ | 4 |
| 1-40 | $C_{10}H_{21}$—[pyrimidine]—[phenyl(F)]—$OC(=O)C_8H_{17}$ | 4 |
| 1-83 | $C_{10}H_{21}O$—[pyrimidine]—[phenyl(F)]—$OC(=O)C_4H_9$ | 2 |
| 1-92 | $C_8H_{17}OC(=O)$—[pyrimidine]—[phenyl(F)]—$OC(=O)C_6H_{13}$ | 2 |
| LIQUID CRYSTAL COMPOSITION C | | 84 |

-continued

| Thickness of polyimide | Rubbing Strength | | | | |
|---|---|---|---|---|---|
| | 1*¹ | 2 | 3 | 4 | 5 |
| 300 Å | ◉ | ◉ | ◉ | ◉ | ◉ |

*¹The strength of the rubbing becomes greater in proportion to the Rubbing Strength number.
*²The cell according to Example 29
◉ and ○ have the same definitions as in Example 6.

As can be clearly seen from Examples 17 to 30, Comparative Examples 17 to 29 and Comparative Example 9, the ferroelectric liquid crystal device containing the liquid crystal composition according to the present invention exhibits higher response, excellent orientation and bistability.

EXAMPLE 31

The ferroelectric liquid crystal device was manufactured by the same method as that according to Example 1 except that 2% water solution of polyvinyl alcohol resin [PVA-117 manufactured by Kurare] was used in place of the 1.5% dimethyl acetoamide solution which is the polyimide resin precursor according to Example 1. The optical response speed was measured by the same method as that according to Example 1.

The results were as follows:

| | 15° C. | 25° C. | 35° C. |
|---|---|---|---|
| Response speed | 303 μsec | 205 μsec | 168 μsec |

EXAMPLE 32

The ferroelectric liquid crystal device was manufactured by the same method as that according to Example 1 except that the orientation control layer was formed by only the polyimide resin. The optical response speed was measured by the same method as that according to Example 1.

The results were as follows:

| | 15° C. | 25° C. | 35° C. |
|---|---|---|---|
| Response speed | 295 μsec | 198 μsec | 162 μsec |

In the embodiment where the structure of the device was changed, the devices according to Examples 31 and 32 containing the liquid crystal composition according to the present invention exhibited excellent orienting characteristics similarly to Example 1.

As described above, according to the present invention, the ferroelectric liquid crystal device which employs the liquid crystal composition, more particularly, the ferroelectric chiral smectic liquid crystal composition exhibits a satisfactory fast response speed and an excellent switching performance. Furthermore, it exhibits an excellent uniform monodomain orientation while preventing the defects in zigzag shape.

Furthermore, a display device arranged in such a manner such that the liquid crystal device according to the present invention is combined with a light source and a drive circuit will work as an improved display device.

While the present invention has been disclosed with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A liquid crystal composition having a chiral smectic phase, said liquid crystal composition comprising a mixture of:

at least one liquid crystal compound having said general formula (I);

$$R_1-Z_1-\underset{N}{\underset{\parallel}{\bigcirc}}-\underset{}{\bigcirc}^{X_1}-O\underset{\parallel}{C}-R_2 \quad (I)$$
$$\phantom{xx}\phantom{xxxxxxxxxxxxxxxx}O$$

wherein $R_1$ and $R_2$ each is a linear or branched alkyl group which may have an alkoxy group having 1 to 16 carbons, $Z_1$ is a single bond, —O—, $$-O\underset{\parallel}{C}- \text{ or } -C\underset{\parallel}{O}-$$
$$\phantom{x}O\phantom{xxxxx}O$$

and $X_1$ is a halogen atom;

at least one liquid crystal compound having the following general formula (II):

$$R_3-Z_2-\left(\underset{N}{\underset{\parallel}{\bigcirc}}\right)_p-\underset{N}{\underset{\parallel}{\bigcirc}}-\left(\bigcirc\right)_q-Z_3-R_4 \quad (II)$$

wherein $R_3$ and $R_4$ are linear or branched alkyl groups having 1 to 18 carbons which may contain an alkoxy group having 1 to 12 carbons, $R_3$ and $R_4$ each shows non-optical activity, $Z_2$ and $Z_3$ each is a single bond, —O—, $$-O\underset{\parallel}{C}- \text{ or } -C\underset{\parallel}{O}- \text{ or } -OC\underset{\parallel}{O}-$$
$$\phantom{x}O\phantom{xxxxx}O\phantom{xxxxxxx}O$$

and p+q is 1 or 2; and at least one liquid crystal compound having the following general formula (III):

$$R_5-Z_4-\left(A\right)-Y-\left(\bigcirc\right)-Z_5-\underset{*}{\overset{F}{C}H}-C_lH_{2l+1} \quad (III)$$

wherein $R_5$ is a linear or a branched alkyl group having 1 to 18 carbons which may have an alkoxy substituent, Y is a single bond, $$-O\underset{\parallel}{C}-, -O\underset{\parallel}{C}-,$$
$$\phantom{x}O\phantom{xxxxx}O$$

—CH₂O—, OCH₂—, —COS—, —SCO—, or —CH=CH—COO—, $Z_4$ is a single bond, —O—, $$-C\underset{\parallel}{O}-, -O\underset{\parallel}{C}-,$$
$$\phantom{x}O\phantom{xxxxx}O$$

$Z_5$ is —OCH$_2$—

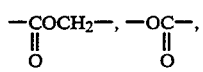

or —O—(CH$_2$)$_k$—O—CH$_2$, wherein k is an integer from 1 to 4,

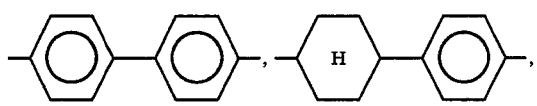

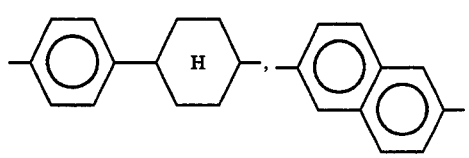

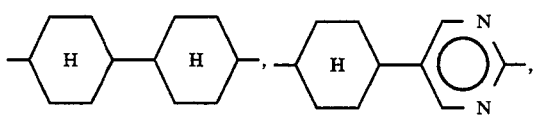

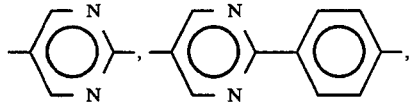

r is 1 or 2 and l is an integer from 1 to 12.

2. A liquid crystal composition according to claim 1, wherein said liquid crystal compound having said general formula (I) has the following general formula (Ia):

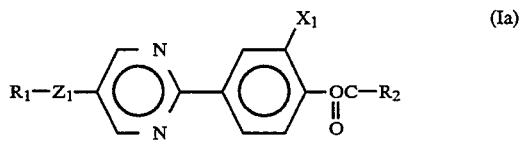 (Ia)

wherein R$_1$ and R$_2$ each is a linear or branched alkyl group having 1 to 16 carbons which may have an alkoxy substituent, Z$_1$ is a single bond, —O—,

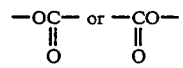

and X$_1$ is a halogen atom;
said compound having said general formula (II) is selected from any of the compounds having the following formulas (II-a) to (II-e);

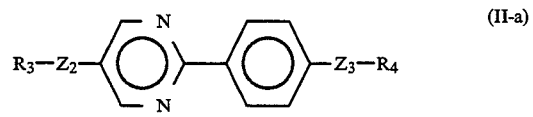 (II-a)

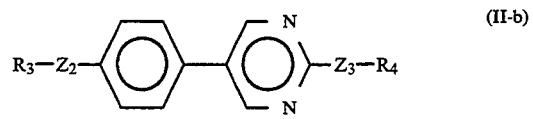 (II-b)

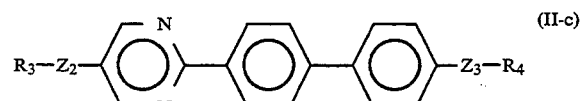 (II-c)

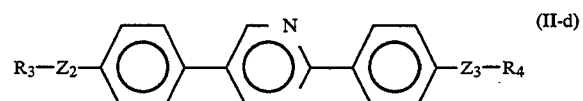 (II-d)

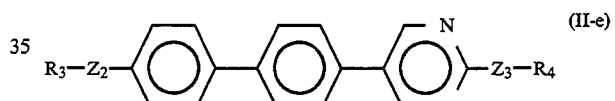 (II-e)

wherein R$_3$ and R$_4$ are linear or branched alkyl groups having 1 to 18 carbons which may contain an alkoxy group having 1 to 12 carbons, R$_3$ and R$_4$ each shows non-optical activity, Z$_2$ and Z$_3$ each is a single bond, —O—,

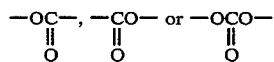

and p and q each is 0, 1 or 2;
and said compound having said general formula (III) is selected from any of the compounds having the following formulas (III-a) to (III-f):

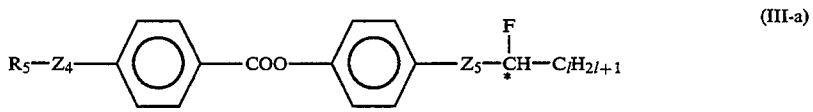 (III-a)

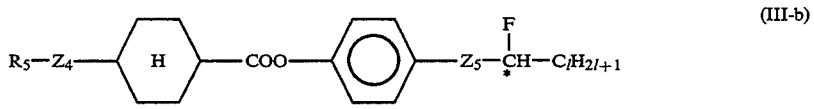 (III-b)

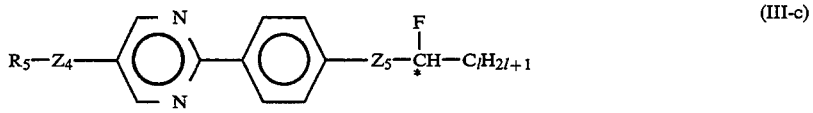 (III-c)

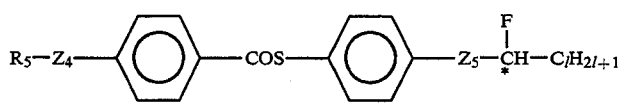

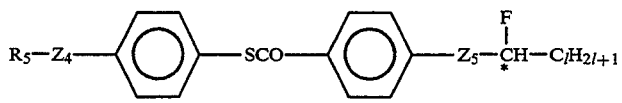

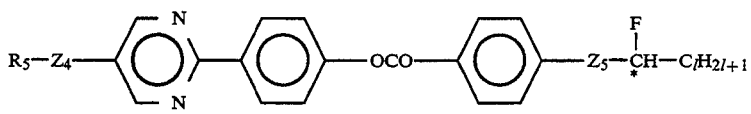

wherein $R_5$ is a linear or a branched alkyl group having 1 to 18 carbons which may have an alkoxy substituent, $Z_4$ is a single bond, —O—,

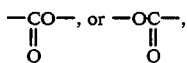

$Z_5$ is —OCH$_2$—,

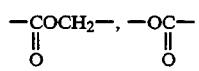

or —O—(CH$_2$)$_k$—O—CH$_2$— wherein k is an integer from 1 to 4, and l is an integer from 1 to 12.

3. A liquid crystal composition according to claim 2, wherein $Z_4$ and $Z_5$ in said formulas (III-a) to (III-f) are selected from any of the following (III-i) to (III-v):
(III-i) $Z_4$ is a single bond and $Z_5$ is —O—CH$_2$—;
(III-ii) $Z_4$ is a single bond and $Z_5$ is —COO—CH$_2$;
(III-iii) $Z_4$ is a single bond and $Z_5$ is —OCO—;
(III-iv) $Z_4$ is —O— and $Z_5$ is —O—CH$_2$—; and
(III-v) $Z_4$ is —O— and $Z_5$ is —COOCH$_2$—.

4. A liquid crystal composition according to claim 1, wherein said composition comprises at least one liquid crystal compounds having the general formulas (IV) to (VIII)

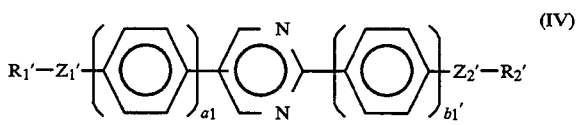

wherein $R_1'$ and $R_2'$ each is a linear or branched alkyl group having 1 to 18 carbons in which at least one —CH$_2$— group which is not positioned adjacent to another —CH$_2$— group may be replaced by —CH-CN—, —C—(CH$_3$)—CN—, CHCl— or —CHBr—, and in which at least one —CH$_2$— group except for the —CH$_2$— groups which are directly bonded to $Z_1'$ and $Z_2'$ may be replace by —O—,

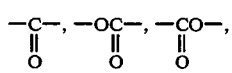

at least one of $R_1'$ and $R_2'$ has optical activity, $Z_1'$ and $Z_2'$ each is a single bond —O—,

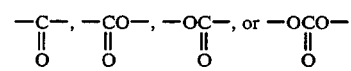

and $a_1$ and $b_1$ each is 0, 1 or 2 with the proviso that $a_1+b_1$ is 1 or 2;

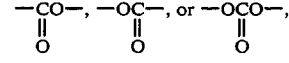

where $R_3'$ and $R_4'$ each is a linear or branched alkyl group having 1 to 18 carbons in which at least one —CH$_2$— group which is not positioned adjacent to another —CH$_2$— group may be replaced by —CH-CN—, —C—(CH$_3$)—CN—, CHCl— or —CHBr—, and in which at least one —CH$_2$— group except for the —CH$_2$— groups which are directly bonded to $Z_3'$ and $Z_4'$ may be replaced by —O—,

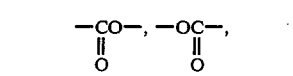

$Z_3'$ and $Z_4'$ each is a single bond, —O—,

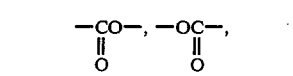

$X_1'$ and $X_2'$ each is a single bond,

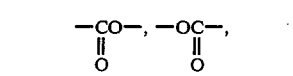

—CH$_2$O—, or —OCH$_2$— wherein $X_1'$ and $X_2'$ cannot both be single bonds, $A_1'$ is

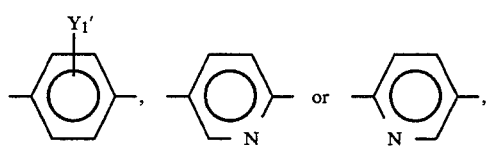

wherein $Y_1'$ is a hydrogen atom, a halogen atom, CH$_3$ or CF$_3$;

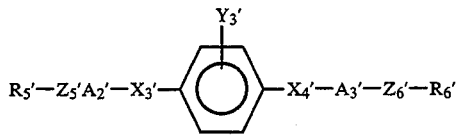
(VI)

wherein $R_5'$ and $R_6'$ each is a linear or branched alkyl group having 1 to 18 carbons in which at least one —$CH_2$— group which is not positioned adjacently to another —$CH_2$— group may be replaced by —CH-CN—, —C—($CH_3$)—CN—, CHCl— or —CHBr—, and in which at least one —$CH_2$— group except for the —$CH_2$— groups which are directly bonded to $Z_5'$ and $Z_6'$ may be replaced by —O—,

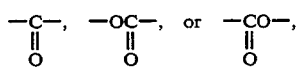

$A_2'$ is

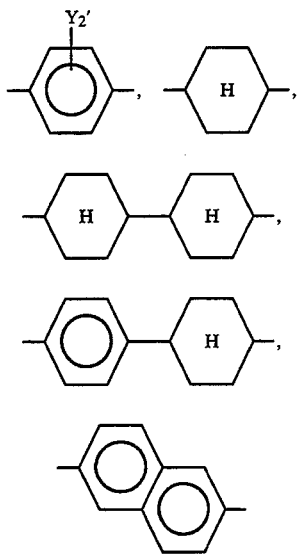

or a single bond, $A_3'$ is

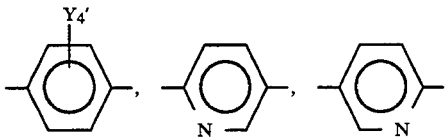

or a single bond, wherein $A_2'$ and $A_3'$ cannot both be single bonds, $Z_5'$ and $Z_6'$ each is a single bond, —O—,

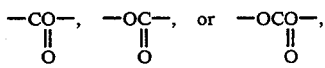

$X_3'$ and $X_4'$ each is a single bond,

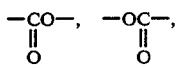

or —$CH_2O$—, wherein when $A_2'$ is a single bond $X_3'$ is a single bond, when $A_3'$ is a single bond, $X_4'$ is a single bond and $Y_2'$, $Y_3'$ and $Y_4'$ each is a hydrogen atom, halogen atom, $CH_3$ or $CF_3$;

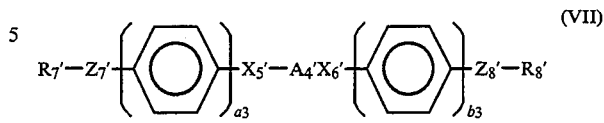
(VII)

wherein $R_7'$ and $R_8'$ each is at a linear or branched alkyl group having 1 to 18 carbons in which at least one —$CH_2$ group which is not positioned adjacently to another —$CH_2$— group may be replaced by —CH-CN—, —C—($CH_3$)—CN—, —CHCl— or —CHBr—, and in which at least one —$CH_2$— group except for the —$CH_2$— groups which are directly bonded to $Z_7'$ and $Z_8'$ may be replaced by —O—,

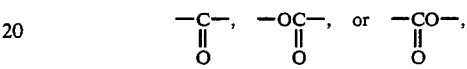

$A_4'$ is

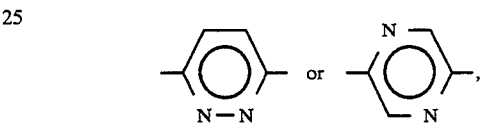

$Z_7'$ and $Z_8'$ each is a single bond, —O—,

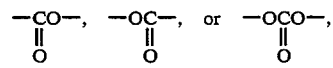

$X_5'$ and $X_6'$ each is as single bond

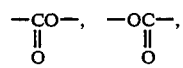

—$CH_2O$—, or —$OCH_2$—, and $a_3$ and $b_3$ each is 0 or 1 with the proviso that $a_3$ and $b_3$ cannot both be 0;

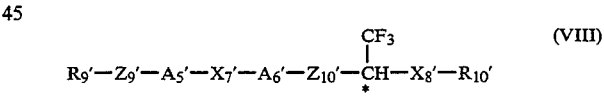
(VIII)

wherein $R_9'$ is a linear or branched alkyl group having 1 to 18 carbons, $R_{10}'$ is a linear or branched alkyl group having 1 to 16 carbons, $A_5'$ is

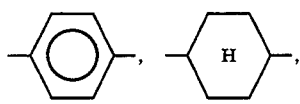

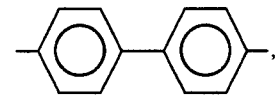

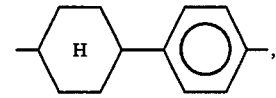

-continued

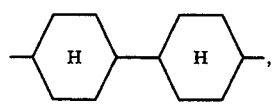,

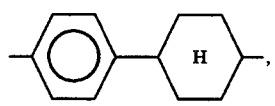,

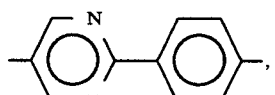, $A_6'$ is

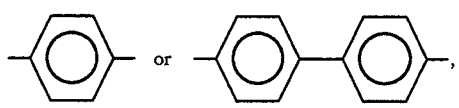, $X_7'$ is a single bond,

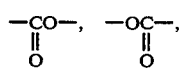,

—CH$_2$O—, or —OCH$_2$—; $X_8'$ is a single bond or

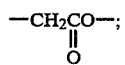;

$X_9'$ is a single bond, —O—,

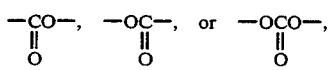, $X_{10}'$ is

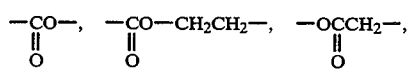, or —O—CH$_2$CH$_2$ and C* designates an optically active asymmetric carbon atom.

5. A liquid crystal composition according to claim 4, wherein a composition ratio of said liquid crystal compounds having said general formulas (I), (II) and (III) to said at least one liquid crystal compounds having the general formulas (IV) to (VIII) is 1 to 300 parts by weight with respect to 100 parts by weight of said at least one liquid crystal compounds having the general formulas (IV) to (VIII).

6. A liquid crystal composition according to claim 4, wherein, when said composition comprises two or more liquid crystal compounds for at least one of said liquid crystal compounds having said general formulas (I), (II) and (III), the composition ratio of said mixture of liquid crystal compounds having said general formulas (I), (II), and (III) is 1 to 500 parts by weight with respect to 100 parts by weight of said at least one liquid crystal compounds having the general formula (IV) to (VIII).

7. A liquid crystal device comprising a pair of electrode substrates having any of said liquid crystal composition according to any of claims 1 to 5 disposed therebetween.

8. A liquid device according to claim 6 further comprising an orienting film.

9. A display device comprising said liquid crystal device according to claim 7.

10. A liquid crystal composition having a chiral smectic phase comprising a mixture of:

at least one liquid crystal compound expressed by said general formula (I):

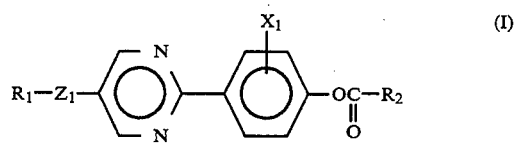 (I)

wherein $R_1$ and $R_2$ each is a linear or branched alkyl group having 1 to 16 carbons which may have an alkoxy substituent, $Z_1$ is a single bond, —O—,

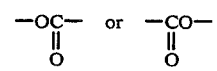

and $X_1$ is a halogen atom;
and at least one liquid crystal compound having the following general formula (III):

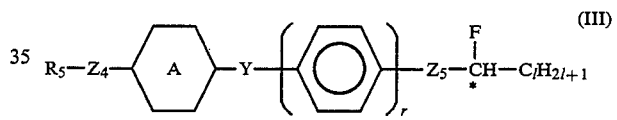 (III)

wherein $R_5$ is a linear or a branched alkyl group having 1 to 18 carbons which may have an alkoxy substituent group, Y is a single bond,

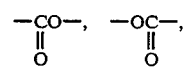,

—CH$_2$O—, OCH$_2$, —COS—, —SCO—, or —CH=CH—COO—, $Z_4$ is a single bond, —O—,

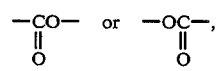

$Z_5$ is —OCH$_2$,

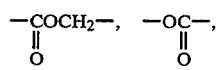, or —O—(CH$_2$)$_k$—O—CH$_2$— wherein k is an integer from 1 to 4,

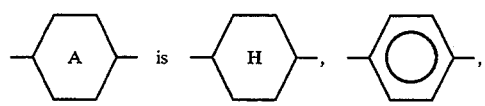,

-continued

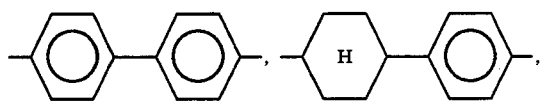

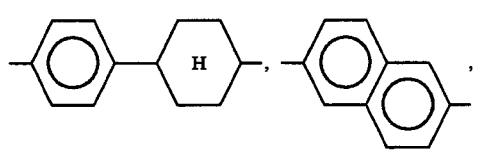

r is 1 or 2 and l is an integer from 1 to 12.

11. A liquid crystal composition according to claim 10, wherein said liquid crystal compound of said general formula (I) has the following general formula (Ia):

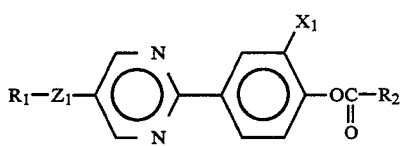

wherein $R_1$ and $R_2$ each is a linear or branched alkyl group which may have an alkoxy substituent, $Z_1$ is a single bond, —O—,

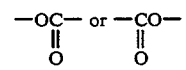

and $X_1$ is a halogen atom;

and said compound having said general formula (III) is selected from any of the compounds having the following formulas (III-a) to (III-f):

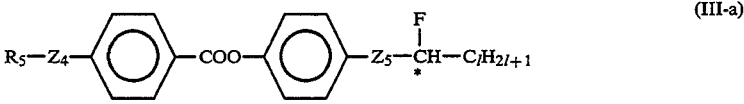 (III-a)

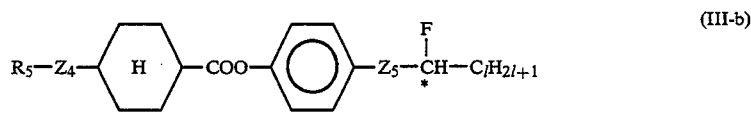 (III-b)

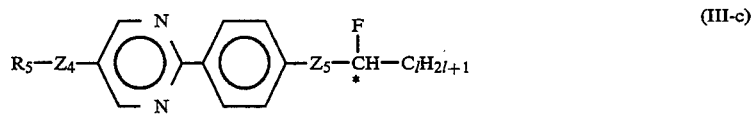 (III-c)

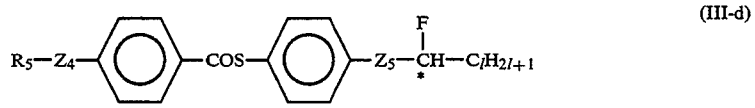 (III-d)

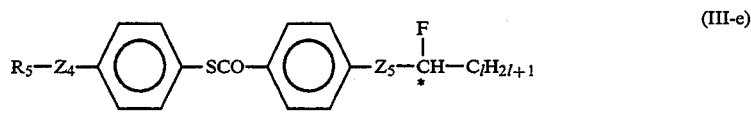 (III-e)

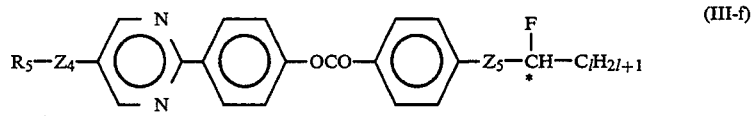 (III-f)

wherein $R_5$ is a linear or a branched alkyl group having 1 to 18 carbons which may have an alkoxy substituent, $Z_4$ is a single bond, —O—,

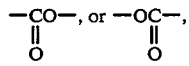

$Z_5$ is —OCH$_2$,

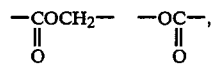

or —O—(CH$_2$)$_k$—O—CH$_2$, wherein k is an integer from 1 to 4, and l is an integer from 1 to 12.

12. A liquid crystal composition according to claim 11, wherein $Z_4$ and $Z_5$ in said formulas (III-a) to (III-f) are selected from any of the following:

(III-i) $Z_4$ is single bond and $Z_5$ is —O—CH$_2$;
(III-ii) $Z_4$ is single bond and $Z_5$ is —COO—CH$_2$;
(III-iii) $Z_4$ is single bond and $Z_5$ is —OCO—;
(III-iv) $Z_4$ is —O— and $Z_5$ is —O—CH$_2$; and
(III-v) $Z_4$ is —O— and $Z_5$ is —COOCH$_2$—.

13. A liquid crystal composition according to claim 10, wherein said composition comprises at least one liquid crystal compounds having the general formulas (IV) to (VIII),

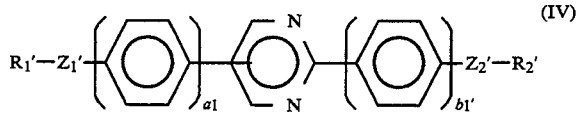 (IV)

wherein $R_1'$ and $R_2'$ each is a linear or branched alkyl group having 1 to 18 carbons in which at least one —CH$_2$— group which is not positioned adjacent to another —CH$_2$— group may be replaced by —CHCN—, —C—(CH$_3$)—CN—, —CHCl— or —CHBr—, and in which at least one —CH$_2$— group except for the —CH$_2$— groups which are directly bonded to $Z_1'$ and $Z_2'$ may be replaced by —O—,

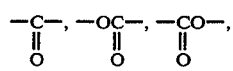

at least one of $R_1'$ and $R_2'$ has optical activity, $Z_1'$ and $Z_2'$ each is a single bond —O—,

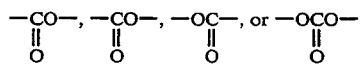

and $a_1$ and $b_1$ each is 0, 1 or 2 with the proviso that $a_1+b_1$ is 1 or 2;

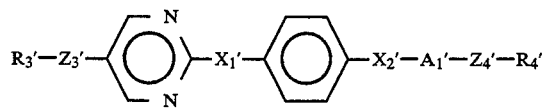 (V)

wherein $R_3'$ and $R_4'$ each is linear or branched alkyl group having 1 to 18 carbons in which at least one —CH$_2$— group which is not positioned adjacently to another —CH$_2$ group may be replaced by —CHCN—, —C—(CH$_3$)—CN—, —CHCl— or —CHBr—, and in which at least one —CH$_2$— group except for the —CH$_2$— groups which are directly bonded to $Z_3'$ and $Z_4'$ may be replaced by —O—,

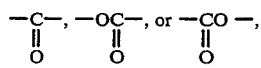

$Z_3'$ and $Z_4'$ each is a single bond, —O—,

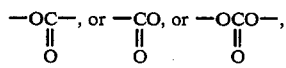

$X_1'$ and $X_2'$ each is a single bond

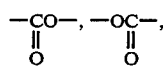

—CH$_2$O—, or —OCH$_2$— wherein $X_1'$ and $X_2'$ cannot both be single bonds, $A_1'$ is

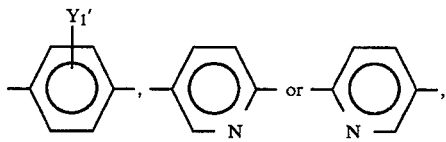

wherein $Y_1'$ is a hydrogen atom, a halogen atom, CH$_3$ or CF$_3$;

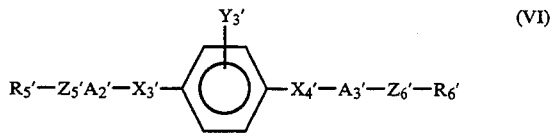 (VI)

wherein $R_5'$ and $R_6'$ each is a linear or branched alkyl group having 1 to 18 carbons in which at least one —CH$_2$— group which is not positioned adjacently to another —CH$_2$— group may be replaced by —CHCN—, —C—(CH$_3$)—CN—, —CHCl— or —CHBr—, and in which at least one —CH$_2$— group except for the —CH$_2$— groups which are directly bonded to $Z_5'$ and $Z_6'$ may be replaced by —O—,

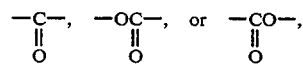

$A_2'$ is

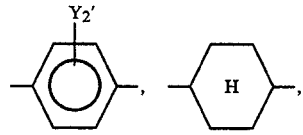

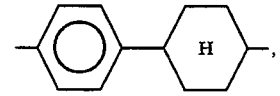

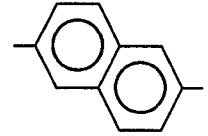

or a single bond, $A_3'$ is

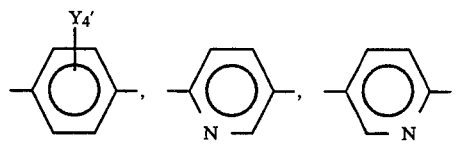

or a single bond, wherein $A_2'$ and $A_3'$ cannot both be single bonds, $Z_5'$ and $Z_6'$ each is a single bond, —O—

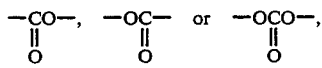

$X_3'$ and $X_4'$ each is a single bond,

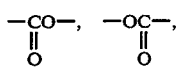

or —CH$_2$O— wherein when $A_2'$ is a single bond, $X_3'$ is a single bond, when $A_3'$ is a single bond, $X_4'$ is a single bond and $Y_2'$, $Y_3'$ and $Y_4'$ each is a hydrogen atom, halogen atom, CH$_3$ or CF$_3$;

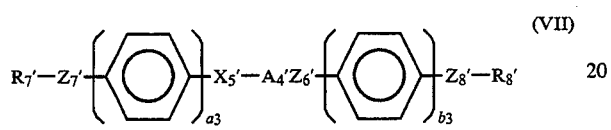
(VII)

wherein $R_7'$ and $R_8'$ each is linear or branched alkyl group having 1 to 18 carbons in which at least one —CH$_2$— group which is not positioned adjacently to another —CH$_2$— group may be replaced by —CHCN—, —C—(CH$_3$)—CN—, —CHCl— or —CHBr—, and in which at least one —CH$_2$ group except for the —CH$_2$— groups which are directly bonded to $Z_7'$ and $Z_8'$ may be replaced by —O—,

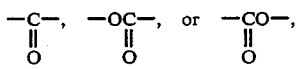

$A_4$ is

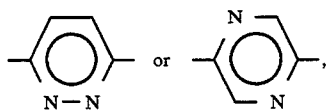

$Z_7'$ and $Z_8'$ each is a single bond, —O—,

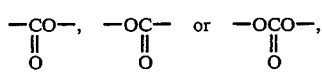

$X_5'$ and $X_6'$ each is a single bond

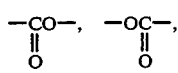

—CH$_2$O—, or —OCH$_2$—, and $a_3$ and $b_3$ each is 0 or 1 with the proviso that $a_3$ and $b_3$ cannot both be 0;

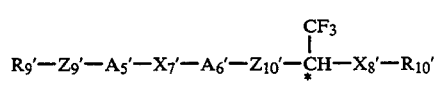
(VIII)

wherein $R_9'$ is linear or branched alkyl group having 1 to 18 carbons, $R_{10}'$ is a linear or branched alkyl group having 1 to 16 carbons, $A_5'$ is

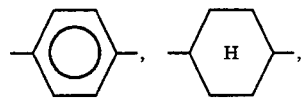

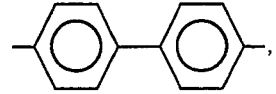

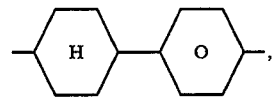

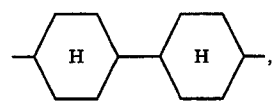

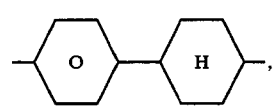

or

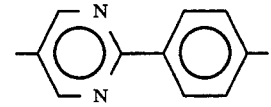

$A_6'$ is

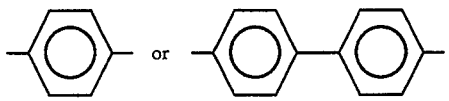

$X_7'$ is a single bond,

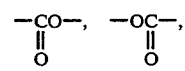

—CH$_2$O—, or —OHC$_2$— $X_8'$ is a single bond or

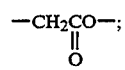

$X_9'$ is a single bond, —O—,

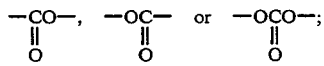

$X_{10}'$ is

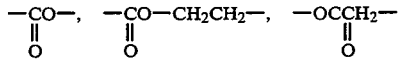

or —O—CH$_2$CH$_2$—, and C* designates an optically active asymmetric carbon atom.

14. A liquid crystal composition according to claim 13, wherein the composition ratio of said liquid crystal compounds having said general formulas (I) and (III) to said at least one liquid crystal compounds having the general formulas (IV) to (VIII) is 1 to 300 parts by weight with respect to 100 parts by weight of said at least one liquid crystal compounds having the general formulas (IV) to (VIII).

15. A liquid crystal composition according to claim 13, wherein, when said composition comprises two or more liquid crystal compounds for at least one of said liquid crystal compounds having said general formulas (I) and (III), the composition ratio of said mixture of said liquid crystal compounds having said general formulas (I) to (III) to said at least one liquid crystal compounds having the general formulas (IV) to (VIII) is 1 to 500 parts by weight with respect to 100 parts by weight of said at least one liquid crystal compounds having the general formulas (IV) to (VIII).

16. A liquid device comprising a pair of electrode substrates having any of said liquid crystal composition according to any of claims 10–14 disposed therebetween.

17. A liquid device according to claim 15 further comprising an orienting film.

18. A display device comprising said liquid crystal device according to claim 16.

* * * * *

UNITED STATES PATENT AND TRADEMARK OFFICE
CERTIFICATE OF CORRECTION

PATENT NO. : 5,391,318

DATED : February 21, 1995

INVENTORS : MASATAKI YAMASHITA, ET AL.

It is certified that error appears in the above-identified patent and that said Letters Patent is hereby corrected as shown below:

COLUMN 1

Line 34, "plicities" should read --plicity--.
Line 51, "devices" should read --device--.

COLUMN 3

Line 5, "time t," should read --time $\tau$,--.
Line 45, "considers" should read --consider--.

COLUMN 4

Line 50, "(III)" should read --(III):--.
Line 59, "and" should be deleted.

COLUMN 8

Line 54, "$R_5$" should read --$R_5$, $Z_4$,--.

COLUMN 20

Line 16, "5-metoxyhexyl-p-toluene" should read
 --5-methoxyhexyl-p-toluene--.
Line 28, "phenyl}pyrimidine" should read
 --pheyl) pyrimidine--.

UNITED STATES PATENT AND TRADEMARK OFFICE
CERTIFICATE OF CORRECTION

PATENT NO. : 5,391,318

DATED : February 21, 1995

INVENTORS : MASATAKI YAMASHITA, ET AL.

It is certified that error appears in the above-identified patent and that said Letters Patent is hereby corrected as shown below:

COLUMN 30

Line 49, "so that" should read --providing--.
Line 51, "(yield 68.6%)" should read --(yield 68.6%).--.

COLUMN 32

Line 21, "1250" should read --1250,--.

COLUMN 50

Line 2, "-O-," (second occurrence) should be deleted.

COLUMN 51

Line 42, "bond" should read --bond,--.

COLUMN 52

Line 44, " 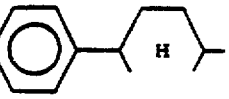 ," should read -- 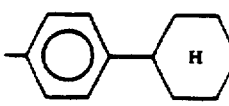 ,--.

Line 61, "-OCH$_2$-" should read --OCH$_2$-,--.

COLUMN 57

Line 27, "is" should read --is a--.
Line 28, "of" should read --of a--.

UNITED STATES PATENT AND TRADEMARK OFFICE
CERTIFICATE OF CORRECTION

PATENT NO. : 5,391,318

DATED : February 21, 1995

INVENTORS : MASATAKI YAMASHITA, ET AL.

It is certified that error appears in the above-identified patent and that said Letters Patent is hereby corrected as shown below:

COLUMN 59

Line 4, "to" (2nd occurrence) should be deleted.
Line 7, "preferably" should read --preferable--.
Line 9, "proportional" should read --proportion--.

COLUMN 76

Line 15, under "Compound No." insert --2-6-- and under "Parts by weight" add --3--.

COLUMN 82

Line 40, "_____" should read

-- | Compound No. | Constitutional Formula | Parts by weight | --.

COLUMN 84

Line 13, "the" should be deleted.
Line 62, "_____" should read

-- | Compound No. | Constitutional Formula | Parts by weight | --.

COLUMN 96

Line 44, "contrast" should read --Contrast--.

UNITED STATES PATENT AND TRADEMARK OFFICE
CERTIFICATE OF CORRECTION

PATENT NO. : 5,391,318

DATED : February 21, 1995

INVENTORS : MASATAKI YAMASHITA, ET AL.

It is certified that error appears in the above-identified patent and that said Letters Patent is hereby corrected as shown below:

COLUMN 104

Form (III),  should read.

COLUMN 105

Line 1, "-OH$_2$-" should read ---- -OCH$_2$-,--.

Line 21, "  " should read

COLUMN 106

Line 11, "(II-e);" should read --(II-e):--.

COLUMN 107

Line 44, "compounds" should read --compound--.
Line 45, "(VIII)" should read --(VIII):--.

Form (IV) "  " should read.

Line 60, "replace" should read --replaced--.

COLUMN 110

Line 9, "at" should be deleted.
Line 36, "as" should read --a--.

UNITED STATES PATENT AND TRADEMARK OFFICE
CERTIFICATE OF CORRECTION

PATENT NO. : 5,391,318

DATED : February 21, 1995

INVENTORS : MASATAKI YAMASHITA, ET AL.

It is certified that error appears in the above-identified patent and that said Letters Patent is hereby corrected as shown below:

COLUMN 112

Line 1, "claims 1 to 5" should read --claims 1 to 6--.
Line 3, "liquid" should read --liquid crystal-- and
       "claim 6" should read --claim 7--.

COLUMN 115

Line 3, "compounds" should read --compound--.
Line 29, " $-\underset{\underset{O}{\|}}{C}O-,$ " (second occurrence) should be deleted.

Line 41, "is" should read --is a--.
Line 44, "-CH$_2$ group" should read -- -CH$_2$- group--.

COLUMN 117

Line 24, "is" should read --is a--.
Line 29, "-CH$_2$ group" should read -- -CH$_2$- group--.
Line 65, "is" should read --is a--.

UNITED STATES PATENT AND TRADEMARK OFFICE
CERTIFICATE OF CORRECTION

PATENT NO. : 5,391,318

DATED : February 21, 1995

INVENTORS : MASATAKI YAMASHITA, ET AL.

It is certified that error appears in the above-identified patent and that said Letters Patent is hereby corrected as shown below:

<u>COLUMN 120</u>

Line 4, "liquid" should read --liquid crystal--.
Line 6, "claims 10-14" should read --claims 10-15--.
Line 8, "claim 15" should read --claim 16--.

Signed and Sealed this

Thirteenth Day of June, 1995

Attest:

BRUCE LEHMAN

*Attesting Officer*     *Commissioner of Patents and Trademarks*